(12) United States Patent
Ford

(10) Patent No.: US 12,486,772 B2
(45) Date of Patent: Dec. 2, 2025

(54) BOUNDARY-LAYER TURBOMACHINE

(71) Applicant: BOUNDARY ENERGY INC., Evansburg (CA)

(72) Inventor: Darrell Ford, Evansburg (CA)

(*) Notice: Subject to any disclaimer, the term of this patent is extended or adjusted under 35 U.S.C. 154(b) by 176 days.

(21) Appl. No.: 18/272,543

(22) PCT Filed: Jan. 18, 2022

(86) PCT No.: PCT/CA2022/050068
§ 371 (c)(1),
(2) Date: Jul. 14, 2023

(87) PCT Pub. No.: WO2022/150933
PCT Pub. Date: Jul. 21, 2022

(65) Prior Publication Data
US 2024/0076995 A1    Mar. 7, 2024

Related U.S. Application Data

(60) Provisional application No. 63/285,575, filed on Dec. 3, 2021, provisional application No. 63/280,396, filed
(Continued)

(51) Int. Cl.
*F01D 1/36* (2006.01)
*F01D 5/14* (2006.01)
(Continued)

(52) U.S. Cl.
CPC .............. *F01D 1/36* (2013.01); *F01D 5/147* (2013.01); *F01D 9/041* (2013.01); *F01D 15/08* (2013.01); *F01D 15/10* (2013.01); *F01D 25/12* (2013.01)

(58) Field of Classification Search
CPC ... F01D 1/34; F01D 1/36; F01D 5/147; F01D 9/041; F01D 15/08; F01D 15/10; F01D 25/12; F04D 5/001; F04D 17/161
See application file for complete search history.

(56) References Cited

U.S. PATENT DOCUMENTS 2,598,678 A * 6/1952 Dennis ...................... F01D 1/36
415/90
3,967,914 A     7/1976 Gamell
(Continued)

FOREIGN PATENT DOCUMENTS

CN     103306738 A     9/2013
CN     106545363 A     3/2017
(Continued)

*Primary Examiner* — Sang K Kim

(57) ABSTRACT

A boundary-layer turbomachine coupled to a shaft for transmitting power, comprising a plurality of ducts, and a plurality of blades and/or one or more protrusions. The plurality of ducts are defined by duct walls configured to rotate about the longitudinal axis and are concentrically arranged thereabout to convey fluid between inlet and outlet ends. Flow inlets draw the fluid into the plurality of ducts at least partially azimuthally around the longitudinal axis towards the outlet end. The plurality of blades and/or one or more protrusions extend radially in the duct between opposing duct walls. The one or more protrusions may spirally extend at least partially along and around the longitudinal axis to induct fluid into the duct. Slots may be provided in duct walls for centrifugal separation of liquid phase. Systems and methods of generating power using a plurality of boundary-layer turbines, including without condensers, pumps, and/or compressors.

20 Claims, 43 Drawing Sheets

Related U.S. Application Data on Nov. 17, 2021, provisional application No. 63/138,649, filed on Jan. 18, 2021.

(51) Int. Cl.
  *F01D 9/04* (2006.01)
  *F01D 15/08* (2006.01)
  *F01D 15/10* (2006.01)
  *F01D 25/12* (2006.01)

(56) References Cited

U.S. PATENT DOCUMENTS

| | | | |
|---|---|---|---|
| 6,713,028 B1 * | 3/2004 | Oklejas, Jr. | F01D 15/00 |
| | | | 422/224 |
| 7,695,242 B2 * | 4/2010 | Fuller | F03D 3/0409 |
| | | | 416/185 |
| 9,670,840 B2 * | 6/2017 | Plante | F02C 3/145 |
| 9,732,634 B2 | 8/2017 | Hikichi et al. | |
| 2012/0009055 A1 * | 1/2012 | Kim | F01D 1/34 |
| | | | 415/80 |
| 2018/0216463 A1 * | 8/2018 | Ford | F04D 29/0473 |
| 2019/0055843 A1 * | 2/2019 | Berkson | F01D 5/048 |

FOREIGN PATENT DOCUMENTS

| | | |
|---|---|---|
| FR | 3040427 A1 | 3/2017 |
| WO | 2017004725 A1 | 1/2017 |

* cited by examiner

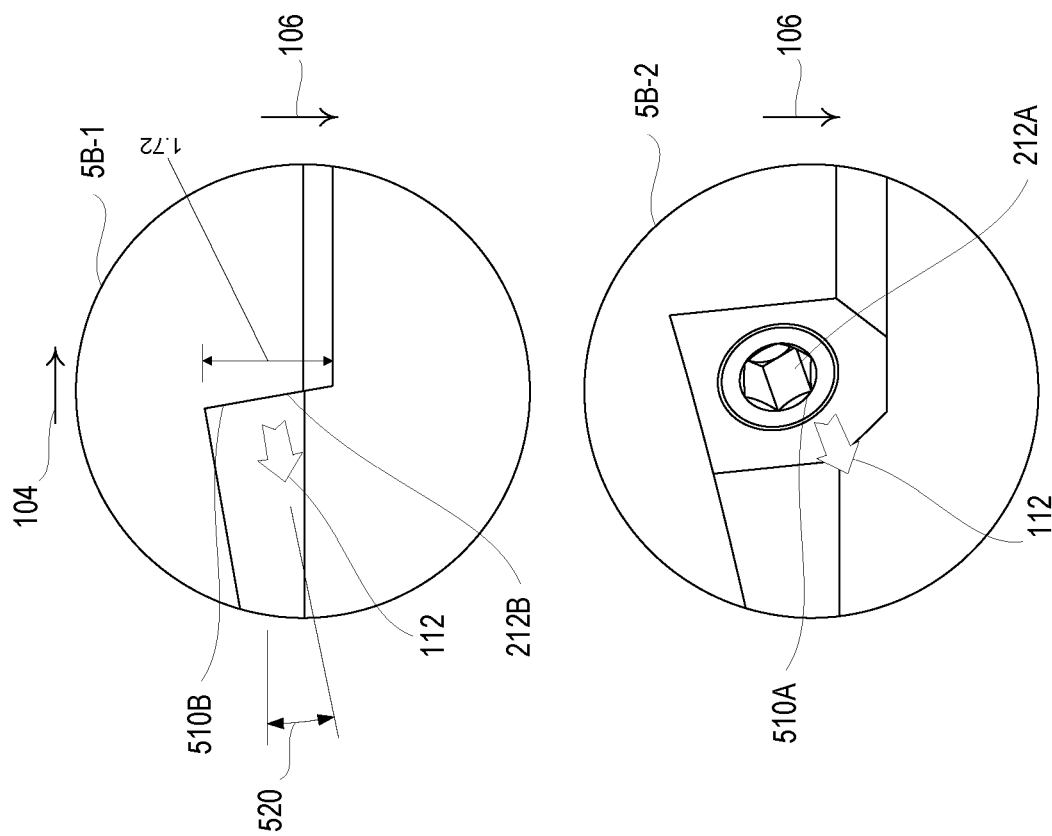
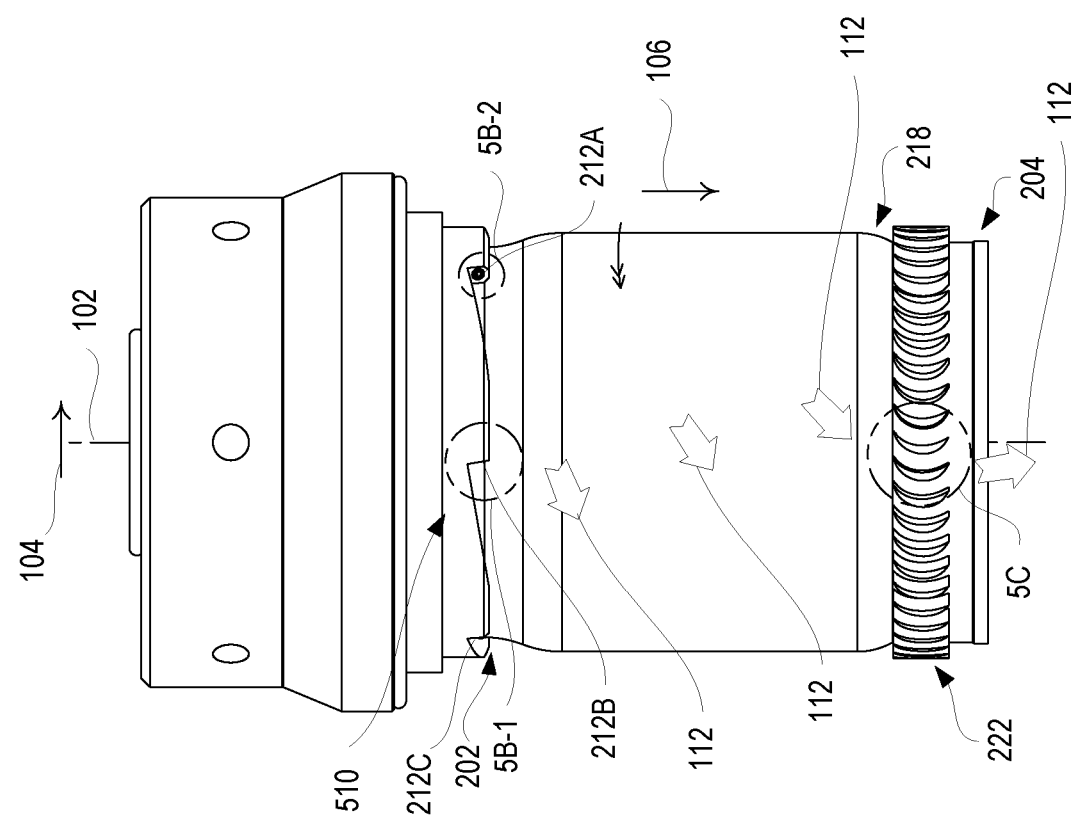
FIG. 5B
FIG. 5A

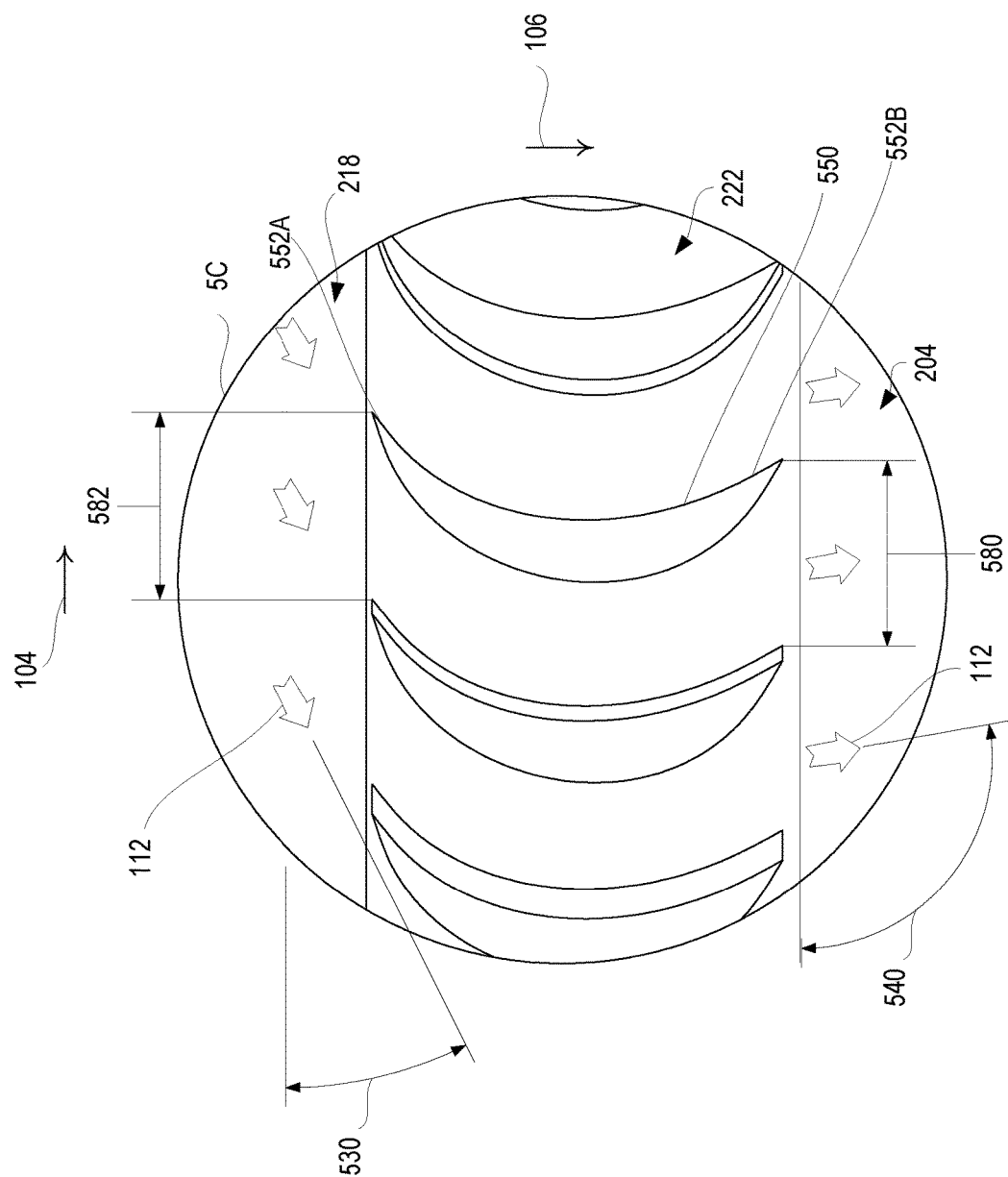

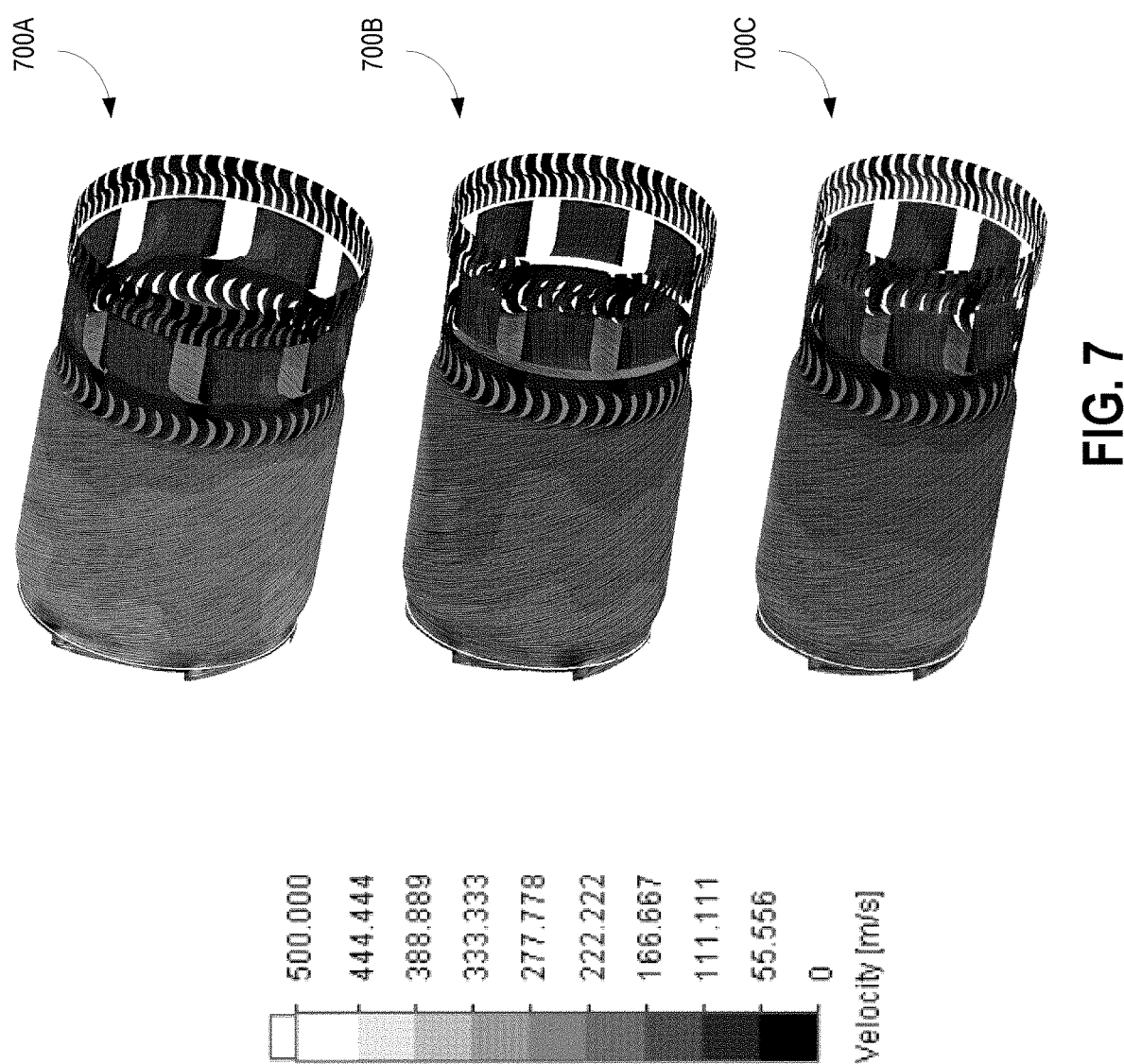

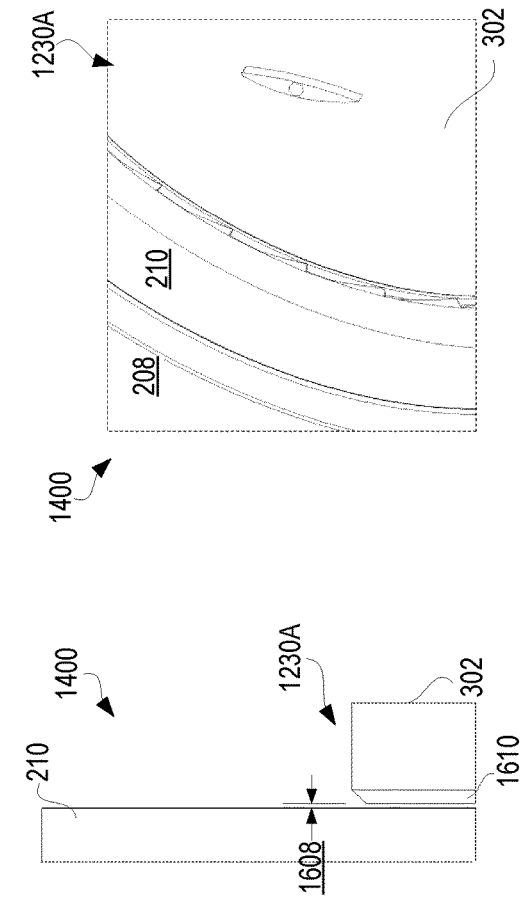
FIG. 16F
FIG. 16E
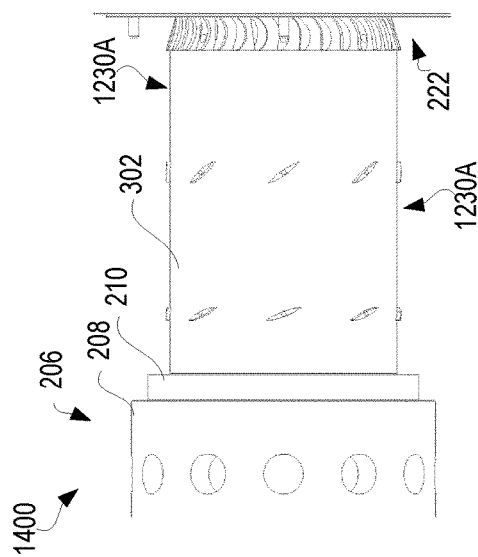
FIG. 16G
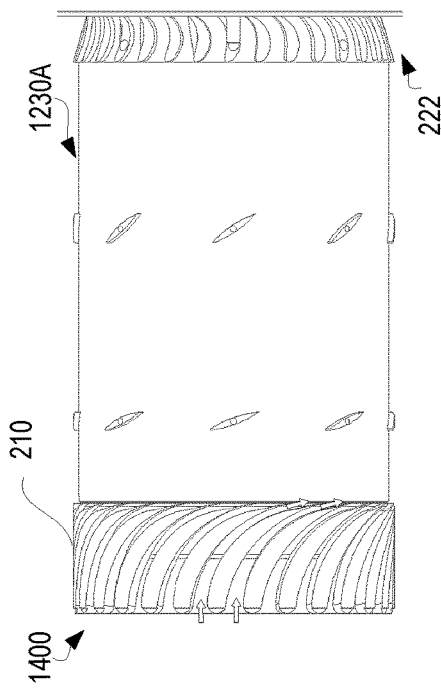
FIG. 16I
FIG. 16H
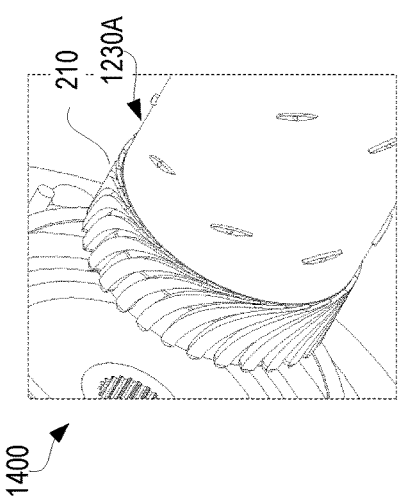

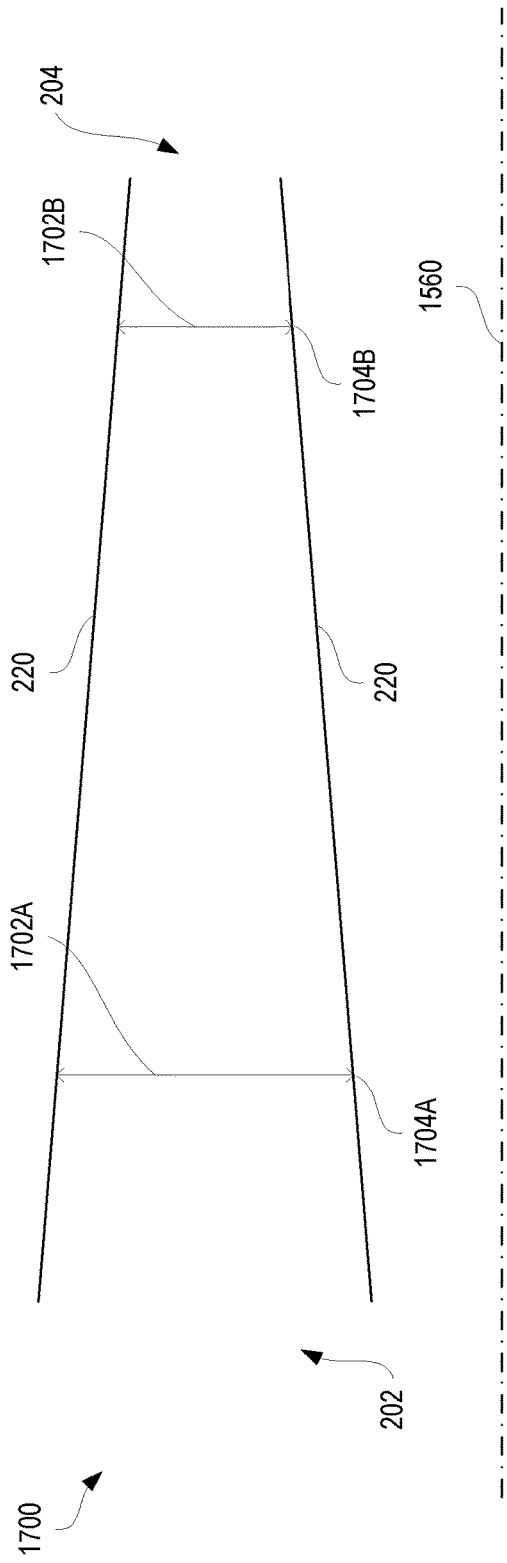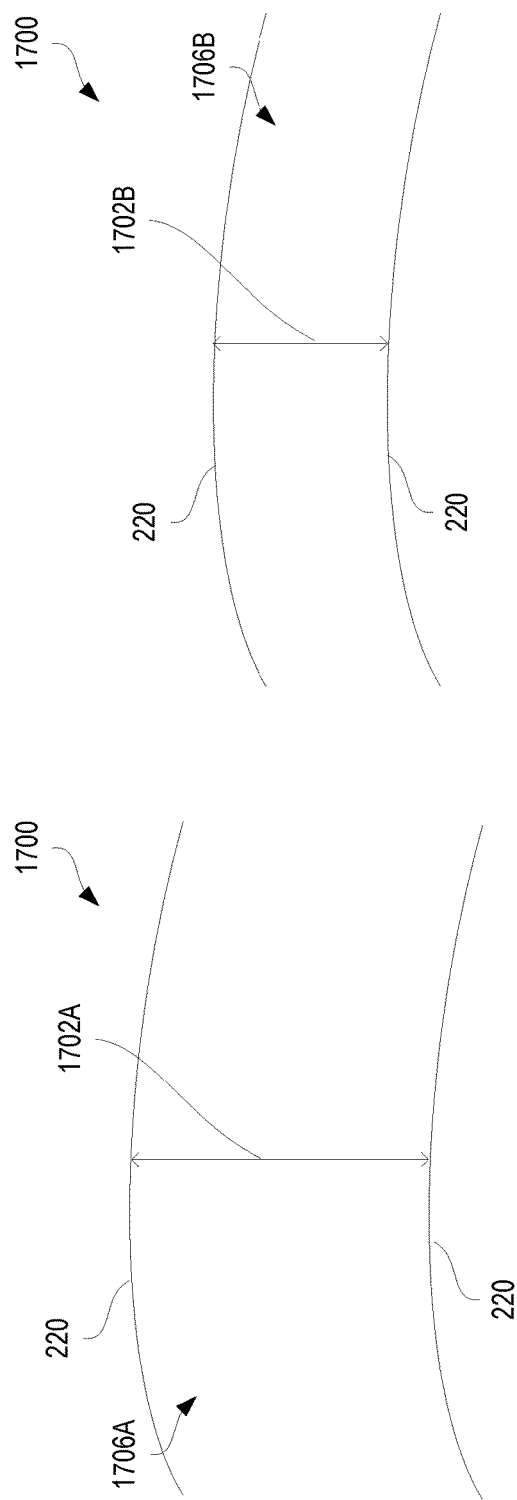
FIG. 17A
FIG. 17B
FIG. 17C

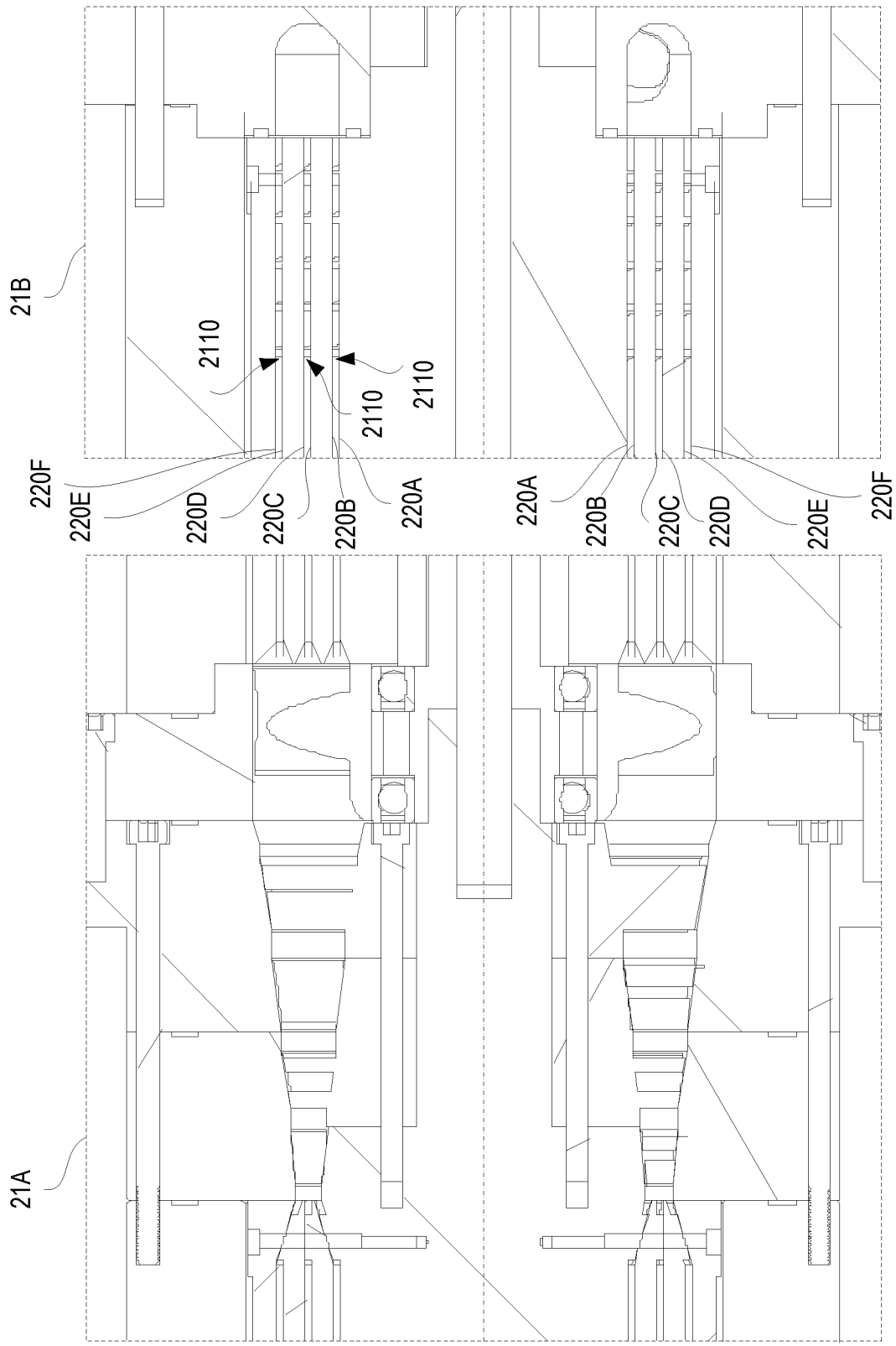

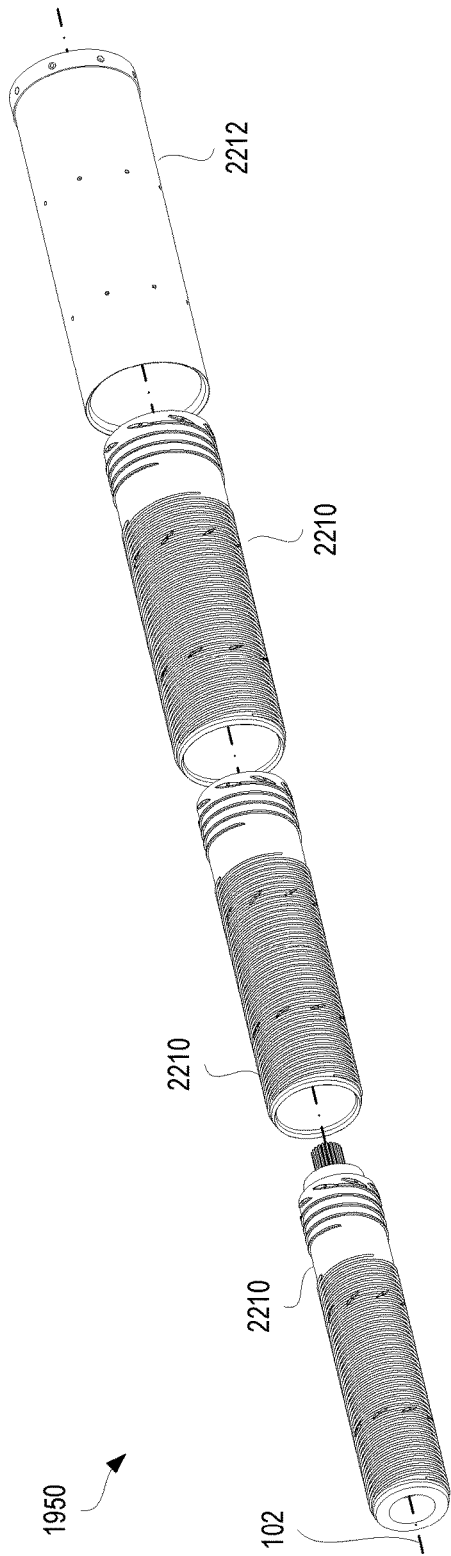
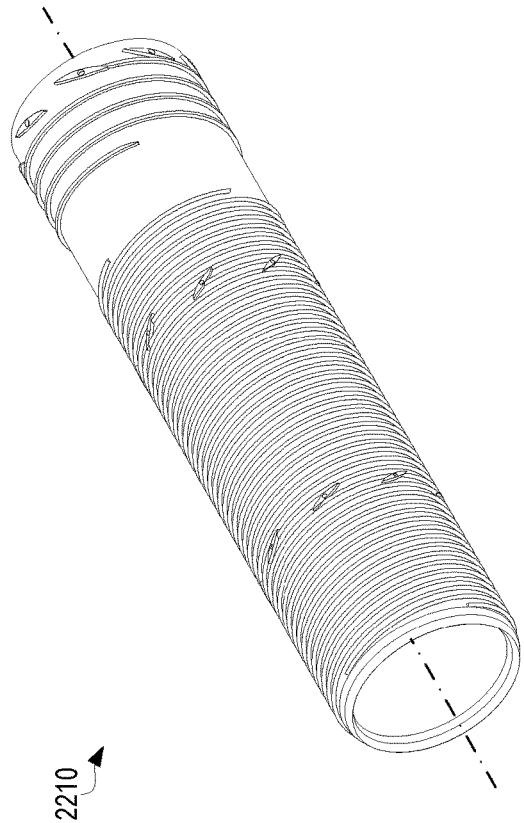
FIG. 24
FIG. 25A

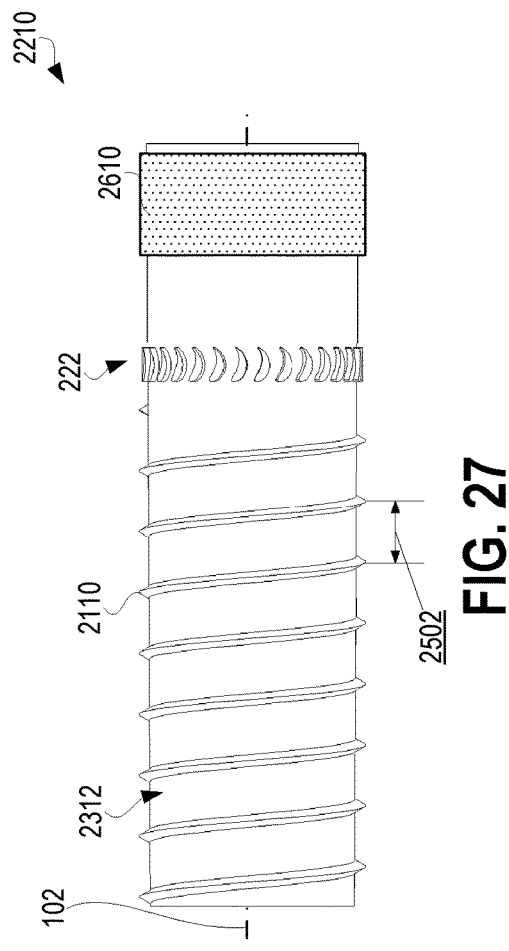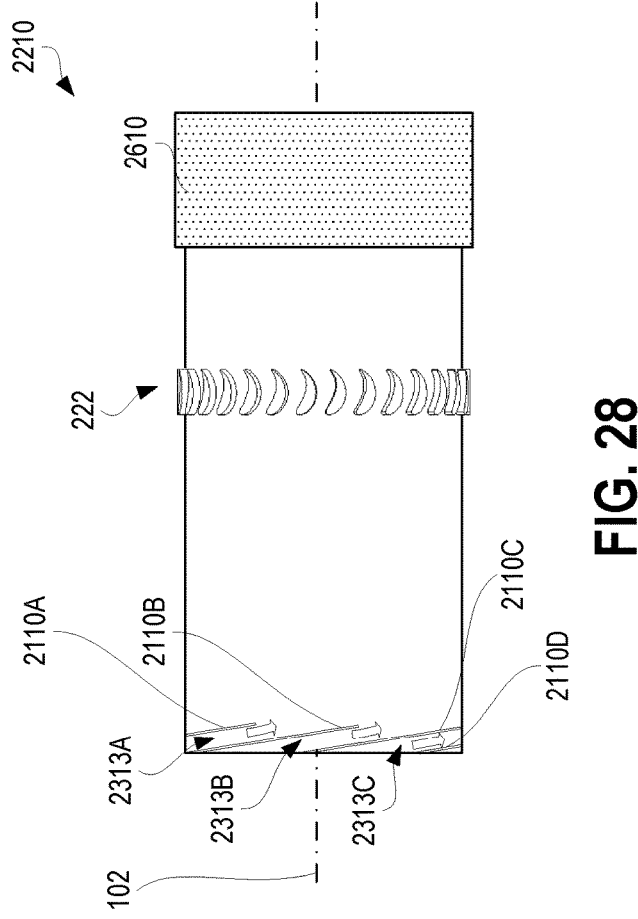

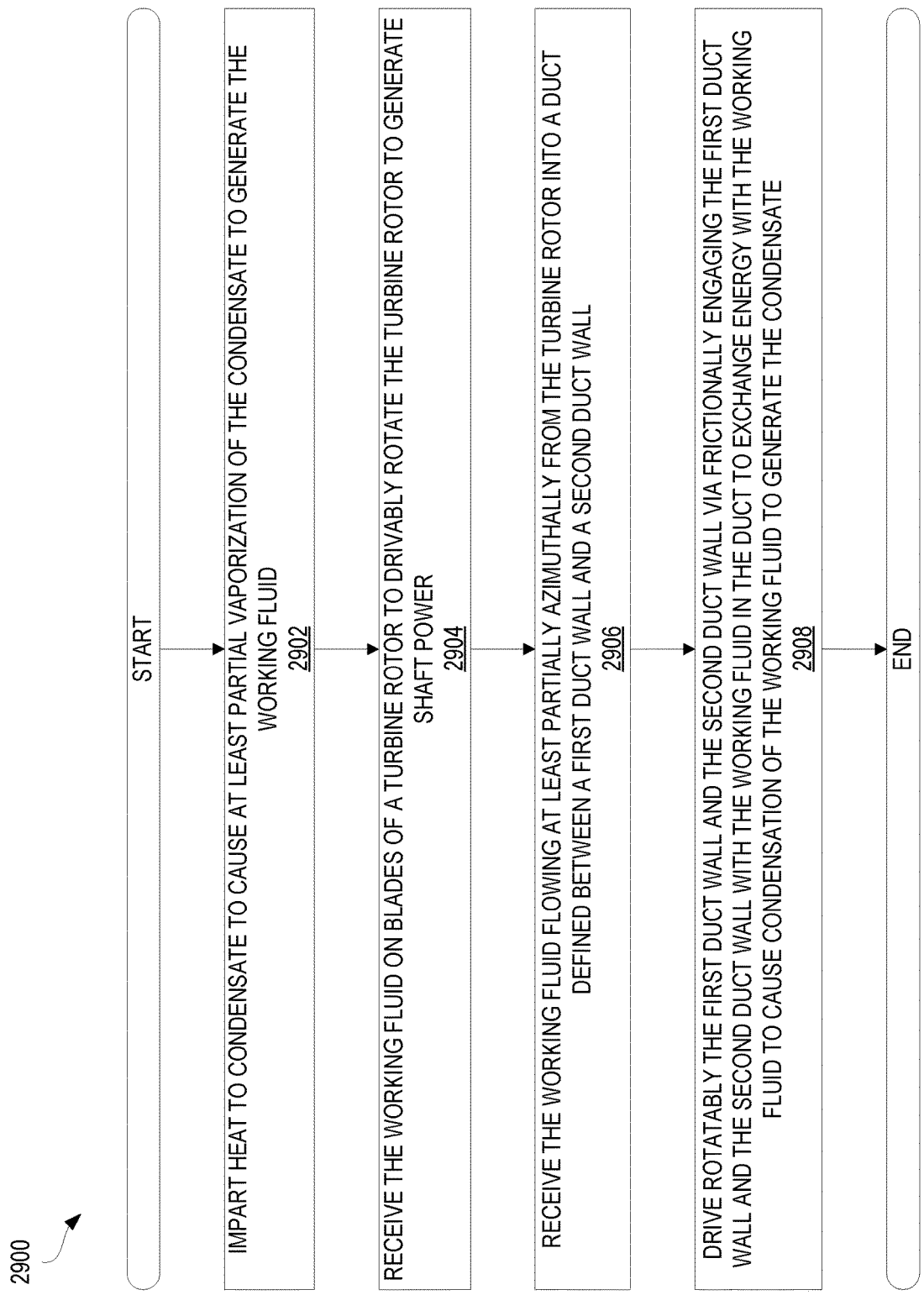

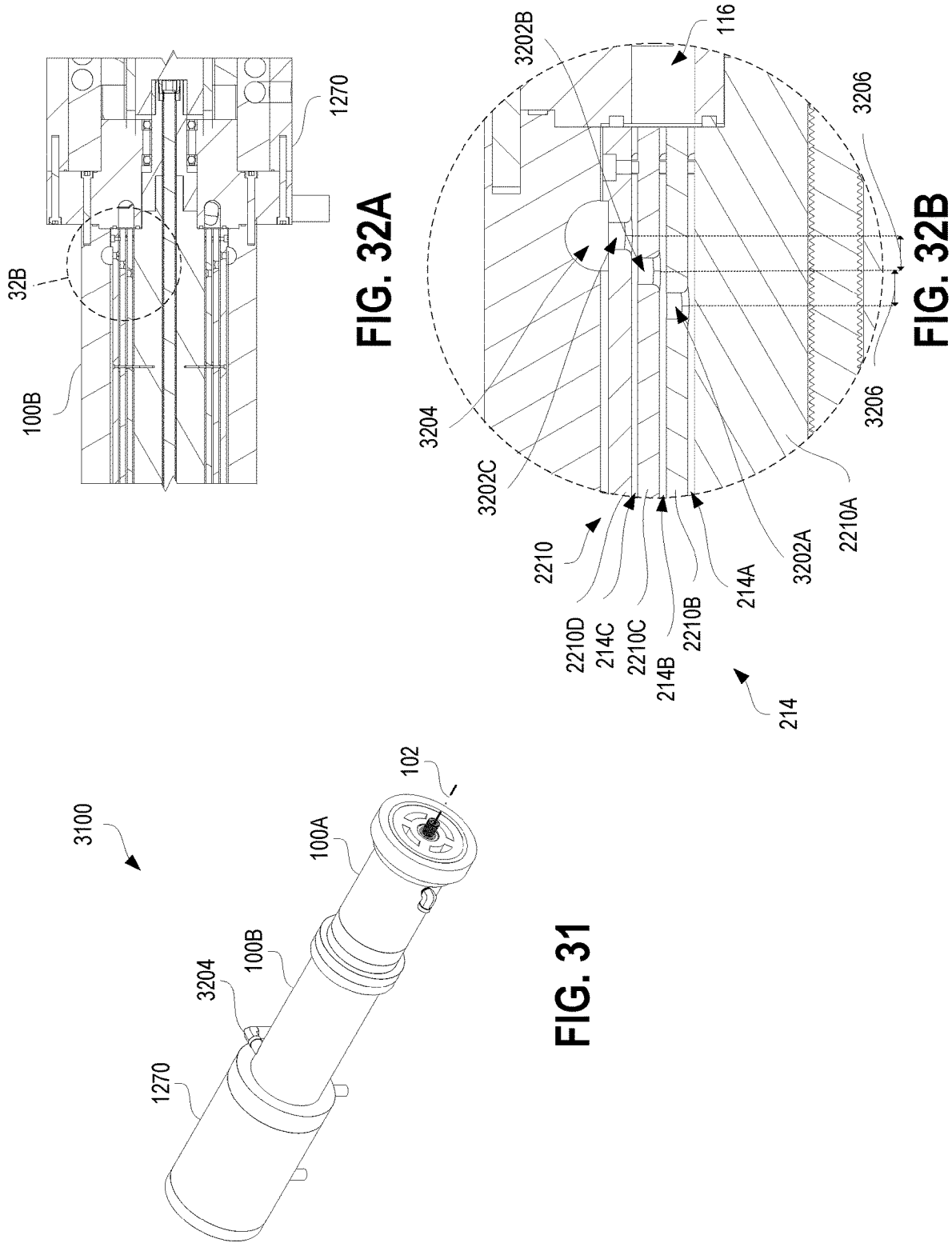

BOUNDARY-LAYER TURBOMACHINE

CROSS-REFERENCE TO RELATED APPLICATIONS

This application claims the benefit of U.S. Provisional Application No. 63/138,649, filed on Jan. 18, 2021; U.S. Provisional Application No. 63/280,396, filed on Nov. 17, 2021; and U.S. Provisional Application No. 63/285,575, filed on Dec. 3, 2021.

TECHNICAL FIELD

The following disclosure relates to turbomachinery and systems and methods of generating power using the same, and in particular, boundary-layer turbomachinery for extracting and injecting energy into a fluid.

BACKGROUND

Boundary-layer turbomachines may have advantages such as increased efficiency, and lower manufacturing and maintenance costs. Efficiency of such turbines may be less than what is theoretically achievable and manufacturing may require relatively high precision and/or costs.

Existing power generation systems have significant loss of energy to the environment. For example, heat may be lost when condensers are used to condense the working fluid of the power generation system. In other cases, heat may be lost in electric generators, where the associated heat buildup may also degrade performance of generators. Heat recuperators and combined heating and power (CHP) cycles have been proposed to reduce inefficiencies.

However, various drawbacks have been recognized previously. Heat recuperators do not address all types of heat loss and may not operate efficiently in regimes common to low-grade heat applications, and CHP cycles are not useful where there is no need for heating in the local environment.

Turbomachinery, such as pumps and/or compressors, may be used to establish a power-generating flow of working fluids through power generating systems. However, such turbomachinery may be a source of parasitic loading that may reduce the efficiency of power generation systems.

Multiphase flow in turbomachinery may impart excessive structural loads on components of such turbomachines. To avoid structural failure due to such loads, large weight and cost penalties may be incurred in the design of the turbomachines. As such, working fluids are typically reduced to a single phase before compression and/or pumping. While this may reduce the design requirements on turbomachines, the need for complete phase change incur other penalties in terms of heat loss and a consequent loss in efficiency.

For example, inducers and screw compressors may be used for fluid compression and may generally comprise a stationary outer housing containing an inner rotating impeller having a curved helicoid blade defined thereon. A small tip clearance may be provided between the stationary outer housing and the inner rotating impeller. In some cases, the tip clearance may be a region liable to cavitation or condensation, which may result in structurally catastrophic consequences. The stationary outer housing may be configured to seal the turbomachinery without contacting moving components, such as the rotating impeller, to avoid seizing of turbomachinery, e.g. due to contact between stationary and moving components.

Improvement is desired.

SUMMARY

Pressing environmental concerns have led to demands to reduce energy consumption and emissions.

Emission and efficiency standards on turbomachinery, such as power generating turbine equipment pumps/compressors, are being raised at a rapid pace, e.g. to meet targets for greenhouse gas emissions. Carbon pricing has introduced strong market drivers for addressing sustainability challenges with respect to power generation and consumption.

Net overall energy consumption may be reduced by recovering energy. For example, in industrial processes, energy may be recovered from exit fluids with elevated temperature and/or pressure. Energy may be extracted from high temperature or high-pressure gas using let-down expanders, also referred to as turbo-expanders or expansion turbines. Turbo-expanders may entrain or form multiphase fluid therein. Such fluids may exert excessive stresses on structures of the turbo-expanders, e.g. blade-based turbo-expanders may have a limited operational envelope to avoid damage to blades. In some cases, cavitation may occur on blades. For example, turbo-expanders may be employed in natural gas refineries and oxygen manufacturing plants.

New approaches to generating energy that are better for the environment, e.g. Organic Rankine Cycle (ORC) power generation, may require higher turbomachine efficiencies to be feasible or may require lower cost turbomachines to offset increased costs elsewhere (e.g. in downstream carbon-capture and sequestration systems). Costs associated with designing, manufacturing, and maintaining turbomachinery, which are already high, may therefore increase even more rapidly.

For example, axial turbomachines may have more than three stages for achieving sufficiently high efficiency levels. Each such stage introduces a significant number of new (moving) parts, which drives up costs of manufacturing and maintenance. Additional, improvements in turbomachines have tended towards diminished returns, i.e. increased resources expended towards improvements have been rewarded with relatively lower increases in efficiency and cost-effectiveness.

Current efforts at improving turbomachines face the long-term challenge of consistently increasing efficiency while decreasing cost of manufacturing and maintenance.

Significant improvements in turbomachines, particular turbines and expanders, are critical for long-term sustainability.

Adhesion-based (or cohesion-based) turbomachines that exploit the boundary-layer effect may have the potential for significantly higher efficiencies relative to other types of turbomachines, and to operate with far fewer moving parts.

An early prototype of a boundary-layer turbomachine was the Tesla turbine (or pump). This is a bladeless centripetal flow turbine wherein fluid flows through the turbine radially inwardly in a spiral flow path. The Tesla turbine has extremely high sturdiness. However, it had drawbacks, e.g. in some cases such turbines had relatively limited range of power output, thereby limiting the potential for scaling up to large power levels to compete with existing axial turbomachine. For example, increasing rotation frequencies would increase turbulence levels, and often output flow would retain a significant amount of residual energy that could yet be extracted. Unsuccessful attempts over several decades involved trying to adapt the Tesla turbine and take advantage of the boundary-layer effect to achieve desired efficiencies at the required power outputs.

A drawback with the Tesla turbine is the inability to control the fluid as it spirals from a radially outward position to a radially inward position towards a turbine outlet. Thus, balancing of fluid speeds across the fluid as it spirals down may not be possible.

Aspects disclosed herein may provide for efficient turbomachines that operate at desired (high) power output levels. For example, aspects disclosed herein may provide for efficient turbines that extract relatively larger amounts of energy from the working fluid while retaining benefits such as relatively high efficiencies, mild operating conditions, high levels of sturdiness. In some cases, aspects disclosed herein provide the ability to synchronize rotors driven by the boundary-layer effect, e.g. in turbine embodiments, the rotors may also generate positive torque.

In various embodiments of turbomachine turbines disclosed herein, a boundary-layer effect may be used to drive a plurality of concentrically nested generally tubular rotors engaged in common rotation around a longitudinal axis and defining ducts therebetween. Generally the ducts may be dimensioned or adapted to efficiently utilize the boundary-layer effect, e.g. in some cases the duct (radial) widths may be dimensioned by reference to the boundary-layer thickness therein.

In some embodiments, jets of working fluid may be azimuthally injected via nozzles around the longitudinal axis at a longitudinal end of the plurality of ducts to "drag" the rotors in rotation around the longitudinal axis. The jets so injected may cause the working fluid to spiral around the ducts in a helical path towards an opposing longitudinal end of the ducts containing a plurality of blades integrally formed with the rotors. The fluid jets may be directed against portions of adjacent ducts to create a fluid bearing seal between adjacent ducts.

In some embodiments, fluid may enter the ducts in such a way to encourage desired behaviour from the tubular rotors, e.g. nozzles may vary orientation, speed, pressure of inlets jets to achieve positive torque generation from the tubular rotors to prevent any of tubular rotors consuming power to pump fluid instead of generating power via flowing fluid. The width of the ducts and the length thereof may be varied to achieve positive torque generation.

Each duct may have a plurality of blades, e.g. which partially obstruct flow in the duct to extract residual energy from the fluid while maintaining the benefits of boundary-layer turbomachines. The plurality of blades may be oriented to receive the partially azimuthally aligned working fluid to extract further energy therefrom and realign the flow more towards the longitudinal axis. More energy may be extracted from the working fluid using an axial flow turbine stage disposed downstream of the plurality of blades.

A relatively larger size of the jets and the plurality of blades, compared to the duct (radial) width, may be desirable due to manufacturability, costs, mass-flow rate, and/or fluid behaviour. In some aspects, ducts may be smoothly tapered at upstream and downstream ends to define respective converging and diverging flow zones (restriction and expansion, respectively) which efficiently merge jets and the bladed portions with adhesion portions of the duct. Such zones may provide fluid dynamical advantages.

Configurations disclosed herein may lead to high efficiencies, allowing milder operating conditions, and reduce the number of moving parts. Overall, lower costs and reduced energy consumption may be achieved.

Aspects disclosed herein may prevent catastrophic damage to blades in expansion turbines by employing an elongated adhesive section which extracts energy from the working fluid before contact with any blades.

Aspects disclosed herein may address limitations of turbomachines and provide for efficiencies surpassing those of other turbomachines, particularly in a configuration typical of gas turbines, jet engines and Tesla type boundary layer machinery. Embodiments disclosed herein may be particularly suitable for Organic Rankine Cycle (ORC) turbine generators, and particularly wherein the inlet fluid is hot pressurized, supercritical fluid configured to undergo at least partial phase change across the turbomachine.

In some aspects, turbomachines disclosed herein may surpass prior turbomachines by being able to maintain precise geometry under stress conditions generated by very high rotational speeds, accommodate thermal growth of the materials under high temperature, overcome material warpage which is a known flaw in disc-type boundary turbines. Such turbomachine may operate based on combining expansion properties, as in a conventional turbine (radial inflow or axial), and surfaces with adhesive properties, as in a Tesla disc turbine.

Other advantages may include eliminating the need for forgings, castings, and multi axis machining operations inherent in conventional turbine designs, providing a low manufacturing cost and still maintain high durability, dependability with increased efficiency, utilizing new materials and manufacturing methods—high temperature plastics and composites, carbon fibers, 3D printed parts, and increase overall efficiency due to the ability to adjust the length of the tubes thereby increasing the residence time of the working fluid and corresponding energy extraction/recovery.

As well, aspects disclosed herein may eliminate exit losses of the compressor and the inlet losses of the turbine, as well as reduce inlet losses of the compressor, allowing for very high rotational speeds by utilizing 'fluid bearings' and external shaft bearings as well as longitudinal carrier bearings supporting the outside of the tube assembly at different positions along the length. For example, tubes may be cantilevered and overall retained in pressurized surroundings wherein fluid bearing effects may be achieved via pressurized slots configured to receive ends of the tubes.

In some embodiments, a tube within a tube type construction of the turbine may provide fluid bearings at the 'hot' end, and longitudinal bearings along the length. External 'cool' end bearings may allow for a relatively strong and durable rotating assembly able to endure very high temperatures and rotational speeds. Such an assembly may be able to accommodate dirty or contaminated motive fluids ranging from gas phase fluids to full liquids with any combination in-between.

Higher efficiencies may allow for a higher feasible output at milder operating conditions. In some aspects, lower rotational frequency (RPM) of the components may be possible. Ceramic ball bearings may be used to support the rotating components, which may otherwise be inappropriate for high power output operations.

In one aspect, the disclosure describes a boundary-layer turbomachine configured to receive fluid via an inlet end and discharge the fluid via an outlet end, comprising: a plurality of ducts concentrically arranged around a longitudinal axis of the boundary-layer turbomachine between the inlet end and the outlet end to convey the fluid from the inlet end towards the outlet end, the plurality of ducts at least partially defined by corresponding duct walls configured to rotate about the longitudinal axis; and one or more flow inlets disposed at the inlet end and configured to receive the fluid into the plurality of ducts at least partially azimuthally around the longitudinal axis towards the outlet end in accordance with rotation of the duct walls of the plurality of ducts, the fluid being frictionally engaged with the duct walls to transfer mechanical energy to, or from, the fluid flowing in the plurality of ducts.

There is an increasing emphasis on increasing the energy efficiency of power generation, for reducing costs and emissions. For example, two approaches include increasing the efficiency of power generating systems and reducing heat loss from industrial processes, e.g. by converting low grade heat into usable power. ORC systems have been proposed as one way of captured low-grade heat. However, in many cases, such systems are inefficient and expensive. For example, energy may be lost in ORC systems since the working fluid may need to be condensed during the cycle.

It is found that using a plurality of boundary-layer turbines arranged in series, with possible turbine stages in-between, may obviate the need for a separate condenser. For example, one or more of these boundary-layer turbines may be able to extract low-grade heat to liquefy the working fluid, e.g. propane.

Furthermore, it is found that using such a configuration may allow the working fluid to achieve sufficiently low temperatures to act as a coolant for downstream components such as electric generators to further reduce heat loss to the environment (by preheating). Finally, the low temperatures achieved by the working fluid may allow transfer of heat from very low grade heat sources. For example, in some embodiments, heat from sea water may be harvested for energy.

In some aspects, there is disclosed a method of generating power using a working fluid configured to at least partially change phase for generating power, comprising: imparting heat to condensate to cause at least partial vaporization of the condensate to generate the working fluid; receiving the working fluid flowing at least partially azimuthally into a duct extending longitudinally between radially-separated duct walls; and driving rotatably a duct wall of the radially-separated duct walls via frictionally engaging the duct wall with the working fluid in the duct to exchange energy with the working fluid to cause condensation of the working fluid to generate the condensate.

In some further aspects, there is disclosed a system for generating power, comprising: a heater for transferring heat to condensate to generate fluid that is at least partially vaporized; a first boundary-layer turbine including a first plurality of ducts configured to receive the fluid from the heater and at least partially defined by corresponding first duct walls that are configured for drivable rotation about a longitudinal axis of the first boundary-layer turbine by the fluid frictionally dragging the first duct walls at least partially azimuthally around the longitudinal axis of the first boundary-layer turbine, the first duct walls configured to transfer energy from the fluid flowing in the first plurality of ducts; an axial turbine coupled to the first boundary-layer turbine to receive the fluid from the first boundary-layer turbine to extract energy from the fluid; and a second boundary-layer turbine coupled to the axial turbine to receive the fluid from the axial turbine into a second plurality of ducts at least partially defining the second boundary-layer turbine, the second plurality of ducts at least partially defined by corresponding second duct walls that are configured for drivable rotation about a longitudinal axis of the second boundary-layer turbine by the fluid frictionally dragging the second duct walls at least partially azimuthally around the longitudinal axis of the second boundary-layer turbine, the second duct walls configured to transfer energy from the fluid flowing in the second plurality of ducts to condense the fluid to generate the condensate for the heater.

In yet further aspects, there is disclosed a system for generating power, comprising: a heater for transferring heat to condensate to generate fluid that is at least partially vaporized; a first boundary-layer turbine including a first plurality of ducts configured to receive the fluid from the heater and at least partially defined by corresponding first duct walls that are configured for drivable rotation about a longitudinal axis of the first boundary-layer turbine by the fluid frictionally dragging the first duct walls at least partially azimuthally around the longitudinal axis of the first boundary-layer turbine, the first duct walls configured to transfer energy from the fluid flowing in the first plurality of ducts; and a second boundary-layer turbine spaced apart from and coupled to the first boundary-layer turbine to receive the fluid from the first boundary-layer turbine into a second plurality of ducts at least partially defining the second boundary-layer turbine, the second plurality of ducts at least partially defined by corresponding second duct walls that are configured for drivable rotation about a longitudinal axis of the second boundary-layer turbine by the fluid frictionally dragging the second duct walls at least partially azimuthally around the longitudinal axis of the second boundary-layer turbine, the second duct walls configured to transfer energy from the fluid flowing in the second plurality of ducts to condense the fluid to generate the condensate for the heater.

Vapor compression and liquid pumping in power generation may be a significant source of parasitic loading in a power generation system. Such parasitic loading can reduce the efficiency of power generation and impact the viability of power generation systems that are important for reducing greenhouse gas emissions. For example, power generation systems configured to extract energy from low-grade heat sources may need high efficiencies to achieve sufficient net power generation. In some cases, low-grade heat sources may include sea water.

It is found that compression and/or pumping may be achieved efficiently by using a boundary-layer turbomachine configured for multiphase compression and/or pumping. In some cases, such a boundary-layer turbomachine may also be configured for energy extraction. For example, energy extraction and compression (and/or pump) may occur in sequence in the same duct of the boundary-layer turbomachine.

In some cases, the boundary-layer turbomachine comprises a plurality of coupled bodies elongated along, circumferentially surrounding, and concentrically arranged around, a longitudinal axis for common rotation about the longitudinal axis. The cylindrical bodies may define a plurality of (elongated) annuli therebetween, wherein each of the annuli has a corresponding protrusion disposed therein. The protrusion may spirally extend around and along the longitudinal axis to draw working fluid into the respective annulus.

In some aspects, the disclosure describes a method of generating power using a working fluid configured to change phase for generating power, comprising: imparting heat to condensate to cause at least partial vaporization of the condensate to generate the working fluid; receiving the working fluid on blades of a turbine rotor to drivably rotate the turbine rotor to generate shaft power; receiving the working fluid flowing at least partially azimuthally from the turbine rotor into a duct defined between a first duct wall and a second duct wall, the first duct wall and second duct wall circumferentially extending around a longitudinal axis and elongated along the longitudinal axis, the first duct wall being radially-separated from the second duct wall; and driving rotatably the first duct wall and the second duct wall via frictionally engaging the first duct wall and the second duct wall with the working fluid in the duct to exchange energy with the working fluid to cause condensation of the working fluid to generate the condensate.

In another aspect, the disclosure describes a system for generating power, comprising: a heater for transferring heat to condensate to generate fluid that is at least partially vaporized; a first boundary-layer turbine including a first plurality of ducts configured to receive the fluid from the heater and at least partially defined by a corresponding plurality of first duct walls that are configured for drivable rotation about a longitudinal axis of the first boundary-layer turbine by the fluid frictionally dragging the first plurality of duct walls at least partially azimuthally around the longitudinal axis of the first boundary-layer turbine, the first plurality of duct walls configured to transfer energy from the fluid flowing in the first plurality of ducts; an axial turbine coupled to the first boundary-layer turbine to receive the fluid from the first boundary-layer turbine to extract energy from the fluid; and a second boundary-layer turbomachine coupled to the axial turbine to receive the fluid from the axial turbine into a second plurality of ducts at least partially defining the second boundary-layer turbomachine, the second plurality of ducts at least partially defined by a corresponding plurality of second duct walls that are frictionally engaged with the fluid and configured for drivable rotation about a longitudinal axis of the second boundary-layer turbomachine, the second plurality of duct walls configured to transfer energy to, or from, the fluid flowing in the second plurality of ducts to condense the fluid to generate the condensate for the heater.

In yet another aspect, the disclosure describes a system for generating power, comprising: a heater for transferring heat to condensate to generate fluid that is at least partially vaporized; a first boundary-layer turbine including a first plurality of ducts configured to receive the fluid from the heater and at least partially defined by corresponding first duct walls that are configured for drivable rotation about a longitudinal axis of the first boundary-layer turbine by the fluid frictionally dragging the first duct walls at least partially azimuthally around the longitudinal axis of the first boundary-layer turbine, the first duct walls configured to transfer energy from the fluid flowing in the first plurality of ducts; and a second boundary-layer turbomachine spaced apart from and coupled to the first boundary-layer turbine to receive the fluid from the first boundary-layer turbine into a second plurality of ducts at least partially defining the second boundary-layer turbomachine, the second plurality of ducts at least partially defined by corresponding second duct walls that are frictionally engaged with the fluid and configured for drivable rotation about a longitudinal axis of the second boundary-layer turbomachine, the second duct walls configured to transfer energy to, or from, the fluid flowing in the second plurality of ducts to condense the fluid to generate the condensate for the heater.

In a further aspect, the disclosure describes a turbomachine, comprising: a first body elongated along a longitudinal axis and rotatable around the longitudinal axis; a second body elongated at least partially concentrically with the first body along the longitudinal axis and coupled for common rotation with the first body, the second body arranged at least partially within the first body to define a duct extending longitudinally in-between the first body and the second body; a flow inlet configured to receive fluid at least partially azimuthally around the longitudinal axis in accordance with the common rotation of the first body and the second body, the fluid being frictionally engaged with the first body and the second body to transfer mechanical energy to, or from, the fluid; and one or more protrusions on the first body extending longitudinally at least partially along the duct and radially towards the second body in the duct to define a channel in the duct, the channel configured to receive and draw the fluid from the flow inlet into the duct.

In some instances, only a limited amount of energy may be extracted from low-grade heat sources. Low-grade heat sources include sea water. Achieving efficient energy extraction from low-grade heat sources may lead to clean, cheap, and abundant energy. For example, combustion of fossil fuels may be avoided.

It is found that a challenge in extracting energy from low-grade heat sources is that any fluid suited to receive energy from such heat sources would likely be ill-suited to provide energy (or having energy extract from them), particularly by use of expanders and other turbomachines.

This challenge may be overcome by using two-fluids: a first fluid for receiving energy from low-grade heat sources and a second fluid for providing energy (i.e. for energy extraction). The first fluid and second fluid may be fluidly isolated from one another but may be otherwise be put in energy communication via one or more heat exchangers allowing heat communication between the first fluid and second fluid.

It is found that ammonia is particularly advantageous for receiving energy (or being heated by) low-grade heat sources. Ammonia has a relatively low boiling point and may therefore be operated as part of a cryogenic cycle, which may be appropriate for extracting energy from low-grade heat sources, such as ambient or room temperature fluids. Furthermore, ammonia is suited for gaining a relatively large amount of enthalpy for relatively small changes in temperature and/or pressure. The resulting large enthalpy capacity per unit mass allows for smaller masses (and, hence, volumes) of ammonia to be used to receive energy. Pumping requirements, and associated costs, may thereby decrease. In some cases, significant efficiency gains may be realized with respect to recuperating or recovering heat from low-grade heat sources by using ammonia compared to other fluids, such as carbon dioxide or ethane.

However, extracting energy from ammonia after it has absorbed energy from low-grade heat sources may be difficult. Ammonia is ill-suited or infeasible as a working fluid in an expander due to the properties of ammonia described above that gave it advantages as a recuperating fluid. Excessively large equipment may be required to efficiently and effectively extract energy from ammonia.

A separate fluid more suited to energy extraction therefrom may be used to absorb the energy in ammonia at an intermediate stage before being used as a working fluid in an expander.

Carbon dioxide as a working fluid may allow efficient and effective extraction of energy therefrom via turbomachinery. For example, carbon dioxide has a 1:1 greenhouse effect unlike fluids such as methane, it is not combustible or flammable, and provides effective operation at low temperatures and pressures due its low temperature phase change. Cryogenic or near-cryogenic cycles may use carbon dioxide, at least partially, as a working fluid.

Thus, it is found that using two separate and isolated fluids may allow effective absorption of low-grade heat and efficient operation of expanders such as boundary-layer turbines. The pair of ammonia and carbon dioxide was found to be particularly advantageous. Ammonia may be used to absorb heat from a low-grade heat source and then may be passed through a heat exchanger to transfer heat to carbon dioxide, which then may be supplied to an expander.

In one aspect, there is disclosed a system for generating power using a first fluid and a second fluid fluidly isolated from each other, the system comprising: a heater configured to transfer heat to the first fluid to at least partially vaporize the first fluid; a first heat exchanger fluidly connected to the heater to receive the first fluid from the heater, the first heat exchanger configured to transfer heat from the first fluid to the second fluid to at least partially vaporize the second fluid; an expander fluidly connected to the first heat exchanger to receive the second fluid from the first heat exchanger and configured to rotatably drive a rotor of the expander using the second fluid; and a second heat exchanger fluidly connected to the expander to receive the second fluid from the expander and fluidly connected to the first heat exchanger to receive the first fluid from the first heat exchanger, the second heat exchanger configured to generate condensate of the second fluid by transferring heat from the second fluid to the first fluid.

In yet other further aspects, there is disclosed a method for generating power using a first fluid and a second fluid fluidly isolated from each other, the method comprising: (a) heating the first fluid to at least partially vaporize the first fluid; (b) transferring heat, in a first heat exchanger, from the first fluid to the second fluid to at least partially vaporize the second fluid; (c) rotatably driving a rotor using the second fluid to generate power; and (d) transferring heat, in a second heat exchanger, from the second fluid to the first fluid to generate condensate of the second fluid.

Advantages of boundary-layer turbomachines may include the ability to operate with multiphase fluids. For example, working fluids may operate close to their boiling points and hence may change phase within a boundary-layer turbomachine. In some cases, it may be desired to extract a liquid phase of the working fluid from the boundary-layer turbomachine, including extracting the liquid phase as it forms within ducts of the boundary-layer turbomachine. Such extraction may reduce structural loading and fatigue on the boundary-layer turbomachine, as well improve efficiencies, e.g. work may be extracted with a lower fraction of liquid phase, and energy expended towards liquefying a multiphase working fluid may be reduced.

It is found that the liquid phase may be extracted from a boundary-layer turbomachine by exploiting a centrifugal effect associated with (common) rotation of the ducts of the boundary-layer turbomachine. Centrifugal separation may be achieved by supplying slots in duct walls for bleeding the liquid phase (or other heavier phase).

In some cases. separation of the liquid from gas phase components of the working fluid may be achieved by allowing the liquid to exit at a point or multiple points down the length of the boundary-layer turbomachine, similar to a centrifugal separator/liquid knock-out.

As the liquid phase and the gas phase travel together in the boundary-layer turbomachine, separating liquid and gas phases may allow vanes, protrusions, ribs, blades, wings and other features to be configured or adapted based on the phases present in the working fluid, and their characteristics. For example, a part of a rib or protrusion and duct walls may be textured to extract more work from the liquid phase, while another part of the duct may remain smooth to enhance adhesion to remove more work from the gas phase of the working fluid.

In one aspect, there is disclosed a turbomachine, comprising: a first body elongated along a longitudinal axis and rotatable around the longitudinal axis; a second body elongated at least partially concentrically with the first body along the longitudinal axis and coupled for common rotation with the first body, the second body arranged at least partially within the first body to define a duct extending longitudinally in-between the first body and the second body; a flow inlet configured to receive fluid at least partially azimuthally around the longitudinal axis in accordance with the common rotation of the first body and the second body, the fluid being frictionally engaged with the first body and the second body to transfer mechanical energy to, or from, the fluid; a slot opening into the duct and radially spaced apart from the first body to receive a first portion of the fluid to draw the first portion of the fluid out of the duct while allowing a second portion of the fluid to remain in the duct, the first portion of the fluid being separated from the second portion of the fluid by being drawn centrifugally towards the slot relative to the second portion of the fluid; and an outlet port configured to receive the second portion of the fluid from the duct to discharge the second portion of the fluid out of the turbomachine.

In yet further aspects, there is disclosed a method of operating a turbomachine, comprising: receiving fluid at least partially azimuthally around a longitudinal axis in a duct defined between a first duct wall and a second duct wall via an inlet end of the turbomachine; frictionally engaging the fluid with the first duct wall and the second duct wall; rotating, in common, the first duct wall and the second duct wall, in accordance with the fluid; and discharging the fluid via an outlet end of the turbomachine.

Various embodiments can include combinations of the above described features.

Further details of these and other aspects of the subject matter of this application will be apparent from the detailed description included below and the drawings.

DESCRIPTION OF THE DRAWINGS

Reference is now made to the accompanying drawings, in which:

FIG. 5A is a top elevation view of the plurality of tubes coupled to the header block, showing schematic flow directions;

FIG. 5B is an enlarged view of areas 5B-1 and 5B-2 in FIG. 5A;

FIG. 5C is an enlarged view of area 5C in FIG. 5A;

FIG. 7 is a perspective view of velocity contours and streamlines in exemplary ducts of the plurality of ducts of an exemplary boundary-layer turbomachine;

FIG. 16E is an internal side elevation view of the boundary-layer turbine of FIG. 16D, in accordance with an embodiment;

FIG. 16F is an enlarged view of the internal side elevation view of the boundary-layer turbine as shown in FIG. 16E, showing a clearance between the header block and a tube, in accordance with an embodiment;

FIG. 16G is an enlarged perspective view of the header block and an adjacent tube of the boundary-layer turbine of FIG. 16D, in accordance with an embodiment;

FIG. 16H is an internal perspective view of the header block and the adjacent tube of the boundary-layer turbine of FIG. 16D, wherein an outer housing of the header block is omitted to shown internal channels formed in the header block, in accordance with an embodiment;

FIG. 16I is an internal side elevation view of the header block and the adjacent tube of the boundary-layer turbine of FIG. 16H, in accordance with an embodiment;

FIG. 17A is a schematic cross-section of a duct parallel to a longitudinal axis, in accordance with an embodiment;

FIG. 17B is a schematic radial cross-section of the duct of FIG. 17A at a first longitudinal position, in accordance with an embodiment;

FIG. 17C is a schematic radial cross-section of the duct of FIG. 17A at a second longitudinal position, in accordance with an embodiment.

FIG. 21A is an enlarged view of region 21A in FIG. 20B;

FIG. 21B is an enlarged view of region 21B in FIG. 20B;

FIG. 24 is an exploded view of bodies of a boundary-layer pump-turbine, in accordance with an embodiment;

FIG. 25A is a perspective view of a body of the boundary-layer pump turbine of FIG. 24;

FIG. 27 is a side elevation view of a body, in accordance with yet another embodiment;

FIG. 28 is a side elevation view of a body, in accordance with yet another embodiment;

FIG. 29 is a flowchart of an exemplary method of generating power using a working fluid configured to change phase, at least partially, for generating power;

FIG. 31 is a perspective view of a system using boundary-layer turbomachines, in accordance with an embodiment;

FIG. 32A is a cross-sectional view of the system of FIG. 31, in accordance with an embodiment;

FIG. 32B is an enlarged view of region 32B in FIG. 32A, in accordance with an embodiment;

DETAILED DESCRIPTION

Figure 1B:
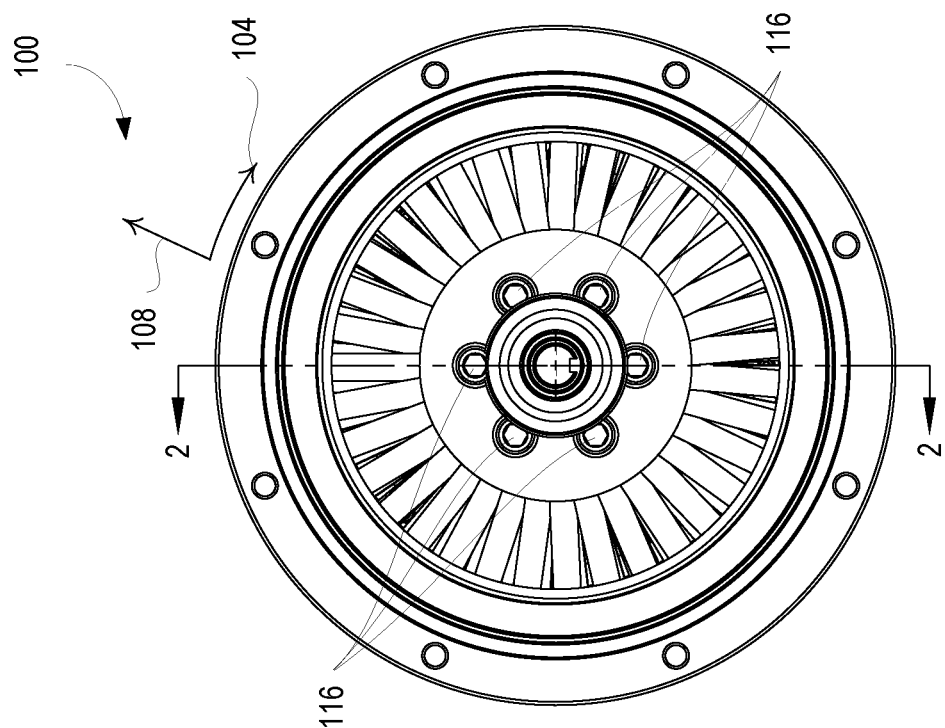
FIG. 1B is a front elevation view of the boundary-layer turbomachine.

The following disclosure relates to turbomachines, and in particular boundary-layer turbomachines. In some embodiments, the assemblies and methods disclosed herein can facilitate more efficient generation of shaft power compared to existing turbines.

Boundary-layer turbomachines operate based on a boundary-layer effect, wherein a layer of fluid closest to a moving surface is constrained to move with the surface (due to the no-slip condition). Establishing fluid flow relative to a surface imparts force on the surface. Boundary-layer turbomachines may be more efficient that other types of turbomachines. In various embodiments, boundary-layer turbomachines may be over 20% or over 40% more efficient. Additionally, boundary-layer turbomachines may comprise fewer parts or fewer "moving parts", and therefore may be easier and cheaper to construct, repair, and maintain.

In some cases, exemplary boundary-layer turbines may be especially useful for achieving desired efficiencies from systems based on a Rankine cycle, e.g. an Organic Rankine Cycle (ORC), or thermodynamic cycles wherein (high density) supercritical fluids are used. In various embodiments, the working fluid of the turbine may be a hydrofluorocarbon (HFC), perfluorocarbon (PFC), or a hydrocarbon such as isobutane, pentane, propane, or supercritical (superheated) $CO_2$.

In an exemplary boundary-layer turbomachine, a drum or tube may be made to rotate about its long axis by having fluid flow past its outer surface azimuthally around the long axis. A boundary-layer forms over the drums surface, acting as a momentum sink and causing transfer of energy from the fluid to the drum in the form of rotational energy, e.g. as may be desired from a turbine operating by extracting energy from working fluid. Such fluid flow over the drum may generally have a radial extent, wherein the radially-inner end of the flow transmits energy to the drum. It is desirable to extract energy from other (more radially distanced) portions of the fluid flow.

Additional energy may be extracted from the fluid flow by ensconcing the original drum within and in axial alignment with a larger drum having an inner surface in contact with the fluid flow. In this case, momentum may also be extracted at a radially-outer end of the fluid flow. In such a manner, a plurality of drums may be ensconced within and in alignment with each other to define a plurality of fluid channels (ducts or at least partially closed conduits) for (azimuthally) injecting fluid therein to drive the drums. The drums may be constrained in common rotation, e.g. by being cross-coupled using an end plate 232 or rotating head. In various embodiments, exit fluid flow from the channels may yet comprise an azimuthally component or a significant azimuthal component. In various embodiments, an opposite end of the drums from the end plate 232 may be supported by fluid bearings built into the boundary-layer turbomachine to allow rotation and prevent contact between the drums and other components, e.g. the fluid bearings may be open ended cavities retaining pressurized working fluid and thus may not require additional components.

In various embodiments, it is found that increasing the number, length, and/or average radii of the channels may increase energy extraction from the fluid flow. In some embodiments, it is found that arbitrarily increasing the number, length, and/or average radii of the channels may not commensurately increase energy extraction from the fluid flow. In some embodiments, energy extraction may be decreased beyond a certain point. For example, it is found that energy extracted via some channels may be used to drive other channels as pumps.

Energy extracted from the fluid flow may be increased by placing additional turbine stages that are compatible with the boundary-layer turbomachine. For example, in some embodiments, a plurality of blades oriented to receive azimuthally oriented fluid flow are placed downstream of adhesion surfaces of the boundary-layer turbine. The plurality of blades may be integrally formed with the adhesion surfaces (e.g. in unitary construction therewith) for common rotation, thereby reducing the number of moving parts and retaining advantages of the boundary-layer turbine. In some embodiments, the plurality of blades are manufactured by additively "growing" structures on to downstream end portions of the adhesion surfaces, and disposed inside the channels, at downstream ends thereof. In some embodiments, additional turbine stages may be placed further downstream. For example, an axial impulse or reaction turbine stage may be placed downstream of the plurality of blades. The axial turbine stage may be compatible with the fluid flow coming off the plurality of blades. The blades of the axial turbine may be oriented to receive axially oriented flow from the plurality of blades.

In some embodiments, the additional efficiency may facilitate achieving desired power output from the boundary-layer turbine at less mechanically taxing (or more mild) conditions, such as at lower rotational frequencies, temperatures, and/or pressures. Thus, exemplary boundary-layer turbines may be easier and cheaper to construct, repair, and maintain. In some cases, lower rotational frequencies may be compatible with use of contact bearings, e.g. ceramic ball bearings, for supporting shafts (power shafts) of the boundary-layer turbine. In some embodiments, the boundary-layer turbine may be operable without (isolated or closed) pressurized hydraulic bearings, e.g. those configured for high-RPM applications. In some embodiments, material warping may be reduced.

In various embodiments, exemplary boundary-layer turbomachines may operate between 20,000 RPM and 100,000 RPM, or between 2,000 RPM and 20,000 RPM. In some embodiments, the boundary-layer turbine may operate at a lower overall temperature, e.g. between 75° C. and 1000° C., such as due to the lower rotational frequency. In some embodiments, pressurized (working) fluid may enter the boundary-layer turbomachine at temperatures between 50° C. and 1000° C. and pressures between 50 psi and 10,000 psi. In some embodiments, the (working) fluid may leave the boundary-layer turbomachine at between temperatures between 1° C. and 500° C. and pressures between 0 psi and 2000 psi.

In some embodiments, the boundary-layer turbomachine may be used to extract energy from relatively lower temperature fluids. In some embodiments, the boundary-layer turbomachine may receive working fluid at less than 50° C. and issue working fluid at less than 50° C. For example, the working fluid may be around room temperature when received into the boundary-layer turbomachine and may be (further) subcooled when issued therefrom.

In some embodiments, the working fluid may remain in a single phase (liquid or gas), e.g. in some embodiments of hydraulic pumps and motors. In various embodiments, the working fluid may configured to undergo an at least partial (or total, in some cases) change of phase from the inlet to the outlet of the boundary-layer turbomachine, which may result in greater energy transfer. In some embodiments, the working fluid at the inlet may be liquid or (relatively higher density) supercritical and may be gaseous or (relatively lower density) supercritical at the outlet.

Exemplary boundary-layer turbines are discussed herein, e.g. as referenced above. It is understood that boundary-layer turbomachines may include turbines as well as pumps, compressors, and other turbomachines wherein power is transferred between (to or from) a fluid and a shaft. For example, in some embodiments, a pump may involve an opposite direction of rotation (compared to a turbine) and/or a change in the configuration of blades and axial-flow stages.

Aspects of various embodiments are now described by reference to the figures.

Figure 1A:
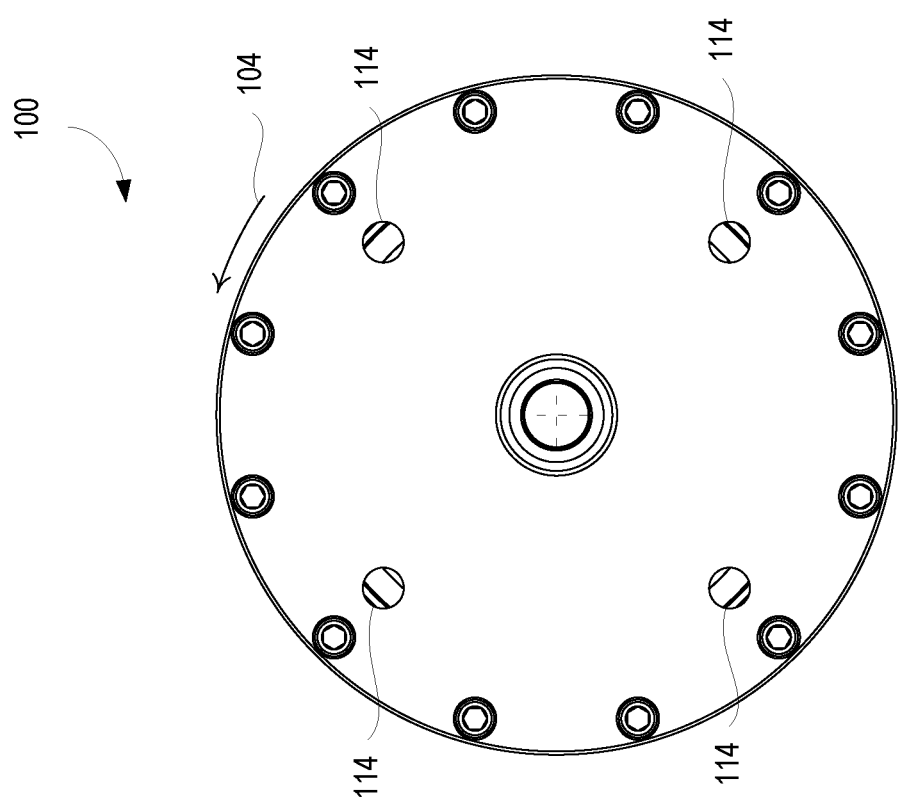
FIG. 1A is a rear elevation view of an exemplary boundary-layer turbomachine.
Figure 1C:
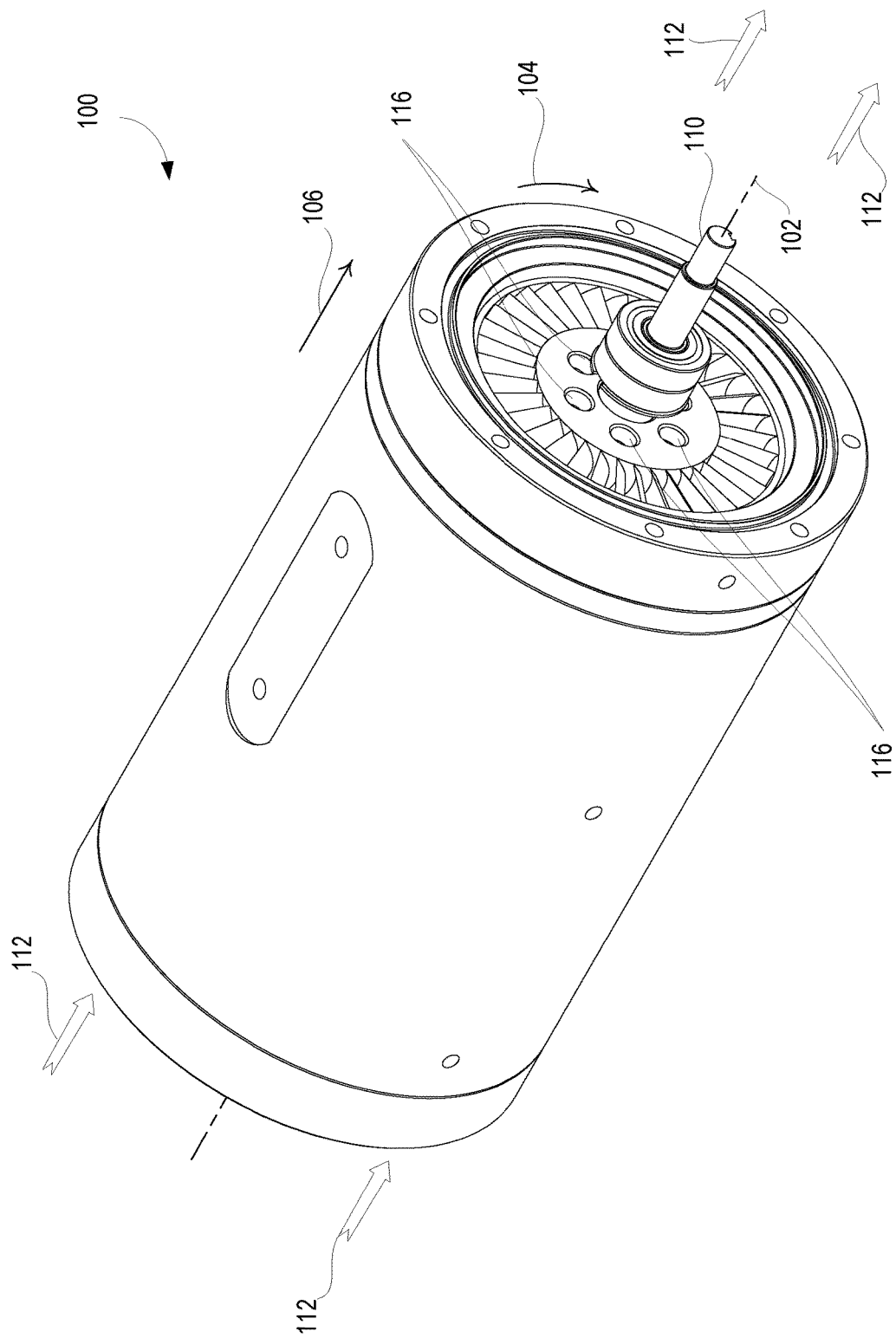
FIG. 1C is a perspective view of the boundary-layer turbomachine.

FIG. 1A-1C are various views of an exemplary boundary-layer turbomachine 100. The boundary-layer turbomachine 100 may be coupled to a shaft 110 for transmitting power between a fluid 112 and the shaft 110.

FIG. 1A is a rear elevation view of the boundary-layer turbomachine 100. FIG. 1B is a front elevation view. FIG. 1C is a perspective view.

For example, the boundary-layer turbomachine 100 may be a boundary-layer turbine wherein the fluid 112 is a working fluid, wherefrom energy is extracted to rotatably drive the shaft 110 around a longitudinal axis 102. The boundary-layer turbine transfers power from the working fluid to the shaft 110 to generate shaft power. In some embodiments, the shaft may have a diameter approximately 1". In some embodiments, the shaft diameter may range between 0.25" to 8" to 10", depending on structural requirements and power transmitted by the shaft 110.

The fluid may generally flow longitudinally (in a longitudinal direction 106), along the longitudinal axis 102, and azimuthally, in an azimuthal direction 104 oriented laterally around the longitudinal axis 102, through the boundary-layer turbomachine 100. It is conceived that in some embodiments, the boundary-layer turbomachine 100 may be a boundary-layer compressor or pump.

The fluid may be received into the boundary-layer turbomachine 100 via inlet ports 114 situated at an upstream end of the boundary-layer turbomachine 100 to be subsequently expelled out via outlet ports 116 situated at a downstream end of the boundary-layer turbomachine 100.

In various embodiments of boundary-layer turbines, the fluid at the inlet ports 114 may be at a high pressure and/or temperature than fluid at the outlet ports 116. In some embodiments, the fluid may undergo a phase transition across the boundary-layer turbomachine 100 to enhance transfer of energy between the fluid and the boundary-layer turbomachine 100. In some embodiments, the fluid at the inlet ports 114 is pressurized and is in a higher density supercritical state or a liquid state, while the fluid at the outlet ports 116 is in a, relatively lower pressure or depressurized, low density gaseous phase. In some embodiments, the fluid at the inlet ports 114 or the outlet ports 116 may be multiphase, e.g. due to condensing conditions wherein the fluid may be gaseous with a liquid phase dispersed therein.

In various embodiments, without being held to a particular theory of operation, it is understood that boundary-layer turbomachines may transfer energy or transmit power between the shaft 110 and the working fluid via a boundary-layer effect or an adhesion principle at least partially or in a relatively major proportion.

For example, the exemplary boundary-layer turbomachine 100 may be a hybrid boundary-layer turbine comprising bladeless boundary-layer turbine section(s) and bladed rotor turbine section(s), such as the bladed (axial-flow) rotor 228, which may be a bladed rotor of an axial turbine stage. In some embodiments, the hybrid boundary-layer turbomachine may comprise an assembly of multiple turbine stages operably integrated as a single unit, including having a common housing for the various stages.

The longitudinal axis 102 of the boundary-layer turbomachine 100 may generally reference a sequential arrangement of rotors and stator sections of the boundary-layer turbomachine 100 and an overall flow of the fluid therethrough. For example, the longitudinal axis 102 may be a rotational axis of rotors of the boundary-layer turbomachine 100, and/or define an axis of (continuous or discrete) symmetry of stators of the boundary-layer turbomachine 100. In some embodiments, the shaft's rotational axis may also coincide with the longitudinal axis 102. It is conceived that the flow of fluid may change orientation in particular sections of the boundary-layer turbomachine 100 or may be turbulent.

The azimuthal direction 104 may be generally laterally oriented around the longitudinal axis 102. For example, a point on a rotor may azimuthally trace a path around the longitudinal axis 102 when in rotation. A radial direction 108 may be oriented bi-laterally to both the longitudinal axis 102 and the azimuthal direction 104.

In various embodiments, the boundary-layer turbomachine 100 may extend radially between 10" to 12". In various embodiments, an outer diameter may vary between 2" or less to 48" or greater.

Figure 2:
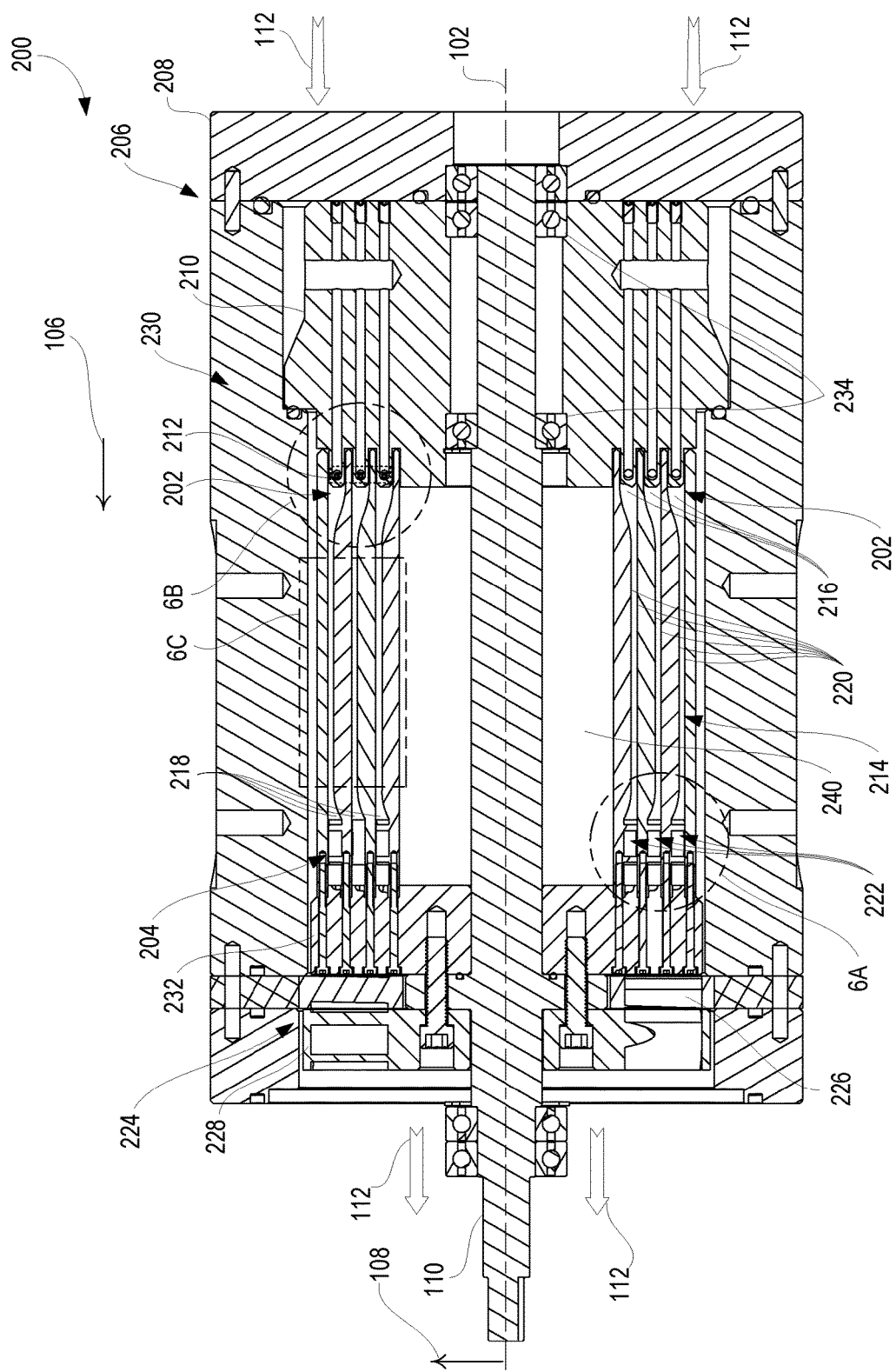
FIG. 2 is a cross-sectional view of the boundary-layer turbomachine along the reference line 2-2 in FIG. 1B.

FIG. 2 is a section 200 (cross-sectional view) of the boundary-layer turbomachine 100 along the reference line 2-2 in FIG. 1B.

In generally sequential order, the boundary-layer turbomachine 100 may comprise a (stationary) header section 206, one or more flow inlets 212, a plurality of ducts 214, a plurality of blade assemblies, an axial stage 224 which may be an axial turbine stage, and one or more structures, including a supporting structure 230 and a housing portion.

The header section 206 may include a header plate 208 and a header block 210, which may be integrated together, e.g. via fasteners, or in unitary construction. In various embodiments, the header section 206 may remain stationary during operation, e.g. during rotation of the shaft 110.

The boundary-layer turbomachine 100 receives the fluid via an inlet end 202 of the boundary-layer turbomachine 100 and discharges the fluid from the outlet ports 116 via an outlet end 204 of the boundary-layer turbomachine 100. The inlet ports 114 of the boundary-layer turbomachine 100 may be formed at least partially in the header plate 208 and may be configured to channel fluid toward the inlet end 202, via the header section 206.

The one or more flow inlets 212 are disposed at the inlet end 202. In some embodiments, the one or more flow inlets 212 may be substantially disposed at or extend into upstream ends 216 of the plurality of ducts 214. The one or more flow inlets 212 are configured to draw the fluid into the plurality of ducts 214 at least partially azimuthally around the longitudinal axis 102 towards the outlet end 204. Flows having azimuthal flow orientation may (mutually exert) drag on the duct walls 220 to transfer energy between the flow and the (rotating) duct wall. For example, in a boundary-layer turbine, such an azimuthal flow orientation imparts rotation to the duct walls 220 to rotatably drive the shaft 110. In a boundary-layer pump or compressor, rotation of the duct walls 220 (via the shaft 110) draws fluid into a corresponding duct towards the outlet end 204. In some embodiments, one or more flow inlets 212 may direct the fluid at a partially radial angle to cause jet impingement on duct walls and/or create a fluid bearing seal or sealing between adjacent ducts of the plurality of ducts 214 based on pressurization of ducts.

In some embodiments, the one or more flow inlets 212 include at least two flow inlets positioned antipodally to balance a force on the duct walls 220. In some embodiments, every flow inlet of the one or more flow inlets 212 include an opposing flow inlet positioned antipodally to improve a balance of the boundary-layer turbomachine 100.

The plurality of ducts 214 may be positioned downstream of the header block 210 and connected thereto or in immediate proximity thereof. For example, in some embodiments the plurality of ducts 214 may include between two and five radially-spaced apart ducts. In some embodiments, the plurality of ducts 214 are three ducts. For larger diameter turbomachines, the plurality of ducts 214 may include more than five ducts. For example, a boundary-layer turbomachine 100 with outer diameter approximately 48" or greater may have up to 24 ducts.

In various embodiments, the header section 206 may be a multipressure or multiflow header section. In some embodiments, the header section 206 may supply each duct with fluid separately, e.g. the thermodynamic condition of the fluid entering each duct of the plurality of ducts 214 may be different or adjustable. For example, in some embodiments, the fluid entering a radially-outer duct may have a higher or lower pressure than the fluid entering a (relatively) radially-inner duct.

The plurality of ducts 214 are concentrically arranged or nested around the longitudinal axis 102 between the inlet end 202 and the outlet end 204 to thereby convey the fluid therebetween, from the inlet end 202 towards the outlet end 204. The plurality of ducts 214 may be closed conduits elongated from an upstream end 216 to a downstream end 218 (which may refer to one or more upstream and downstream ends, respectively), and configured to rotate around the longitudinal axis 102. Additional components, including channels and conduits, may be disposed between the inlet end 202 and the upstream end 216, and the outlet end 204 and the downstream end.

The plurality of ducts 214 are at least partially defined by corresponding duct walls 220, i.e. a plurality of radially-spaced apart duct walls 220. For example, each duct may be defined by two duct walls extending longitudinally, i.e. along the longitudinal axis 102, and defining a duct in a radial clearance (radially extending gap) therebetween.

The duct walls 220 of the plurality of ducts 214 define a plurality of rotors configured to rotate about the longitudinal axis 102. Thus, the plurality of ducts 214 may be said to rotate about the longitudinal axis 102. The plurality of rotors are drivably coupled to the shaft 110 to transfer energy between the shaft 110 and the fluid flowing in the plurality of ducts 214.

A plurality of blades 222 may be drivably coupled to the shaft 110. The plurality of blades 222 may define blade assemblies of the plurality of blade assemblies drivably coupled to the shaft 110, and may be coupled to the shaft 110 each individually or as blade assemblies integrated with a central hub.

In some embodiments, each blade assembly may be disposed in a corresponding duct downstream of the one or more flow inlets 212. In some embodiments, each duct may have a blade assembly therein such that a plurality of ducts 214 define therein the plurality of blade assemblies.

The plurality of blades 222 may be rotatably disposed around the longitudinal axis 102 at a downstream end of a corresponding duct. In various embodiments, the plurality of blades 222 may extend longitudinally from the downstream end, towards or away from the upstream end 216. In some embodiments, the plurality of blades 222 may be arranged in a single row, e.g. a single row of blades in each duct of the plurality of ducts 214. A row of blades may be substantially arranging along a common longitudinal position. A single row of blades may include blades circumferentially adjacent or non-overlapping.

The plurality of bladed assemblies and plurality of ducts 214 with duct walls 220 may be integrally formed as part of a hybrid boundary-layer turbine, wherein the plurality of ducts 214 form a fluid adhesion (or boundary-layer) portion and the plurality of blades 222 form a bladed turbine portion.

In some embodiments, an axial stage 224 may be disposed downstream of the plurality of blades 222. The axial stage 224 may be drivably coupled to the shaft 110. For example, in some embodiments of boundary-layer turbines, the axial stage 224 may include one or more axial-flow stators and axial-flow rotors, which together may form the axial stage 224. An axial-flow stator 226 may be disposed between the plurality of blades 222 an axial-flow rotor 228. Such an axial-flow stator 226 may form nozzle-like passages and/or may include flow straightening vanes. In various embodiments, the axial-flow rotor 228 may longitudinally extend approximately 0.8" or more. The axial stage 224 may be configured to achieve desired efficiency targets and energy extraction from the fluid, depending on characteristics such as velocity, pressure, and shaft/vane rotational speeds. In various embodiments, axial stages may have adapted vane sizes, vane shapes, and vane angles (such as angle of attack).

In various embodiments, additional turbine stages, such as additional axial-flow stages, may be disposed downstream of the axial stage 224 to extract more energy from the fluid or achieve greater efficiencies. The length, shape, and other configuration of stages and blades formed therein may be adjusted to achieved desired power generation and preventing stalling.

The shaft 110 may be disposed coaxially with the plurality of ducts 214. In some embodiments, the shaft 110 may be disposed concentrically and radially inwardly of the plurality of ducts 214 such that it is circumferentially surrounded by the plurality of ducts 214. In various embodiments, such an arrangement may lead to a compact turbine, with fewer components. In some embodiments, the shaft 110 is disposed coaxially with the plurality of rotors (defined by the ducts walls) to substantially co-rotate with the plurality of rotors, at a substantially similar rotational frequency to one or more of the plurality of rotors.

For example, the shaft 110 may be disposed coaxially inside an inner cavity 240 at least partially defining a radially-innermost duct wall or duct of the plurality of ducts 214. The inner cavity 240 may be defined by a tube disposed radially-inwardly of the plurality of ducts 214 and defining a radially-inner wall of the radially-innermost duct.

The one or more structures may be generally disposed around the plurality of ducts 214 and upstream and downstream thereof, and may be used to support and cooperate with various parts of the boundary-layer turbomachine 100. In some embodiments, a (supporting or not) structure of the one or more structures at least partially houses the plurality of ducts 214 (rotors).

A supporting structure 230 may be supported by the shaft 110 via bearings disposed therebetween to allow rotation of the shaft 110 relative to the supporting structure 230. The structure may transmit certain vibrations and may prevent rotation with the plurality of rotors. In some embodiments, the supporting structure 230 may sealingly enclose the plurality of ducts 214 at upstream ends 216 thereof.

In some embodiments, the header block 210 may form part of the supporting structure 230, and may also route flow therethrough from the inlet ports 114.

An end plate 232 may be disposed downstream of the plurality of blade assemblies. The end plate 232 may simultaneously couple to the plurality of the duct walls 220, e.g. via threadable fasteners defining substantially fixed joints, to lock the plurality of duct walls 220 (the plurality of rotors) in common rotation. The end plate 232 may also be coupled additionally to the shaft 110 to engage the plurality of rotors (the plurality of duct walls 220) and the shaft 110 in common rotation. Thus, the plurality of rotors may substantially rotate in the same direction and may be constrained to rotate at a substantially similar rotational frequency, which may be similar to a rotational frequency of the shaft 110.

The axial-flow stator 226 may be disposed immediately downstream of the plurality of blade assemblies and upstream of the axial-flow stator 226. In some embodiments, the axial-flow rotor 228 may be coupled to the shaft 110 via the end plate 232. The axial-flow stator 226 may be coupled or fastened to the (stationary) supporting structure 230 and may be separated from the shaft 110 via a clearance spacing to maintain a stationary position during rotation of the shaft 110 (and the plurality of rotors). For example, for an annulus-shaped axial-flow stator 226, the axial-flow rotor 228 disposed downstream of the axial-flow stator 226 may protrude across the axial-flow stator 226 to couple (e.g. threadably fasten) directly to the shaft 110 via a shaft flange extending radially outwardly from the center of the shaft 110. The axial-flow rotor 228 may thus engage with the shaft 110 and the plurality of rotors in common rotation, it may have a substantially similar rotational frequency thereto.

In some embodiments, the structure may be configured to rotatably support the shaft 110 in-place relative to the structure using bearings 234. In some embodiments, the rotational frequency of the shaft 110 may be sufficiently low to facilitate support of the shaft 110 by the structure via cost-effective bearings coupled to the shaft 110 and disposed between the structure and the shaft 110. For example, such bearings may include rotary contact (friction) bearings, e.g. ceramic ball bearings or silicon nitride ball bearings. In some embodiments, hydraulic, magnetic, or foil-air bearings may be used. In some embodiments, SKF™ S7004 CD/P4A contact bearings may be used.

In some embodiments of the boundary-layer turbine 100, the plurality of rotors may be configured to generate 50-100 kW of shaft power transmitted directly to the shaft at no more than 43,000 RPM or between 15,000 RPM and 30,000 RPM. In some embodiments, a smaller boundary-layer turbomachine 100 may be configured for higher rotational frequencies while a larger boundary-layer turbomachine 100 may be configured for lower rotational frequencies. For example, in some embodiments, a smaller boundary-layer turbomachines 100 may output no more than 2 kW. For such RPM ranges, an example range of torque generated by an exemplary boundary-layer turbine may be between 5 ft-lb and 50 ft-lbs. Such relatively large torques may be achievable at low RPM by higher efficiencies facilitated by aspects of the present disclosure. For example, in some embodiments, efficiencies may be 5% to 50% greater compared to baseline turbomachines comprising radial and axial turbines only. In some embodiments, overall total energy efficiencies may exceed 50%. In some cases, energy efficiencies may reach up to 75%.

In some embodiments of the boundary-layer turbine 100, the fluid received through inlet ports 114 may be supercritical $CO_2$ at temperatures between 100° C. to 150° C. at pressures between 2500 psi to 5000 psi, or between 1500 to 6000 psi and the fluid passed through the outlet ports 116 may be at 80° C. or lower and pressures between 600-800 psi.

Outlet pressures and temperatures may depend on conditions downstream of the boundary-layer turbine 100 since otherwise positive-flow through the boundary-layer turbomachine 100 may not be established. In some embodiments, $CO_2$ may undergo at least partial (or complete) phase change. In some embodiments, the fluid may be a refrigerant and may flash in the boundary-layer turbine 100.

Fluid properties at various positions in an exemplary turbine embodiment of a boundary-layer turbomachine 100 is shown in Table 1. Position A may be upstream of position B, which may be at or adjacent to the inlet end 202 or the inlet ports 114. Position B may be downstream of the position C, which may be at or adjacent to the outlet end 204 or the outlet ports 116.

TABLE 1

| | Position | Quality | Phase |
|---|---|---|---|
| A | Upstream of inlet | — | Supercritical |
| B | Inlet | — | Supercritical |
| C | Outlet | Subcooled | Liquid |
| D | Downstream of outlet | Subcooled | Liquid |

Additional $CO_2$ fluid properties in the exemplary turbine embodiment discussed in Table 1, including coefficient of pressure (recovery) $C_p$, are tabulated in Table 2. The specific volume associated at these positions may computed as the inverse of the density.

TABLE 2

| | Temperature (° F.) | Pressure (PSI-G) | Density (lbm/ft³) | Specific internal energy (BTU/lbm) | $C_p$ |
|---|---|---|---|---|---|
| A | 119.15 | 2500 | 47.292 | 120 | 0.61942 |
| B | 250 | 2500 | 20.884 | 187.15 | 0.44293 |
| C | 79.603 | 950 | 42.869 | 116.88 | 1.9239 |
| D | 78.427 | 950 | 44.109 | 115 | 1.5306 |

In a supercritical or multiphase state, the fluid may have properties of both liquid and vapor or may have liquid and vapor properties. Liquid and vapor properties in the exemplary turbine embodiment discussed in Table 1 are shown in Table 3.

TABLE 3

| | Component | Density (lbm/ft³) | Specific internal energy (BTU/lbm) | $C_p$ |
|---|---|---|---|---|
| A | Liquid | — | — | — |
|   | Vapor | 47.292 | 120 | 0.61942 |
| B | Liquid | — | — | — |
|   | Vapor | 20.884 | 187.15 | 0.44293 |
|   | Liquid | 42.869 | 116.88 | 1.9239 |
| C | Vapor | Subcooled | Subcooled | Subcooled |
| D | Liquid | 44.109 | 115 | 1.5306 |
|   | Vapor | Subcooled | Subcooled | Subcooled |

Lower rotational frequencies may benefit from milder operating conditions, e.g. more cost-effective bearings may be used. In some embodiments, rotational frequencies may exceed 100,000 RPM. For example, in some embodiments, boundary-layer turbomachines 100 with outer diameters that are smaller may have corresponding higher rotational frequencies.

In various embodiments, the upstream end 216 and the downstream end 218 may refer to the corresponding ends of an adhesion portion of the boundary-layer turbomachine 100, e.g. a contiguously formed adhesion portion, which may be in unitary construction. The inlet end 202 and the outlet end 204 refer to ends of the boundary-layer turbomachine 100 defining an adhesion portion and a bladed portion, e.g. an adhesion portion and a bladed portion that may be in unitary construction, as may be the case in a hybrid turbine.

In various embodiments, an internal volume of the boundary-layer turbomachine 100 extending from the inner cavity 240 to the radially-outermost duct of the plurality of ducts 214 may be submerged or inundated with fluid, e.g. the working fluid, which may be pressurized fluid. Such an inundated volume may, in part, provide lubrication and support for components of the boundary-layer turbomachine 100.

Figure 3A:
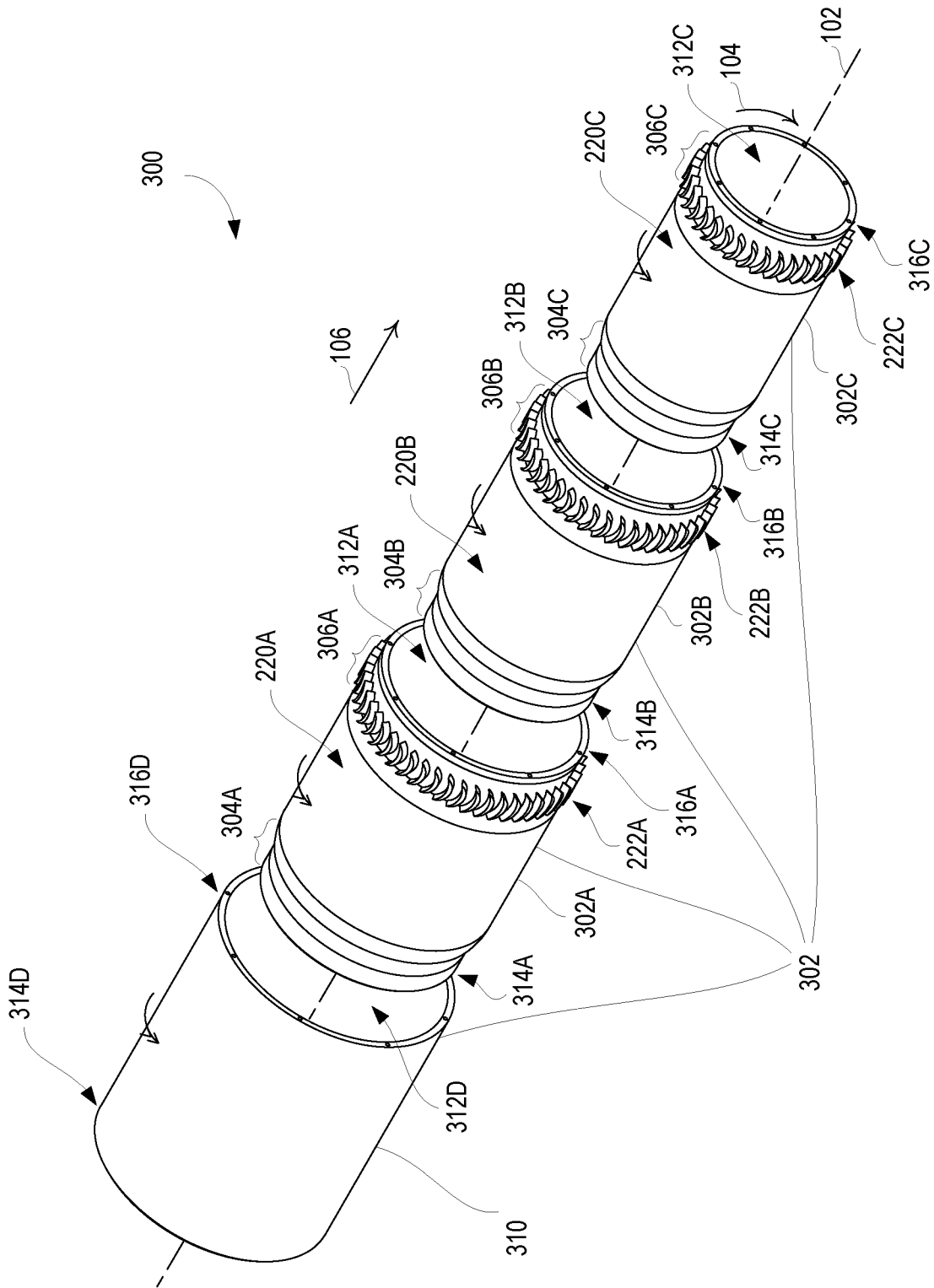
FIG. 3A is an exploded perspective view of a plurality of rotors of the boundary-layer turbomachine defined at least partially by a plurality of tubes.

FIG. 3A is an exploded perspective view of the plurality of rotors 300 defined at least partially by a plurality of tubes 302. The plurality of rotors 300 are shown exploded along the longitudinal axis 102.

Figure 3B:
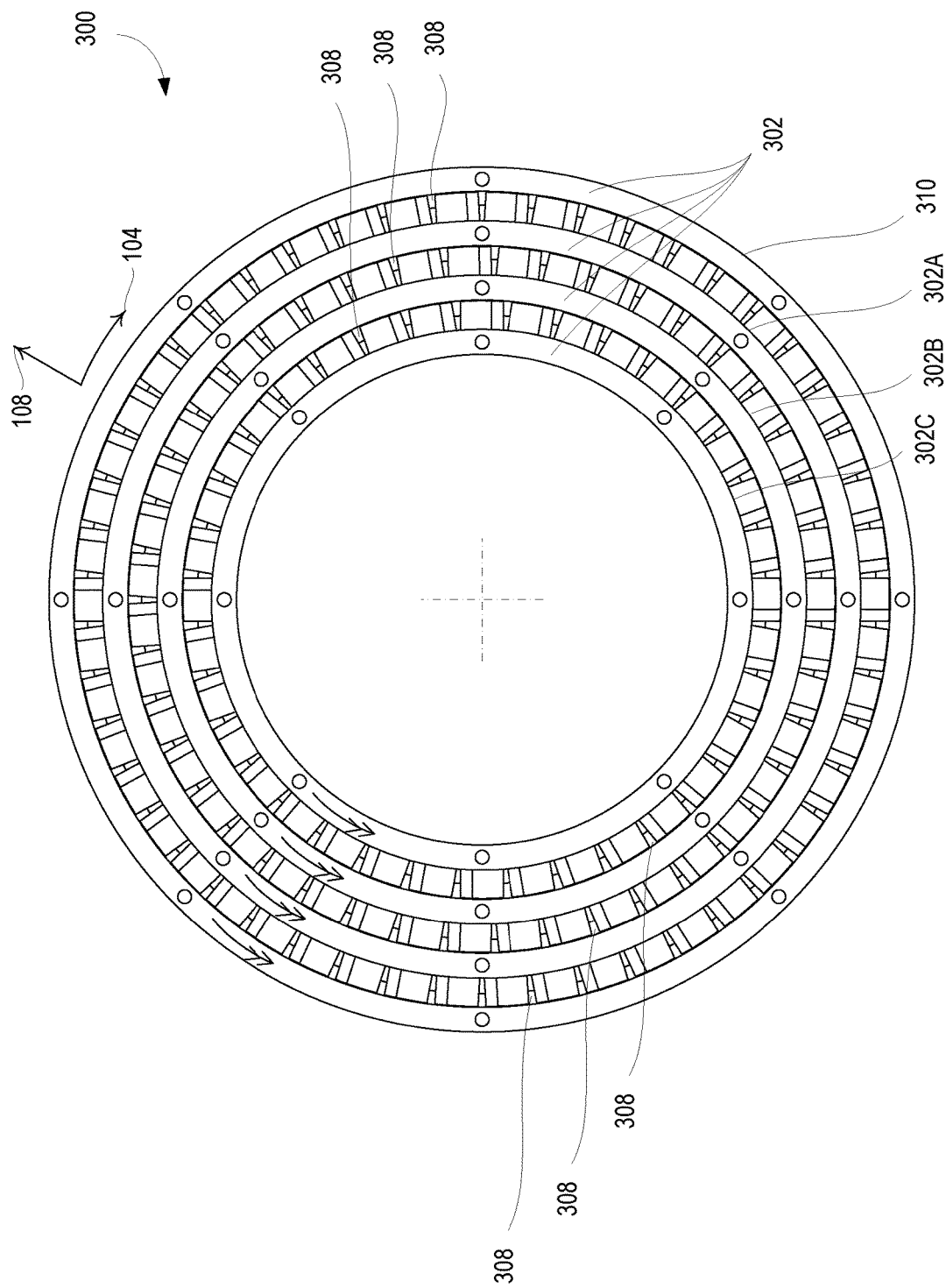
FIG. 3B is a front elevation view of the plurality of rotors.

FIG. 3B is a front elevation view of the plurality of rotors 300.

Directions of rotation of the plurality of rotors are indicated by double-headed arrows. The plurality of tubes 302 may be configured to be drivably coupled to the shaft 110 to cause such rotation or to thereby cause rotation in the shaft 110 to generate shaft power.

In some embodiments, the plurality of tubes 302 may be circular tubes having a substantially circular cross-section lateral to the longitudinal axis 102. In some embodiments, plurality of tubes 302 may include shaped surfaces or longitudinal sloped configurations. For example, in some embodiments, each tube of the plurality of tubes 302 may be diverging or converging, i.e. have a cross-section lateral to the longitudinal axis 102 that is, respectively, increasing or decreasing along the longitudinal axis 102 towards the outlet end 204. In various embodiments, energy or power extraction may be enhanced by shaping or sloping one or more of the plurality of tubes 302, or embedding a pattern in the surface(s) of one or more of the plurality of tubes 302 to increase and/or decrease the gap across the length of the tube as the fluids move towards blades (e.g. plurality of blades 222).

Each tube (310, 302A, 302B, or 302C) of the plurality of tubes 302 may be generally longitudinally elongated and may have tapered or pinched longitudinal ends (upstream end portion 304A, 304B, 304C and downstream end portion 306A, 306B, 306C), e.g. with generally smaller cross-sectional areas. Each tube may define a corresponding radially-inner space (312A, 312B, 312C, 312D) lateral to the elongation direction. For example, wall thicknesses of the plurality of tubes 302 may vary from 0.3" near the longitudinal centers to 0.1" at one or more pinched longitudinal ends.

The radially-inner spaces may define progressively larger cross-sectional areas lateral to the longitudinal axis 102. Each radially-inner space may be adapted to accommodate a relatively smaller tube of the plurality of tubes 302 to form a sequence or hierarchy of tubes fitting within each other. The plurality of tubes 302 may thus be nested concentrically around the longitudinal axis 102. Portions of the radially-inner spaces may define the plurality of ducts 214. For example, each of the radially-inner spaces 312D, 312A, 312B, may define a corresponding duct bounded at a radially-inner end by the respective duct wall 220A, 220B, 220C of the corresponding tube 302A, 302B, 302C.

In various embodiments, the radially-inner spaces 312A, 312B, 312C, 312D may be cylindrical spaces having respective diameters of approximately 5.2", 4.4", 3.6", and 6". In various embodiments, each of the plurality of tubes 302 may longitudinally extend between 7" and 8".

The plurality of tubes 302 may be generally concentrically spaced apart from each other, in the radial direction 108. Each duct of the plurality of ducts 214 may be formed in the resulting clearance between a pair of concentrically adjacent tubes of the plurality of tubes 302. In some embodiments, each pair of concentrically adjacent tubes forms therebetween a corresponding duct of the plurality of ducts 214. Thus, each duct of the plurality of ducts 214 is at least partially defined by a corresponding duct wall 220A (or 220B, 220C) commonly shared with a corresponding concentrically adjacent duct.

One or more of the plurality of ducts 214 may have an annular-shaped cross-section lateral to the longitudinal axis 102 (e.g. circular annular shapes), to form a sequence of concentric annuli having coincident edges. The resulting plurality of ducts 214 may be thereby rendered relatively compact, which may thereby reduce cost of manufacturing and improve performance. For example, a first duct formed in the radially-inner space 312D may share the duct wall 220A with a second duct formed in the radially-inner space 312A, and the second duct in turn may share the duct wall 220B with a third duct formed in the radially-inner space 312B.

Each tube 302A, 302B, 302C, 302D of the plurality of tubes 302 is generally longitudinally elongated from a corresponding (respective) free end of the free ends 314A, 314B, 314C, 314D, and a corresponding and opposed joint end 316A, 316B, 316C, 316D, to define a plurality of free ends of the plurality of tubes 302 opposing a plurality of joint ends of the plurality of tubes 302.

The radially-innermost tube 302C of the plurality of tubes 302 may at least partially define a radially-innermost duct of the plurality of ducts 214 and the inner cavity 240, wherein the shaft 110 may be coaxially disposed for corotation with the plurality of tubes 302. Similarly, a radially-outermost tube 310 may at least partially define a radially-outermost duct of the plurality of ducts 214. Thus, the plurality of ducts 214 are disposed between the radially-outermost tube 310 and the radially-innermost tube 302C. The radial separation between the radially-outermost and radially-innermost duct partially defines a flow-through region for the fluid. The (common) housing, forming a housing portion of the supporting structure 230, circumferentially surrounds the radially-outermost tube 310 to surround the plurality of tubes 302.

In some embodiments, a flow path may be established to prevent or reduce energy lost via leakage from the boundary-layer turbomachine. For example, the fluid may leak or escape from the radially inside the radially-outermost tube 310 to outside within the housing portion of the support structure 230 in a cavity formed between the radially-outermost tube 310 and the housing portion. The fluid may flow down the cavity to come into contact with the axial-flow stator 226 and be redirected across the axial-flow rotor 228 to extract power from such leaked fluid escaping from gaps proximal to the inlet end 202.

Each blade assembly may include a corresponding plurality of blades 222A (or 222B, 222C) rotatably disposed around the longitudinal axis 102. As referred to herein, plurality of blades 222 may refer to one or more of the corresponding plurality of blades 222A (or 222B, 222C). In various embodiments, the plurality of tubes 302 may include at least or at most four tubes. In some embodiments, at least or at most three tubes may have blade assemblies associated therewith, e.g. three tubes may have blades additively grown thereon. In some embodiments, all but one of the plurality of tubes 302 may have blades grown thereon.

The plurality of blades 222 associated with the plurality of blade assemblies are disposed in the plurality of ducts 214, e.g. at downstream ends thereof. The plurality of blades 222 extend radially relative to the longitudinal axis 102 from their corresponding duct walls 220 (220A, 220B, and/or 220C). In some embodiments, each duct may have blades extending from only one of its duct walls, e.g. a radially-outer duct wall or a radially-inner duct wall. In some embodiments, blades may extend from both walls, e.g. alternatingly. Thus, in some embodiments, the radially-outermost duct wall may not have blades extending therefrom, while in some embodiments, the radially-innermost tubes may not have blades extending therefrom.

The plurality of blades 222 may be integrally formed with the duct wall for co-rotation with the duct wall, e.g. using fasteners and/or slotted connectors. In some embodiments, the plurality of blades 222 may be in unitary construction with the associated duct walls 220 (i.e. each duct wall is in unitary construction with a blade it is associated with). For example, the plurality of blades 222 may be additively manufactured on the plurality of tubes 302. Thus, the plurality of blades 222 may necessarily be constrained to rotate together with the plurality of tubes 302 or duct walls 220 (co-rotation or common rotation). In some embodiments, each duct may have at least one blade assembly disposed therein.

The plurality of tubes 302 may be considered combined or hybrid rotors of a hybrid boundary-layer turbomachine.

For example, a tube may be viewed as a hybrid boundary-layer turbomachine rotor, wherein a section of an adhesion or friction surface of a boundary-layer turbine is equipped with blades to form a hybrid rotor with increased efficiency, wherein a concentrically adjacent tube is relied upon for forming a shroud circumferentially around the blades. Thus, the blades may form obstructions in the ducts defining radially extending (and circumferentially discrete) flow passages, e.g. the flow passages 308.

For example, the tube may be viewed as a bladed rotor of a turbomachine having a longitudinally elongated (and radially enlarged) hub configured to form an adhesion surface to increase efficiency and to serve as a shroud of a concentrically adjacent tube.

The plurality of blades 222 may be configured to extract additional energy from the fluid after energy is extracted therefrom in the adhesion section.

Figure 4:
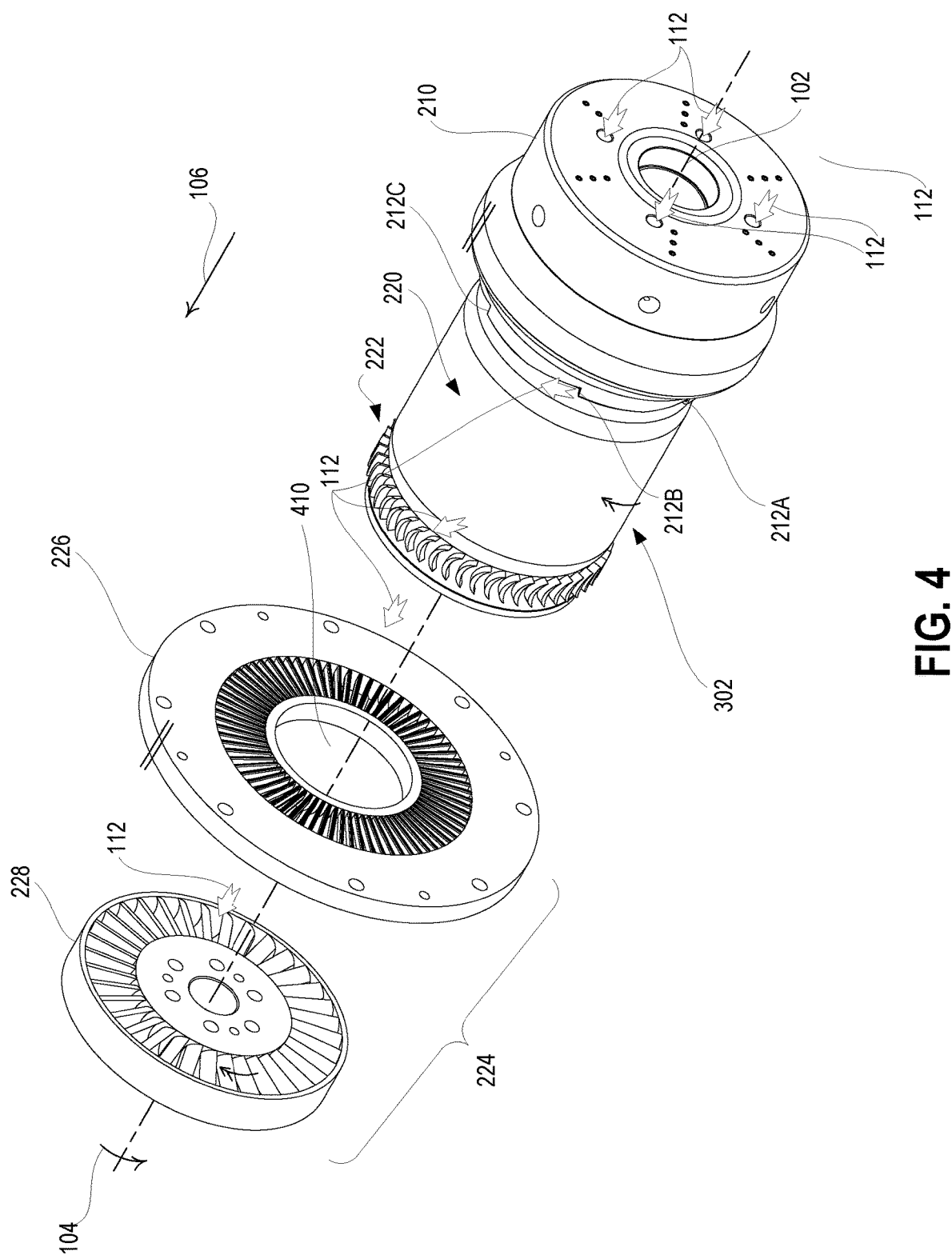
FIG. 4 is a schematic exploded perspective view of an axial turbine stage and the plurality of tubes coupled to a header block of the boundary-layer turbomachine.

FIG. 4 is a schematic exploded perspective view of the axial stage 224 and the plurality of tubes 302 coupled to the header block 210. A path of the fluid 112 through the various components is shown schematically, as well as the rotation direction of the plurality of tubes 302 and the axial-flow rotor 228 (with double-headed arrows). Stationary components are indicated using twin lines. The shaft 110, not shown for clarity, is disposed coaxially with the longitudinal axis 102 within central openings in the components of FIG. 6.

The fluid 112 enters an adhesion or rotor portion of the boundary-layer turbomachine 100 via one or more flow inlets 212, e.g. three flow inlets 212A, 212B, 212C. As referred to herein, flow inlets may extend from an outer location (e.g. inlet ports 114) to the adhesion or rotor portion. In various embodiments a flow inlet 212A (and/or 212B, 212C) may have a nozzle end for injecting jets of the fluid 112 oriented normal or lateral to the longitudinal direction 106 to force rotation of the plurality of rotors 300. Each duct, i.e. each tube of the plurality of tubes 302, may be exposed to such azimuthally oriented jets of the fluid.

As mentioned previously, the axial stage 224 is disposed downstream the adhesion portion and may be an axial turbine stage, including the axial-flow stator 226 and the axial-flow rotor 228. The axial stage 224 may be adapted to receive the fluid oriented generally parallel to the longitudinal axis 102 (in the longitudinal direction 106), and discharge the fluid oriented generally parallel to the longitudinal axis 102. In various embodiments, the axial stage 224 may be an impulse turbine or reaction turbine, depending on the configuration of the axial-flow stator 226 and axial-flow rotor 228. The axial-flow turbine may be adapted to extract residual energy from the fluid.

In various embodiments, blades and vanes may be configured/altered to best suit fluid type and associated thermodynamic conditions (such as pressures, temperatures, velocities, and densities), e.g. supercritical $CO_2$ may be treated differently than R134A.

The axial-flow stator 226 may be a vaned stator, comprising guide vanes, axially aligned with the plurality of rotors 300 along the longitudinal axis 102. The vaned stator may be annular-shaped to define a core 410 through which the axial-flow stator 226 may couple to the plurality of rotors via the shaft 110. The vaned stator may comprise plurality of guide vanes having leading edges (the edges closest to the oncoming flow and/or the plurality of blades 222) oriented substantially in an axial direction. In various embodiments, the axial-flow rotor 228 may be a bladed rotor axially aligned with the vaned stator and disposed downstream of the vaned stator to receive flow off the plurality of guide vanes. The blades of the bladed rotor may have trailing edges oriented substantially in an axial direction.

In some embodiments, vaned stators and/or rotors may extend radially across more than one duct of the plurality of ducts 214. In some embodiments, these may extent to the shaft for structural support.

FIG. 5A is a top elevation view of the plurality of tubes 302 coupled to the header block 210, showing schematic flow directions.

FIG. 5B is an enlarged view of areas 5B-1 and 5B-2 in FIG. 5A.

FIG. 5C is an enlarged view of area 5C in FIG. 5A.

A plurality of nozzles 510 including a nozzle 510A and a nozzle 510B may be integrated into the supporting structure 230. In various embodiments, the plurality of nozzles 510 distributed circumferential thereabout to convey the fluid through the plurality of ducts 214 to the outlet end 204. In some embodiments, the plurality of nozzles 510 may include six nozzles uniformly distributed around the longitudinal axis 102, i.e. forming an azimuthal angle of 60 degrees between adjacent nozzles. In some embodiments, the nozzle 510A may be approximately 0.3".

In some embodiments, the boundary-layer turbomachine 100 may have a diameter greater than 48" and may comprise 40 nozzles per tube. In some embodiments, the boundary-layer turbomachine 100 may have a diameter less than 2" and may have only a single nozzle per tube.

The plurality of nozzles 510 may form part of the one or more flow inlets 212 disposed at the inlet end 202. For example, the nozzles 510A, 510B may be integrated with the respective flow inlets 212A, 212B. The one or more flow inlets 212 may be configured to draw the fluid into the plurality of ducts 214, via the plurality of nozzles (or one or more plurality of nozzles).

The plurality of nozzles may be circumferentially distributed about an upstream end 216 of a duct to issue fluid jets into the duct. In some embodiments, such may be the case for all ducts of the plurality of ducts 214, i.e. each may have a corresponding plurality of nozzles (which altogether may also be referred to as a plurality of nozzles). The plurality of nozzles may be circumferentially spaced apart and oriented to reduce flow interaction between the fluid jets. As mentioned above, in various embodiments, the plurality of nozzles may be circumferentially equi-spaced. For example, in some embodiments, six nozzles (or eight nozzles) may be distributed circumferentially around a longitudinal end of a tube, corresponding to an upstream end 216 of a duct, such that an angle around the longitudinal axis 102 between adjacent nozzles is substantially 60 degrees (or 45 degrees, respectively). In some embodiments, such a distribution may mitigate turbulence, which may particularly arise due to cross-impingement of jets upon each other.

The plurality of nozzles may be adapted to issue fluid jets generally, or at least partially, azimuthally around the longitudinal axis 102 towards the outlet end 204. In various embodiments, a nozzle may include a structure adapted for issuance of fluid jet therefrom. For example, the nozzle 510 may include a port for allowing fluid therethrough. In some embodiments, the nozzle 510 may include rectangular slot.

The plurality of nozzles may include a variety of opening sizes to control velocity and flow of fluids, and may be specific to each tube of the plurality of tubes 302. For example, in some embodiments, to ensure inlet fluid velocity is matched to surface velocities of the plurality of tubes 302 and to synchronize rotational speeds of tubes of the plurality of tubes 302, relatively larger outer diameter tubes may be provided with more nozzles having smaller openings to increase fluid velocity and mass flow rate while smaller outer diameter tubes (i.e. tubes having smaller outer diameter) may be provided with fewer nozzles with larger openings. Thus up to 100 or more tubes may be synchronized so that each tube contributes torque at a given common shaft rotational frequency. For example, since surface speeds of tubes is approximately equal to the product of angular velocity and radius, an outer 8" diameter (radius of ⅓') tube rotating at 20,000 RPM (approximately 666.66π rad/s or 2100 rad/s) has an associated surface speed of approximately 700 ft/sec, while a 4" diameter tube (radius of ⅓') then has an associated surface speed of approximately 350 ft/sec. With increasing number of tubes and/or difference in diameter between inner and outer tubes increases, such a disparity between surface speeds increase significantly, e.g. a surface speed of a 48" tube (rotating at 20,000 RPM) is approximately 4200 ft/sec. A configuration of a plurality of adjustable/adapted nozzles enables synchronization of tubes.

The outlet face of each nozzle may form a corresponding exit angle 520 with the azimuthal direction 104. In various embodiments, this corresponding exit angle 520 may be substantially 0 degrees, or vary between 0 and 5 degrees, 0 and 10 degrees, or 0 and 20 degrees. For example, in some embodiments, the plurality of nozzles are aligned within 30 degrees, 10 degrees or 5 degrees of the azimuthal direction 104, i.e. the exit angle 520 may be less than 10 degrees or 5 degrees, respectively. In some embodiments, exit angle 520 may exceed 20 degrees.

As the fluid 112 flows from the inlet end 202 to the outlet end 204, the fluid 112 changes direction, aligning more with the longitudinal direction 106. In various embodiments, the angle 540 may be between 0° and 10° of the longitudinal direction 106. In some embodiments, the fluid 112 spirals around the plurality of ducts 214 until it reaches the plurality of blades 222, (e.g. following a generally helical flow path around the longitudinal axis 102).

The exit angle 520 may at least partially determine energy extraction. A larger exit angle 520 may lead to lower residence time (in an adhesion portion), shorter flow path, and/or larger pitch of an approximately spiraling flow path through the plurality of ducts 214. Total energy drop in the fluid may be diminished.

In various embodiments, the exit angle 520 may be adapted such that the fluid reaches the plurality of blades 222 before its energy drops below a threshold magnitude, e.g. kinetic energy of the fluid proximal to the plurality of blades 222 may be maintained at a sufficiently high level to maintain energy extraction from the fluid or to prevent energy consumption by the corresponding tube due to pumping of fluid.

The fluid 112 at the downstream end 218 may be relatively more aligned with the longitudinal axis 102 compared to the fluid 112 at the inlet end 202. In some embodiments, an azimuthal deviation 530 at the downstream end 218 may be less than 20 degrees more than the exit angle 520. In some embodiments, the azimuthal deviation 530 may be between 10 and 30 degrees.

In various embodiments, the fluid may be supercritical and/or multiphase prior to exit from the nozzle and may cease to be so, i.e. either or both supercritical and multiphase, after exit from the nozzle. In some embodiments, the fluid may be supercritical and/or multiphase after exit from the nozzle and may cease to be so, i.e. either or both supercritical and multiphase, at the plurality of blades 222 or downstream thereof, e.g. at the axial-flow stator 226. Such change in phase may depend on a flow length and/or longitudinal length(s) of the plurality of ducts 214.

Longitudinal lengths (length along the longitudinal axis 102) of the plurality of ducts 214 may be substantially similar. In some embodiments, longitudinal lengths of the plurality of ducts 214 may be different. For example, in some embodiments, successive ducts moving radially outwardly may have increasing longitudinal length, and in some embodiments, decreasing longitudinal length.

In various embodiments, such longitudinal lengths of the plurality of ducts 214 may be adapted to limit the azimuthal deviation of the fluid, e.g. to at most 10 or 20 degrees, control the level of turbulence in the flow received by the plurality of blades 222, maintain sufficient fluid velocity immediately upstream of the plurality of blades 222 (to prevent pumping behavior), support rotor synchrony, encourage positive torque generation, and/or prevent stall conditions (such as due to flow stagnation or reversal). In some embodiments, the azimuthal deviation of the fluid may be limited to at most 10 or 20 degrees. For example, the level of turbulence may be desirably lower rather than higher. In some embodiments, rotational frequencies of the boundary-layer turbomachine 100 are at least partially determined by turbulence characteristics upstream, within, and downstream of the plurality of ducts 214.

The plurality of blades 222 of each blade assembly may be adapted to receive the fluid oriented at least partially azimuthally around the longitudinal axis 102. Each blade may have a blade profile 550, which may generally vary from root to tip and which defines a leading edge 552A and a trailing edge 552B. For example, the leading edges of the plurality of blades 222 may be adapted to or aligned with the azimuthal deviation 530 of the fluid 112 along the duct to receive the fluid 112 in substantial alignment therewith. The fluid 112 may thereby impart rotation to the plurality of blades 222 about the longitudinal axis 102 to rotatably drive the shaft 110.

The plurality of blades 222 redirect the fluid 112 generally parallel to the longitudinal axis 102 at a downstream end thereof, i.e. at the outlet end 204. For example, the trailing edges may be generally aligned with the longitudinal axis 102.

For example, in various embodiments, azimuthal gaps 580, 582 may be approximately 0.35", or less or more.

Figures 6A, 6B:
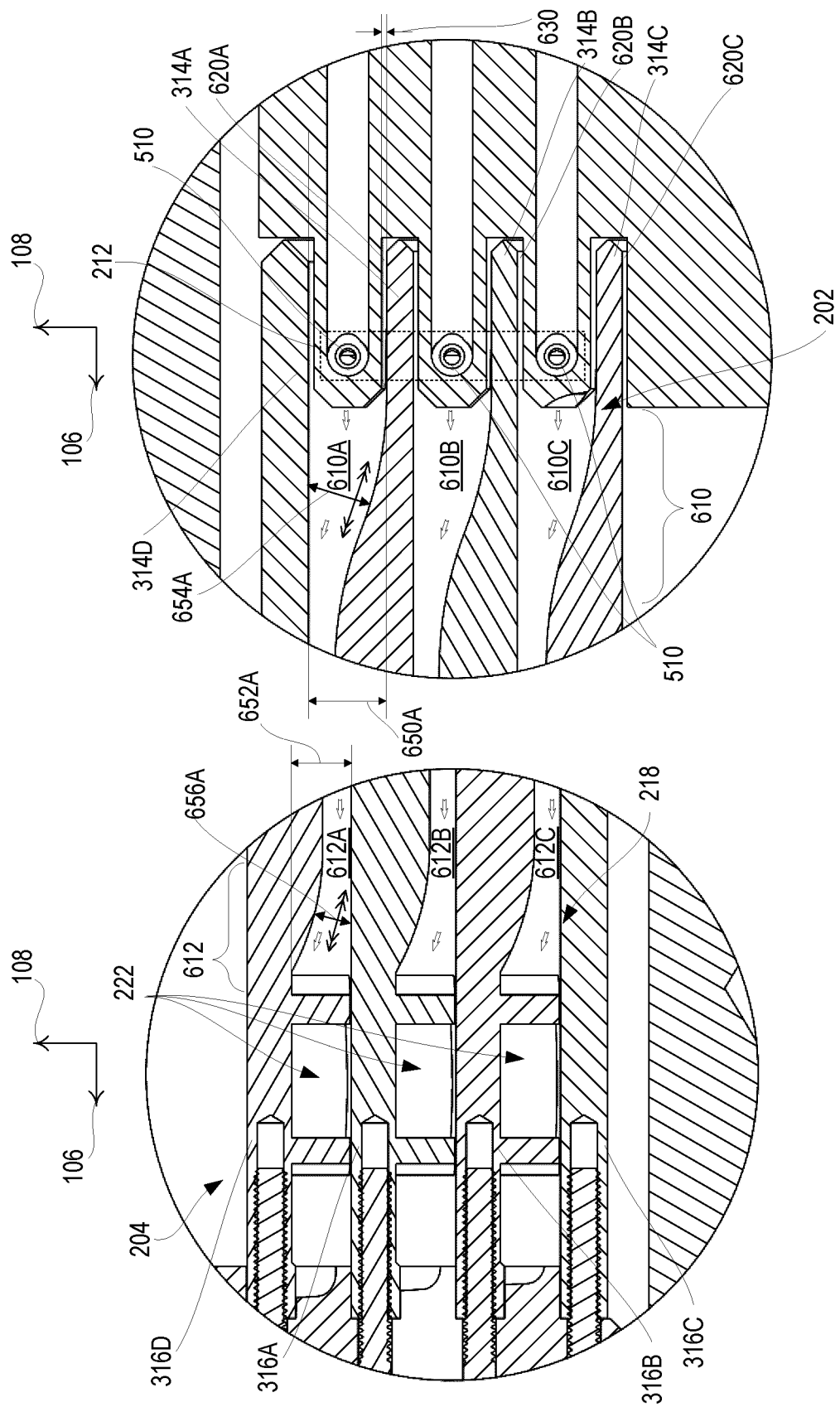
FIG. 6A is an enlarged view of area 6A in FIG. 2, showing schematic flow directions.
FIG. 6B is an enlarged view of area 6B in FIG. 2, showing schematic flow directions.

FIG. 6A is an enlarged view of area 6A in FIG. 2, showing schematic flow directions.

FIG. 6B is an enlarged view of area 6B in FIG. 2, showing schematic flow directions.

Figure 6C:
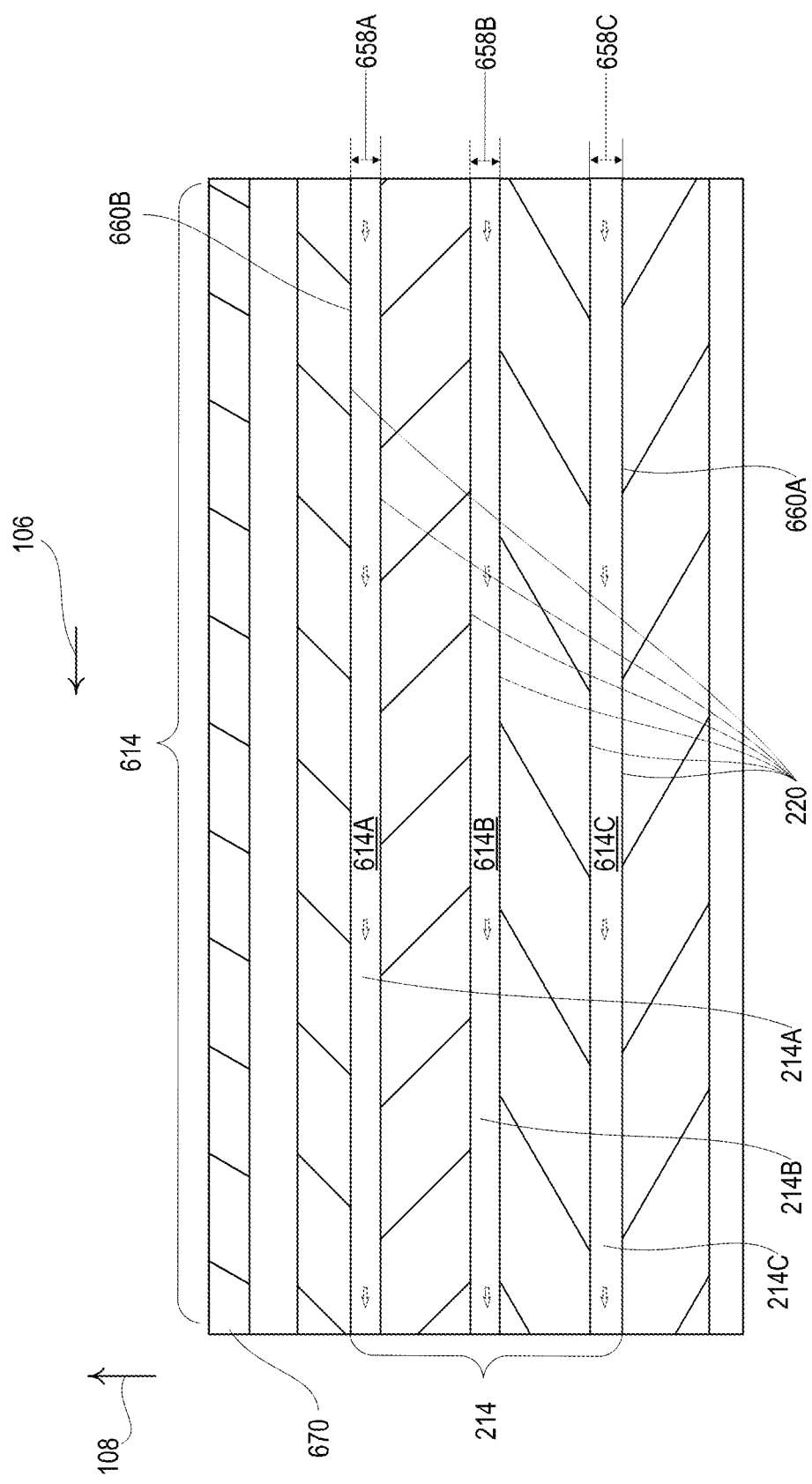
FIG. 6C is an enlarged view of area 6C in FIG. 2, showing schematic flow directions.

FIG. 6C is an enlarged view of area 6C in FIG. 2, showing schematic flow directions.

As before, the fluid 112 is indicated by means of arrows. Reference numerals are left out for clarity.

In various embodiments, the plurality of ducts 214 may include intermediate portions 614 disposed between upstream portions 610 and downstream portions 612, e.g. each duct may thus have corresponding portions: one of an upstream portion 610A, 610B, or 610C, a downstream portion 612A, 612B, or 612C, and an intermediate portion 614A, 614B, or 614C. The intermediate portions 614A, 614B, or 614C may have corresponding radial widths 658A, 658B, or 658C.

In some embodiments, the plurality of tubes 302 may be substantially free or supported hydraulically at their free ends 314A, 314B, 314C, 314D, e.g. the free ends 314A, 314B, 314C may be supported via pressurized fluid circulating in open cavities formed in a separate structure (supporting structure 230) for retaining the free ends 314A, 314B, 314C. In some embodiments, the plurality of tubes 302 may be fastened or jointed at the joint ends 316A, 316B, 316C, 316D with the end plate 232, e.g. to be locked in for common rotation. In some embodiments, the plurality of tubes 302 may be fastened to each other via fasteners passing through the plurality of tubes 302.

The upstream portions 610 and downstream portions 612 each may be generally cross-sectionally tapering, from respective larger cross-sections such as respective cross-sections 650A and 652A in the corresponding upstream portion 610A and downstream portion 612A, towards the intermediate portions 614 to define relatively narrow cross-sections (658A, 658B, 658C) of the intermediate portions 614, e.g. for enhancing imparting of rotation to the intermediate portion 614A, 614B, or 614C.

In various embodiments, the cross-sections defined by the radial widths 658A, 658B, 658C may each radially extend 0.1" or greater than 0.05". In some embodiments, the cross-sections defined by the radial widths 658A, 658B, 658C may each radially extend greater than 1" or more. Radial widths of the plurality of ducts 214 may not be all the same, and may vary depending on the number of nozzles, number of the plurality of tubes 302, the inner diameter of the radially-innermost tube and the outer diameter of the radially-outermost tube. For example, in turbine embodiments, radial widths may be varied to ensure the rotors are synchronized, and that the torque generated from each tube of the plurality of tubes 302 remains positive, i.e. there is no fluid pump by the boundary-layer turbomachine 100 (for turbine embodiments). Radial widths may vary along the longitudinal lengths of the ducts, e.g. the ducts may thereby be shaped in intermediate portions to achieve desired fluid dynamical behavior.

In some embodiments, the upstream portions 610 may have larger cross-sections, e.g. larger cross-section 650A, to accommodate the one or more flow inlets 212. The upstream portions 610 may be cross-sectionally adapted to receive the fluid jets, via nozzles, at the upstream end 216 of each of the plurality of ducts 214. In some embodiments, the cross-section 650A may radially extend 0.3". In various embodiments, the upstream portions 610 itself may extend longitudinally approximately 0.5".

A cross-sectional size of the one or more flow inlets 212 (lateral to the out flow direction) may be limited to a minimum size due to manufacturability or cost considerations. In various embodiments, radial widths of each of the plurality of ducts 214 that yield more efficient driving of the plurality of rotors 300 may be smaller than a maximum radial width indicative of the size of the one or more flow inlets 212. For example, in certain flow regimes, ratios of boundary-layer thickness to channel radial width inside the plurality of ducts 214 may be larger for more efficient driving. In various embodiments, a tapering 654A of the radial width from the cross-sections 650A towards lower radial widths, oriented towards the outlet end 204 or the downstream end 218, may increase efficiency of driving of the plurality of rotors 300 while accommodating larger sizes of the one or more flow inlets 212. The tapering 654A may also accelerate and/or compress the fluid flow (the fluid 112), which may increase efficiency of driving of the plurality of rotors 300. In various embodiments, the tapering 654A may be gradual or relatively smooth (as shown) to prevent formation of undesirable flow conditions or to encourage appropriate conditions for increasing efficiency of driving the plurality of rotors 300. In various embodiments, the tapering 654A may be axi-symmetric about the longitudinal axis 102, as suggested in FIG. 3A.

Similarly, the downstream portions 612 may have larger cross-sections, e.g. larger cross-section 652A, to accommodate the plurality of blades 222. The downstream portions 612 may be cross-sectionally partially complementary to the flow passages 308 defined by the plurality of blades 222 at the downstream ends 218 of the plurality of ducts 214. In some embodiments, the cross-section 652A may radially extend 0.230". In various embodiments, the downstream portion 612 itself may extend longitudinally between 1" and 1.5".

In various embodiments, radial widths of the plurality of blades 222 may be large relative to efficient radial widths of the plurality of ducts 214, discussed above. The larger radial widths of the plurality of blades 222 may confer efficiency or other advantages to the plurality of blades 222 for driving of the plurality of rotors 300. In various embodiments, a tapering 656A of the radial width from the cross-sections 652A towards lower radial widths, oriented towards the inlet end 202 or the upstream end 216, may increase efficiency of driving of the plurality of rotors 300 while accommodating larger sizes of plurality of blades 222. The tapering 656A may also decelerate, diffuse, expand, or pressurize the fluid flow (the fluid 112), which may increase efficiency of driving of the plurality of rotors 300 and the plurality of blades 222. In various embodiments, the tapering 656A may be gradual or relatively smooth (as shown) to prevent formation of undesirable flow conditions or to encourage appropriate conditions for increasing efficiency of driving the plurality of rotors 300. For example, it is known that a sudden expansion may lead to flow detachment and formation of a separation bubble. In various embodiments, the tapering 656A may be axi-symmetric about the longitudinal axis 102, as suggested in FIG. 3A.

The intermediate portions 614 may be defined between the upstream portions 610 and the downstream portions 612.

The supporting structure 230 may include one or more or a plurality of slots 620A, 620B, 620C configured to receive a corresponding free end 314A, 314B, 314C of the plurality of the tubes 302. In various embodiments, the plurality of slots 620A, 620B, 620C may have a longitudinal depth of 0.580" and may be configured to receive tongues of the plurality of tubes 302 having radial thickness of approximately 0.10". The slots 620A, 620B, 620C may be in fluid communication with the fluid 112. Similarly, an opposed end of the plurality of tubes 302 may be substantially cantilevered from joint ends 316A, 316B, 316C, 316D of the plurality of tubes 302. The longitudinal depth and the radial thickness of the plurality of slots 620A, 620B, 620C may depend on material stiffness of tubes and may be configured to prevent metal-to-metal (or material-to-material) contact.

The supporting structure 230 may include one or more inlet channels, e.g. winding through the header block 210, to feed the fluid 112 to the plurality of nozzles and the plurality of slots 620A, 620B, 620C.

In various embodiments, the plurality of ducts 214 may be in fluid communication with each other via the plurality of slots 620A, 620B, 620C. The inner cavity 240 may be in fluid communication with the plurality of ducts 214. In some embodiments, the slot opens to at least one of the inner cavity 240 or a duct of the plurality of ducts 214 to establish fluid communication with the fluid.

The slots 620A, 620B, 620C may be dimensioned to maintain clearance from the plurality of free ends, e.g. by maintaining a clearance 630 between the free end 314A and the slot 620A when the free end 314A is received therein. Thus, by maintaining a clearance such as the clearance 630, the slots 620A, 620B, 620C may be adapted to allow rotation of the plurality of tubes 302 relative to the slots 620A, 620B, 620C. For example, in various embodiments, the slots 620A, 620B, 620C may each maintain a clearance of approximately 0.02" on each radial end of the respective slot of the slots 620A, 620B, 620C. In various embodiments, each of the 620A, 620B, 620C may have a radial width of 0.140", or between 0.001" to 0.250". In some embodiments, excessively large radial depths may cause redirection of fluid away from ducts to (circulating) flow in or near the slot, thereby leading to leakages and loss of efficiency. In some embodiments, excessively small radial depths may encourage or cause physical contact between the slot (walls) and one or more tubes of the plurality of tubes 302. It is noted that, in some embodiments, longitudinal and radial depths may vary from one slot to another.

A lubricating film of the fluid 112 may be maintained between the free ends 314A, 314B, 314C of each corresponding (respective) tube 302A, 302B, 302C, and its corresponding slot 620A, 620B, 620C, e.g. in a clearance such as the clearance 630. The lubricating film may at least partially (rotatably) support the free end 314A, 314B, 314C of each tube 302A, 302B, 302C in its corresponding slot 620A, 620B, 620C and substantially prevent sliding friction (contact) therebetween. In some embodiments, clearances in the plurality of slots 620A, 620B, 620C may be adapted to generate relatively low pressure zones inside the plurality of slots 620A, 620B, 620C when the plurality of tubes 302 are rotating to draw the fluid 112, via the plurality of ducts 214, into the plurality of slots 620A, 620B, 620C to maintain lubrication between the free ends 314A, 314B, 314C of tubes 302A, 302B, 302C and their corresponding slots 620A, 620B, 620C. In some embodiments, the fluid-filled slots may provide a fluid bearing-like behaviour.

In various embodiments, the slots 620A, 620B, 620C are substantially annular slots configured to sleeve over longitudinal cylindrical (annular) edges of the tubes 302A, 302B, 302C. In various embodiments, the slots 620A, 620B, 620C may be formed in a monoblock.

The end plate 232 may be coupled to a tube 302A, 302B, 302C, or 310, of the plurality of tubes 302 at a corresponding joint end of the joint ends 316A, 316B, 316C, or 316D, of the tube to, e.g. substantially freely, cantilever the tube 302A, 302B, 302C, or 310, from the joint end 316A, 316B, 316C, or 316D. The end plate 232 may be a monoblock. In various embodiments, cantilevering refers to having one end fixed while the other may be substantially non-fixed to permit a cantilevering effect.

In various embodiments, the end plate 232 is coupled to the tube 302A, 302B, 302C, or 310 by threadably engaging along the longitudinal axis 102 with the respective joint end of the joint ends 316A, 316B, 316C, or 316D.

For example, a joint end 316A, 316B, 316C, or 316D may be threaded or tapped to threadably engage with a complementary fastener. The joint end 316A, 316B, 316C, or 316D may have one or more discrete fastening portions, such as tapped grooves or threaded extensions, which may be distributed about the circumference of the tube at the joint end 316A, 316B, 316C, or 316D.

In some embodiments, the joint have a fastening portion extending circumferentially around the joint end 316A, 316B, 316C, or 316D of the tube 302A, 302B, 302C, or 310, e.g. the tube 302A, 302B, 302C, or 310 may be threaded at the joint end 316A, 316B, 316C, or 316D or may be (internally) tapped such that the joint end 316A, 316B, 316C, or 316D threadably engages as a whole to couple the tube 302A, 302B, 302C, or 310 with the end plate 232.

In some embodiments, the joint end 316A, 316B, 316C, or 316D may have an internally threaded annular groove extending circumferentially that may be configured to receive a complementary threaded fastening portion extending from the end plate 232. In various embodiments, this complementary threaded fastening portion may be integrally formed or in unitary construction with the end plate 232, or may be a separate coupling component for simultaneously engaging with the end plate 232 and the tube 302A, 302B, 302C, or 310.

For example, the separate coupling component may be a threaded fastener configured to engage with the tube 302A, 302B, 302C, or 310 via the end plate 232. An example of such coupling components are cap screws joining the end plate 232 and the tube 302A, 302B, 302C, or 310 by passing through a clearance hole in the end plate 232 to screw into a tapped hole, axially aligned with and adjacent to the clearance hole, at the joint end of the tube. In various embodiments, each tube 302A, 302B, 302C, or 310 of the plurality of tubes 302 may be so (e.g. independently or separately) coupled to the end plate 232.

In some embodiments, the plurality of tubes 302 may be a press fit into the end plate 232 rotating head, e.g. manufactured by heat expansion of one component to allow fitting of another component therein. In some embodiments, such a configuration may be less expensive and more robust but may not be disassembled easily. In some embodiments, the plurality of tubes 302 may have longitudinal edges configured to threadably engage with the end plate 232. For example, a longitudinal edge may be threaded or comprise a circumferentially extending slot that is tapped.

While the discussion above focused on the tube 302A and the duct formed therein, it is understood that similar discussions may extend to other tubes and ducts formed therein.

It is found that for certain distributions of radial widths of the plurality of ducts 214, the radially outer ducts may generate power consumed by radially inner ducts for pumping fluid thereacross. In some embodiments, a radially-innermost duct wall 660A defined by the plurality of duct walls 220 is radially dimensioned relative to the radially-outermost duct wall 660B defined by the plurality of duct walls 220. Such dimensioning is configured to prevent pumping of the fluid 112 through one or more ducts of the plurality of ducts 214 using shaft power generated by the plurality of rotors 300.

In various embodiments, the radially-innermost duct 660A is greater than a first predetermined radius, and/or the radially-outermost duct 660B is less than a second predetermined radius greater than the first predetermined radius. In various embodiments, the (individual) radial widths 658A, 658B, or 658C of the intermediate portions 614A, 614B, or 614C may each be different, and possibly varying. For example, for turbine embodiments of the boundary-layer turbomachine 100, the radial widths 658A, 658B, or 658C may be configured to prevent or mitigate pumping in one or all of the plurality of ducts 214.

In various embodiments, a housing portion 670 of the supporting structure 230 circumferentially surrounds the plurality of tubes 302. In some embodiments, the housing portion 670 is configured to maintain pressurization of the fluid in the plurality of ducts 214. In various embodiments, the housing portion may comprise an opening for a regulator valve for regulating pressure.

FIG. 7 through FIG. 11 show computational fluid dynamics results.

FIG. 7 is a perspective view of velocity contours and streamlines, computed using computational fluid dynamics, in exemplary ducts of the plurality of ducts 214 of an exemplary boundary-layer turbomachine 100.

Figure 8:
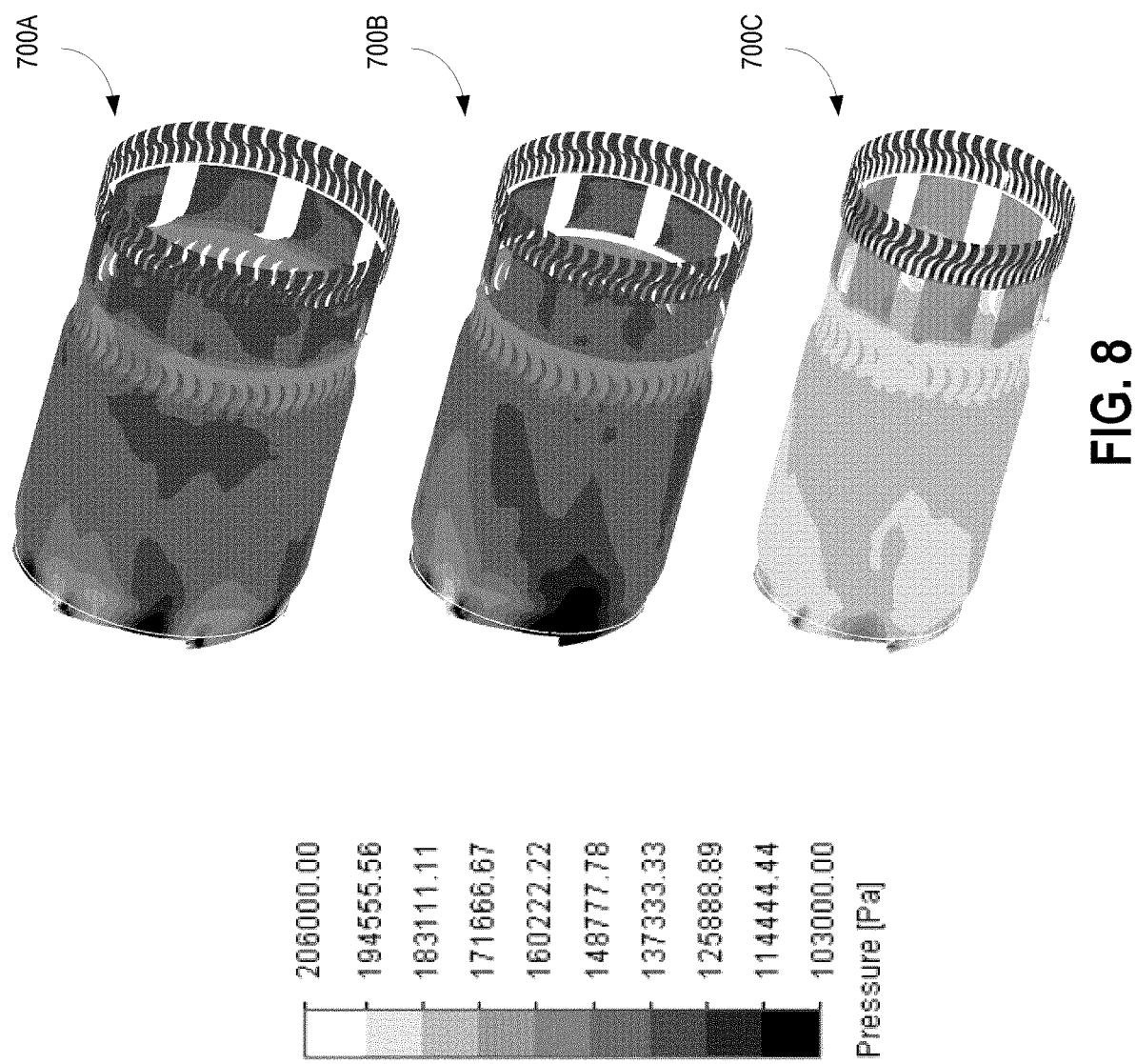
FIG. 8 is a perspective view of pressure contours in the exemplary ducts.

FIG. 8 is a perspective view of pressure contours, computed using computational fluid dynamics, in the exemplary ducts.

Figure 9:
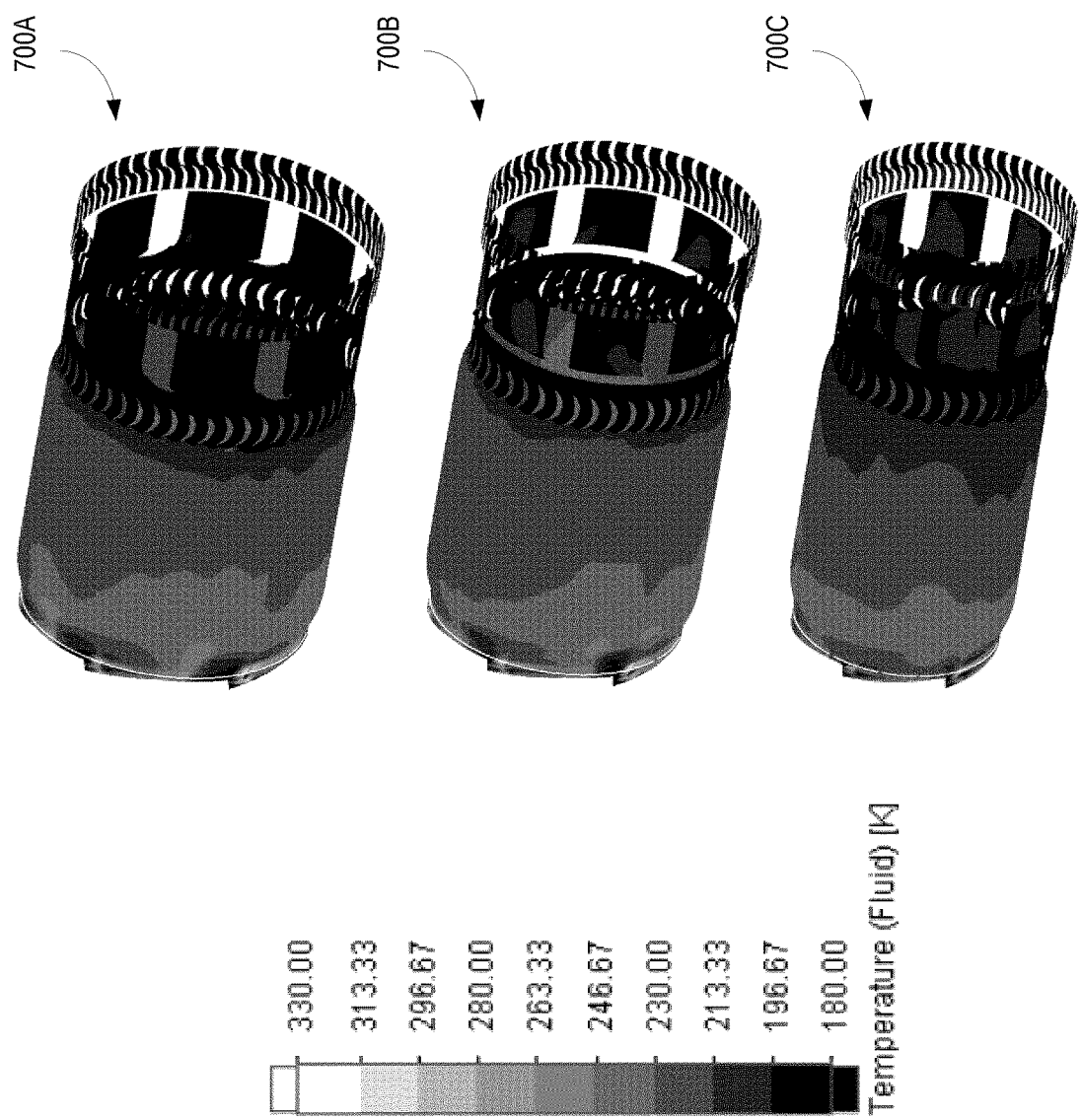
FIG. 9 is a perspective view of temperature contours in the exemplary ducts.

FIG. 9 is a perspective view of temperature contours, computed using computational fluid dynamics, in the exemplary ducts.

The ducts are formed above a radially-outermost tube 700A, a radially-innermost tube 700C, and a radially-intermediate tube 700B.

The flow spirals around the tubes as it flows towards the plurality of blades, and reduces in temperature and pressure along the way. Radially-inner tubes may be generally at higher pressures, slower speeds, and/or lower temperatures than radially-outer tubes.

Figures 10A, 10B, 10C:
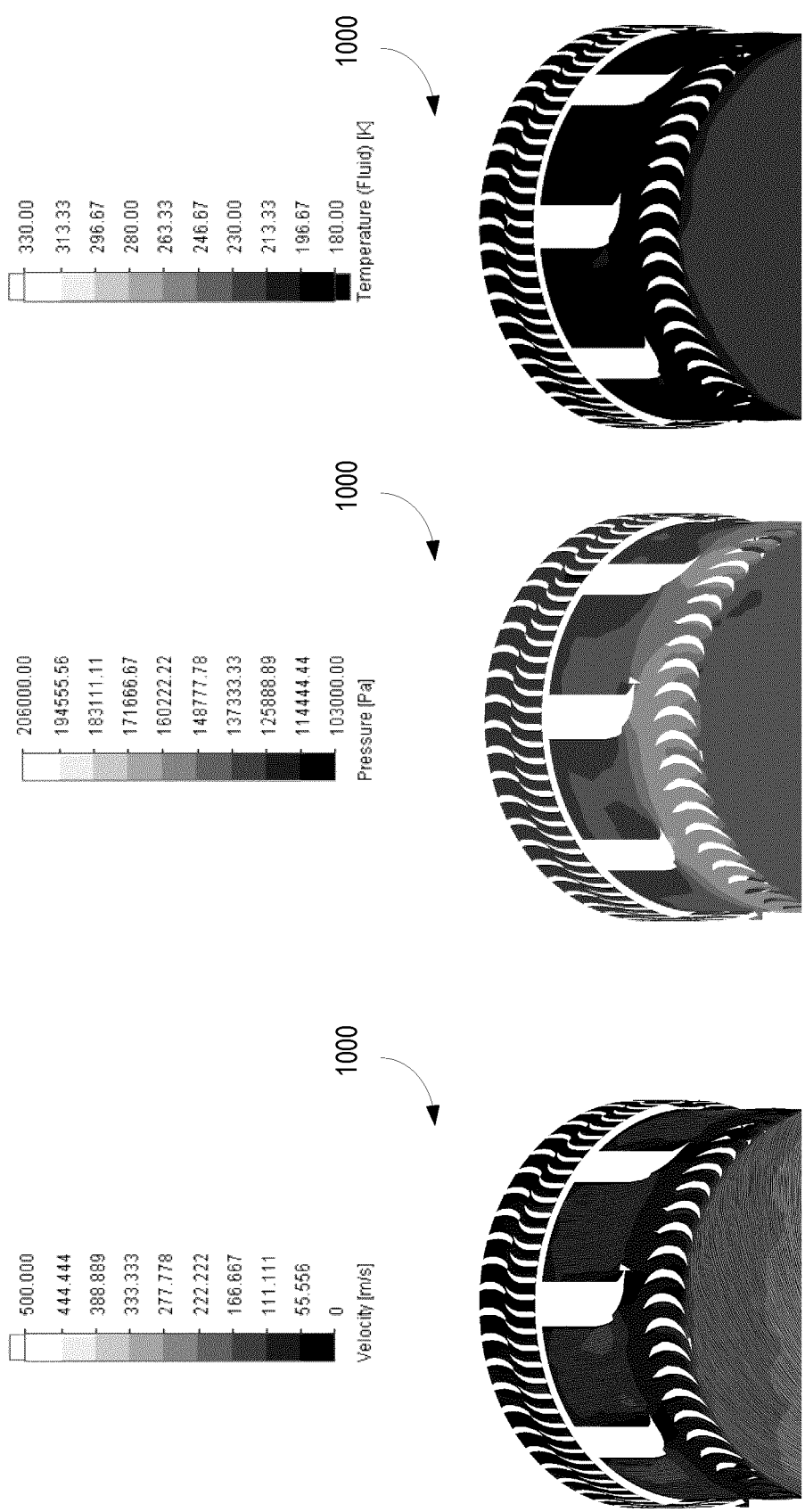
FIG. 10A is an enlarged perspective view of velocity contours and streamlines in one of the exemplary ducts.
FIG. 10B is an enlarged perspective view of pressure contours in the exemplary duct.
FIG. 10C is an enlarged perspective view of temperature contours in the exemplary duct.

FIG. 10A is an enlarged perspective view of velocity contours and streamlines, computed using computational fluid dynamics, in one of the exemplary ducts.

FIG. 10B is an enlarged perspective view of pressure contours, computed using computational fluid dynamics, in the exemplary duct.

FIG. 10C is an enlarged perspective view of temperature contours, computed using computational fluid dynamics, in the exemplary duct.

The exemplary duct is formed over a tube 1000 of the plurality of the tubes 302. The enlarged view shows flow conditions around the plurality of blades. In particular, the plurality of blades are adapted to receive the streamlines.

Figure 11:
FIG. 11 is a perspective view of velocity streamlines outside an exemplary nozzle of the boundary-layer turbomachine.

FIG. 11 is a perspective view of velocity streamlines, computed using computational fluid dynamics, outside an exemplary nozzle 1100 of a boundary-layer turbomachine 100. The fluid jet exiting from the nozzle may be azimuthally aligned.

Figure 12:
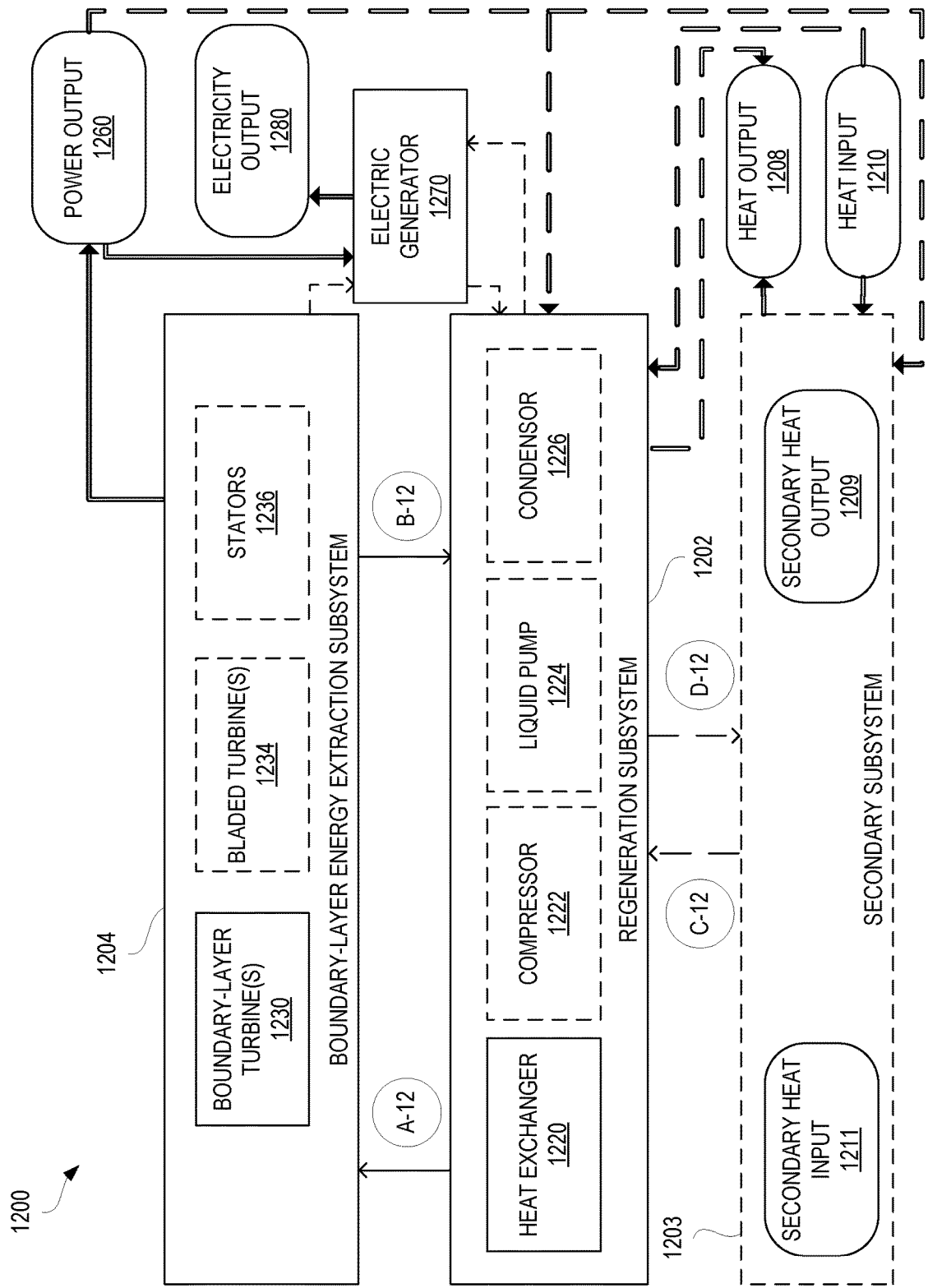
FIG. 12 is a schematic block diagram of a system for generating power, in accordance with an embodiment.

FIG. 12 is a schematic block diagram of a system 1200 for generating power, in accordance with an embodiment.

In FIG. 12, thick hollow arrows may indicate general transfer of energy, solid arrows may indicate fluid flows (which may generally involve transport of energy as well), and dashed lines may represent flows and components that may be absent in some embodiments.

In some embodiments, the system 1200 may be similar to or based on a Rankine power cycle and/or a Brayton power cycle.

The system 1200 may include a boundary-layer energy extraction subsystem 1204 for extracting energy from working fluid and a regeneration subsystem 1202 for regenerating the working fluid to allow subsequent energy extraction in the boundary-layer energy extraction subsystem 1204.

In some embodiments, a secondary subsystem 1203 may be coupled to the regeneration subsystem 1202 to provide staged heat transfer in the system 1200, e.g. the secondary subsystem 1203 may utilize a different working fluid than the regeneration subsystem 1202 and the boundary-layer energy extraction subsystem 1204.

The secondary subsystem 1203 may provide heat to, and receive heat from, the regeneration subsystem 1202 using, respectively, a secondary heat input 1211 and a secondary heat output 1209. The secondary heat input 1211 and the secondary heat output 1209 may each be a separate, or a same, intermediate energy storage medium (fluid or solid).

The boundary-layer energy extraction subsystem 1204 and the regeneration subsystem 1202 may be coupled to each other for feedback. In various embodiments, the secondary subsystem 1203 may be coupled to the regeneration subsystem 1202.

Fluid may enter the boundary-layer energy extraction subsystem 1204 at position A-12 as a higher temperature, pressure, and/or volume fluid (or higher energy fluid) from the regeneration subsystem 1202 and enter the regeneration subsystem 1202 as a lower temperature, pressure, and/or volume fluid (or lower energy fluid) from the boundary-layer energy extraction subsystem 1204.

In some embodiments, the working fluid at A-12 and B-12 may be a second fluid, which may be heated in the secondary subsystem 1203 using a first fluid, e.g. using a heat exchanger that isolates the first fluid from the second fluid (and vice versa). The second fluid may enter the regeneration subsystem 1202 at position C-12 as a higher temperature, pressure, and/or volume fluid (or higher energy fluid) from the secondary subsystem 1203 and enter the secondary subsystem 1203 at position D-12 as a lower temperature, pressure, and/or volume fluid (or lower energy fluid) from the regeneration subsystem 1203.

In various embodiments, the (second) working fluid at position A-12 may be vapor or multiphase. In some embodiments, the working fluid at position A-12 may be superheated vapor.

The energy extracted in the boundary-layer energy extraction subsystem 1204 may be supplied as power output 1260. In some embodiments, the power output 1260 may be shaft power.

In some embodiments the power output 1260 may be used in an electric generator 1270 to drive the electric generator 1270 to produce electricity output 1280.

In various embodiments, the electric generator 1270 may produce waste heat, which may be considerable in some cases. For example, an alternating current (AC) generator may generate waste heat (or heat losses) due to internal resistance, hysteresis loss, mechanical losses due to friction and drag. In some embodiments, the waste heat generated may substantially represent efficiency loss in the generator. For example, if the electric generator 1270 operates at 50% efficiency, substantially 40-50% of energy input to the electric generator 1270 may be lost as waste heat.

In some embodiments, working fluid may be supplied to the electric generator 1270 to cool the electric generator 1270 and/or preheat the working fluid, including by using the waste heat to improve overall system efficiency and improve performance of the electric generator 1270.

The boundary-layer energy extraction subsystem 1204 may include one or more boundary layer turbines 1230 for extracting energy from the working fluid. The boundary-layer turbines 1230 may include one or more embodiments of the boundary-layer turbomachine 100. In some embodiments, the boundary-layer energy extraction subsystem 1204 may include one or more bladed turbine(s) 1234, and/or stators 1236. For example, the axial stage 224 may be included in the boundary-layer energy extraction subsystem 1204.

In some embodiments, boundary-layer energy extraction subsystem 1204 may condense the working fluid or at least partially condense the working fluid by extracting energy therefrom. For example, the working fluid at position B-12 may be a liquid and/or multiphase. In some embodiments, the boundary-layer energy extraction subsystem 1204 may receive a multiphase working fluid and may generate multiphase working fluid with higher mass fraction in liquid phase. In some embodiments, the vapor quality of the working fluid at position A-12 may be higher than the vapor quality of the working fluid at position B-12.

The regeneration subsystem 1202 may include a heat exchanger 1220, a compressor 1222, a liquid pump 1224, and/or a condenser 1226.

The regeneration subsystem 1202 may receive heat input 1210. In various embodiments, the heat input 1210 may be heat generated by combustion and/or oxidation. In some embodiments, the heat input 1210 may be waste heat from industrial processes.

In some embodiments, the heat input 1210 may be used to heat the working fluid via the heat exchanger 1220. In some embodiments, the heat exchanger 1220 may include a shell-and-tube heat exchanger. In some embodiments, the heat exchanger 1220 may include a furnace. Heating the working fluid may increase its temperature and/or pressure. For example, in some embodiments, the working fluid may be liquid or multiphase fluid that is vaporized upon heating. Vaporization may allow greater energy absorption due to the heat of vaporization.

In some embodiments, the working fluid may be compressed in a compressor 1222 prior to being supplied to the heat exchanger 1220. The compressor 1222 may include one or more axial, mixed flow and/or centrifugal compressor(s). For example, the working fluid may be a vapor prior to compression such that compression liquefies the working fluid.

In some embodiments, the (liquid) working fluid may be pumped using a liquid pump 1224, e.g. a positive-displacement pump.

The working fluid may be liquified in the condenser 1226 prior to pumping, which may lead to a heat output 1208. Condensing the working fluid may be advantageous to leverage the heat of vaporization for energy from a heat source supplying the heat input 1210. In some embodiments, the heat output 1208 may be lost to the environment as waste heat.

In various embodiments, the compressor 1222 and/or liquid pump 1224 may be powered by the power output 1260. The compressor 1222 and/or the liquid pump 1224 may provide motive force for circulating the working fluid through the power generation cycle to generate power.

In some embodiments, the working fluid may be liquid or substantially liquid at position B-12 due to condensation in the boundary-layer turbine(s) 1230 caused by energy extraction from the working fluid.

In some embodiments, the heat may be supplied to the regeneration subsystem 1202 via the secondary subsystem 1203. The first fluid in the secondary subsystem 1203 may absorb the heat input 1210 and transfer it to the second fluid to supply the regeneration subsystem 1202 with energy.

In some embodiments, heat lost from the regeneration subsystem 1202 may be absorbed by the secondary subsystem 1203. The secondary subsystem 1203 may output energy as heat output 1208.

In some embodiments, the secondary subsystem 1203 may include components for driving the first fluid into and out of the regeneration subsystem 1202. In some embodiments, the secondary subsystem 1203 may include a compressor.

Figure 13:
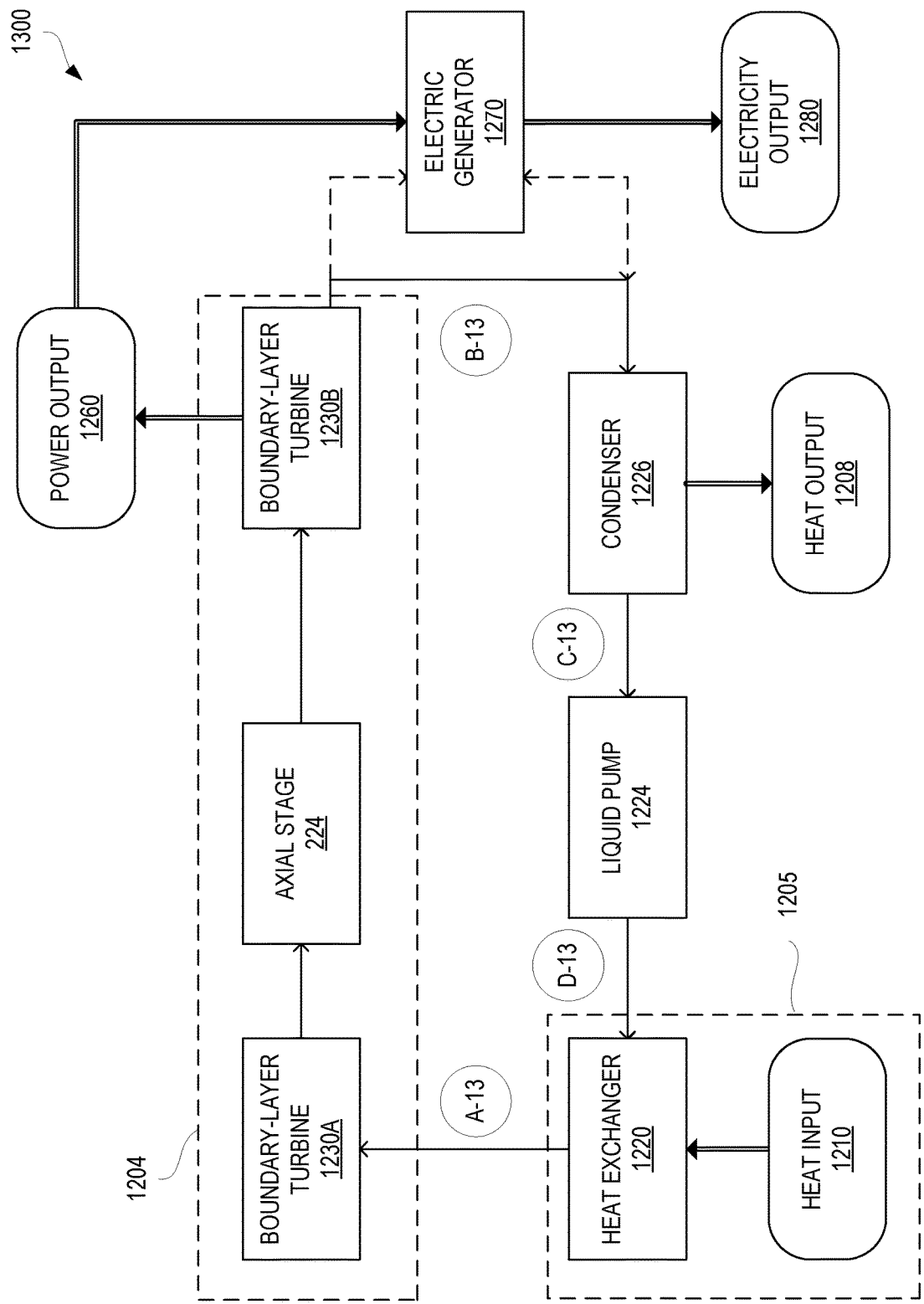
FIG. 13 is a schematic block diagram of a system for generating power, in accordance with another embodiment.

FIG. 13 is a schematic block diagram of a system 1300 for generating power, in accordance with an embodiment.

The system may include a heater 1205 for injecting energy into the system 1200 by heating the working fluid of the system 1200. In some embodiments, the heater 1205 may include a heat input 1210 source supplying energy to a heat exchanger 1220.

In some embodiments, the working fluid may include at least some condensate prior to heating in the heater 1205. For example, the working fluid may be liquid, substantially liquid, and/or multi-phase (liquid and vapor). Such condensate may arise from compression and/or cooling in other components of the system 1200.

The heater 1205 may heat the working fluid to then generate working fluid (or fluid) that is at least partially vaporized. For example, the heated working fluid may be vapor, substantially vapor, and/or multi-phase (liquid and vapor). When the working fluid is multiphase before and after heating, heating may increase the vapor pressure or mass-fraction of vapor relative to liquid.

The heated working fluid may be supplied to a (first) boundary-layer turbine 1230A, which may be an embodiment of the boundary-layer turbomachine 100, to extract energy from the working fluid.

After energy extraction from the working fluid in the boundary-layer turbine 1230A, the working fluid may be supplied to an axial stage 224. The axial stage 224 may be coupled to the boundary-layer turbine 1230A to receive the working fluid from the boundary-layer turbine 1230A to extract energy from the working fluid. The axial stage 224 may include an axial-flow rotor, such as an axial turbine, and/or an axial stator.

In some embodiments, the axial stage 224 may be configured to rotatably drive a shaft. In various embodiments, the axial stage 224 may be directly coupled to one, or both, of the boundary-layer turbines 1230A, 1230B without an intervening shaft. The axial stage 224 and the boundary-layer turbines 1230A, 1230B may be coupled, with or without a distinct shaft, to transmit generated power.

The energy of the working fluid may be reduced in the axial stage 224. For example, in some cases, the pressure and/or temperature of the working fluid may be reduced.

After energy extraction from the working fluid in the axial stage 224, the working fluid may be supplied to a second boundary-layer turbine 1230B.

The boundary-layer turbines 1230A, 1230B may have respective duct walls to supply energy to the respective boundary-layer turbines 1230A, 1230B to generate power, e.g. shaft power, from the working fluid.

The boundary-layer turbines 1230A, 1230B may be configured for drivable rotation about corresponding longitudinal axes of the respective boundary-layer turbomachine by the working fluid frictionally dragging the aforementioned respective duct walls at least partially azimuthally around respective longitudinal axes of the boundary-layer turbines 1230A, 1230B.

In some embodiments, the cooled and condensed working fluid may be supplied to the electric generator 1270 for cooling of the electric generator 1270, i.e. preheating of working fluid condensate. The working fluid is then returned to the heater 1205 in the form of at least partial condensate. It is found advantageous to configure the system 1200 to generate substantially liquid working fluid for supplying to the heater 1205.

The thermodynamic properties of the working fluid at positions A-13, B-13, C-13, and D-13 are listed in Table 4, for an exemplary embodiment.

TABLE 4

| Position | Temperature (° F.) | Pressure (psig) | Density (lbm/ft$^3$) | Vapor quality (lbm/lbm) |
|---|---|---|---|---|
| A-13 | 300.0 | 1000 | 10.0 | 1.00 |
| B-13 | 64.2 | 100 | 1.9 | 0.55 |
| C-13 | 62.9 | 100 | 31.5 | 0.0 |
| D-13 | 70.8 | 1000 | 32.0 | 0.0 |

Note:
the vapor quality is defined as the ratio of the mass of the vapor fraction of the working fluid to the total mass of the working fluid, and a vapor quality of 0.0 in Table 4 above indicates subcooled liquid.

Multi-phase properties of the working fluid are listed in Table 5, for an exemplary embodiment.

TABLE 5

| Position | Density (lbm/ft$^3$) | | Enthalpy (BTU/lbm) | |
|---|---|---|---|---|
| | Liquid | Vapor | Liquid | Vapor |
| A-13 | — | 10.0 | — | 314.4 |
| B-13 | 31.4 | 1.1 | 105.8 | 255.5 |
| C-13 | 31.5 | — | 105.0 | — |
| D-13 | 32.0 | — | 110.9 | — |

In various embodiments, the working fluid may be propane and the efficiency of such a system may be about 60%, e.g. to generate approximately 700-800 hp, or about 700-740 hp (about 530-550 kW).

In some embodiments, the heat input may be about 895 kW and the heat output 1208 may be about 368 kW.

In various embodiments, the liquid pump 1224 may be configured for a volumetric flow rate about 8 ft$^3$/min.

In various embodiments of systems for generating power, a plurality of boundary-layer turbomachines 100 may be coupled together, e.g. three or four boundary-layer turbomachines 100 may be staged. Each boundary-layer turbomachine 100 may have configured differently, e.g. the number of duct walls, the radius, the number of inlet vanes, and other parameters may vary from one boundary-layer turbomachine 100 to another.

Figure 14:
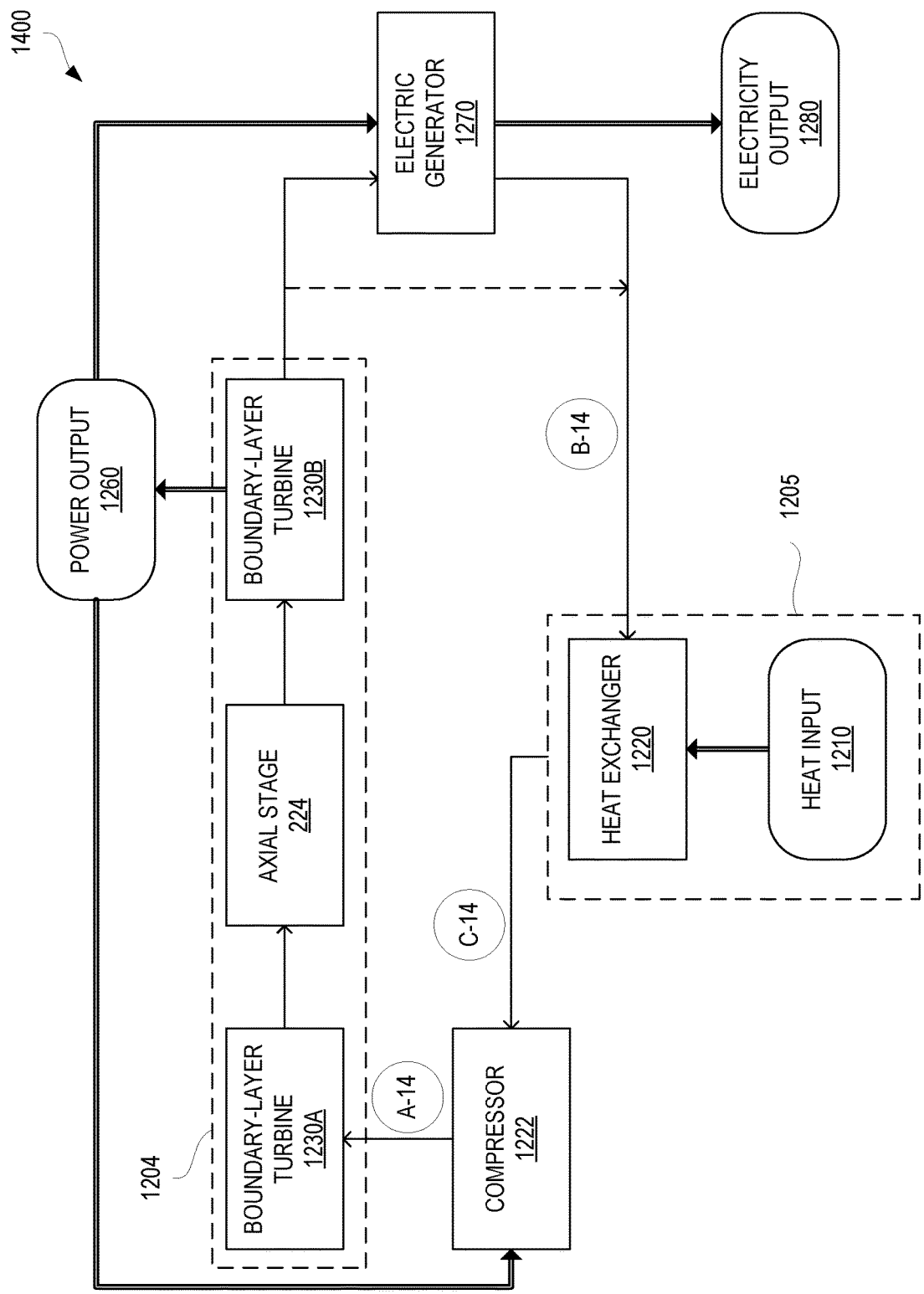
FIG. 14 is a schematic block diagram of a system for generating power, in accordance with yet another embodiment.

FIG. 14 is a schematic block diagram of a system 1400 for generating power, in accordance with an embodiment.

In system 1400, the second boundary-layer turbine 1230B may be configured to generate condensate by extracting energy from the working fluid. The condensate generated in the second boundary-layer turbine 1230B may decrease the vapor quality of the working fluid to a level suitable for reheating (and vaporization) in the heater 1205.

Advantageously, a separate condenser may not be used. Energy (heat) lost due to condensing working fluid in a separate condenser may be avoided. Such energy, or some portion thereof, may be converted into mechanical energy. In some embodiments, improved efficiencies may be achieved.

In various embodiments, a (vapor) compressor 1222 may be disposed downstream of the heater 1205 to compress the working fluid after vaporization. Compression and/or pressurization may establish a suitable pressure gradient in the system 1400 to draw through the working fluid.

The thermodynamic properties of the working fluid (which may be propane) at positions A-13, B-13, and C-13 are listed in Table 6, for an exemplary embodiment.

TABLE 6

| Position | Temperature (° F.) | Pressure (psig) | Density (lbm/ft$^3$) | Vapor quality (lbm/lbm) |
|---|---|---|---|---|
| A-14 | 256.6 | 150 | 1.02 | 1.00 |
| B-14 | −31.5 | 5 | 0.20 | 0.95 |
| C-14 | 70.0 | 5 | 0.16 | 1.00 |

Multi-phase properties of the working fluid are listed in Table 7, for an exemplary embodiment.

TABLE 7

| Position | Density (lbm/ft$^3$) | | Enthalpy (BTU/lbm) | |
|---|---|---|---|---|
| | Liquid | Vapor | Liquid | Vapor |
| A-14 | — | 1.02 | — | 345.5 |
| B-14 | 35.76 | 0.20 | 49.9 | 229.8 |
| C-14 | — | 0.16 | — | 267.9 |

Figure 15A:
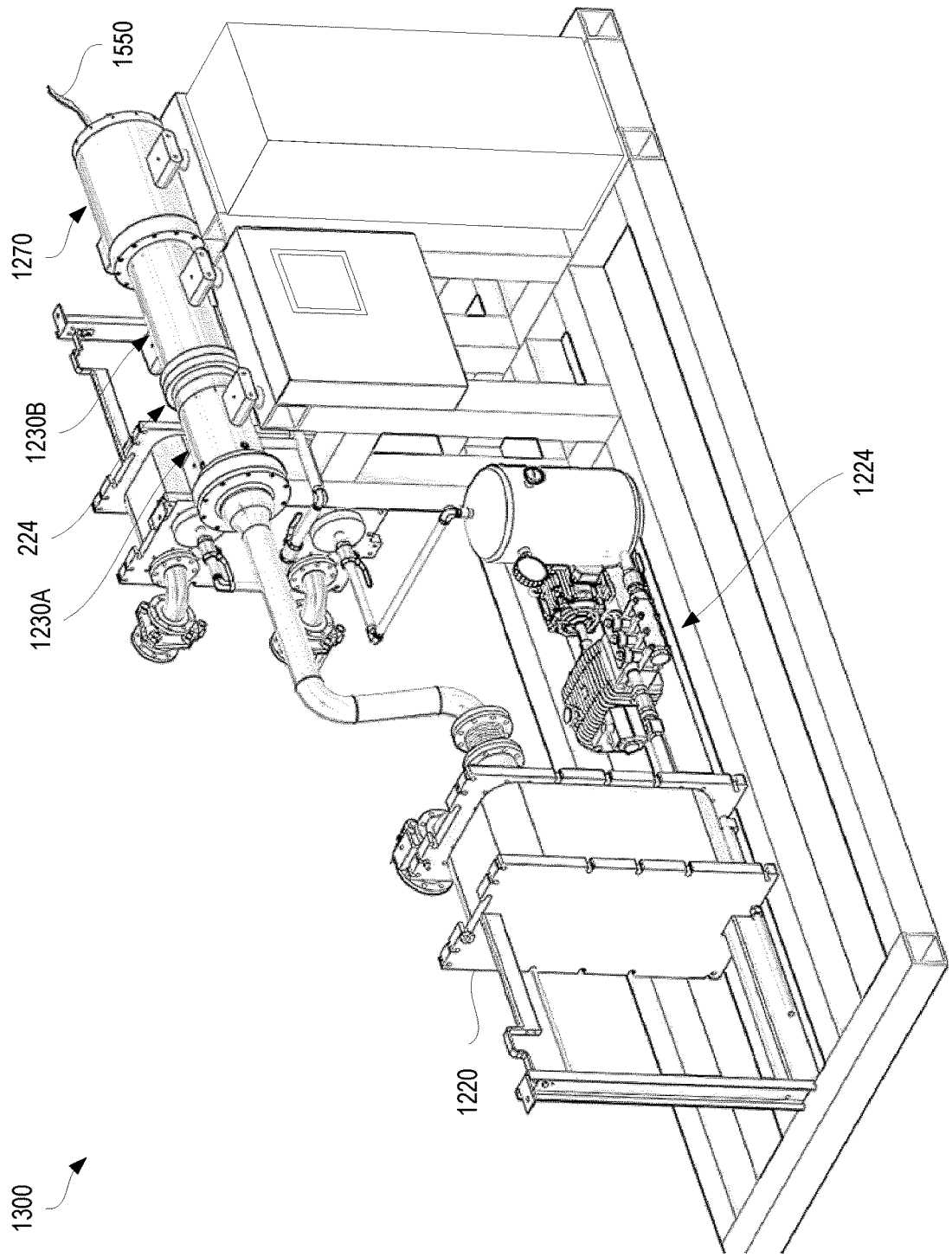
FIG. 15A is a perspective view of the system of FIG. 14, in accordance with an embodiment.

FIG. 15A is a perspective view of the system 1300, in accordance with an embodiment.

Figure 15B:
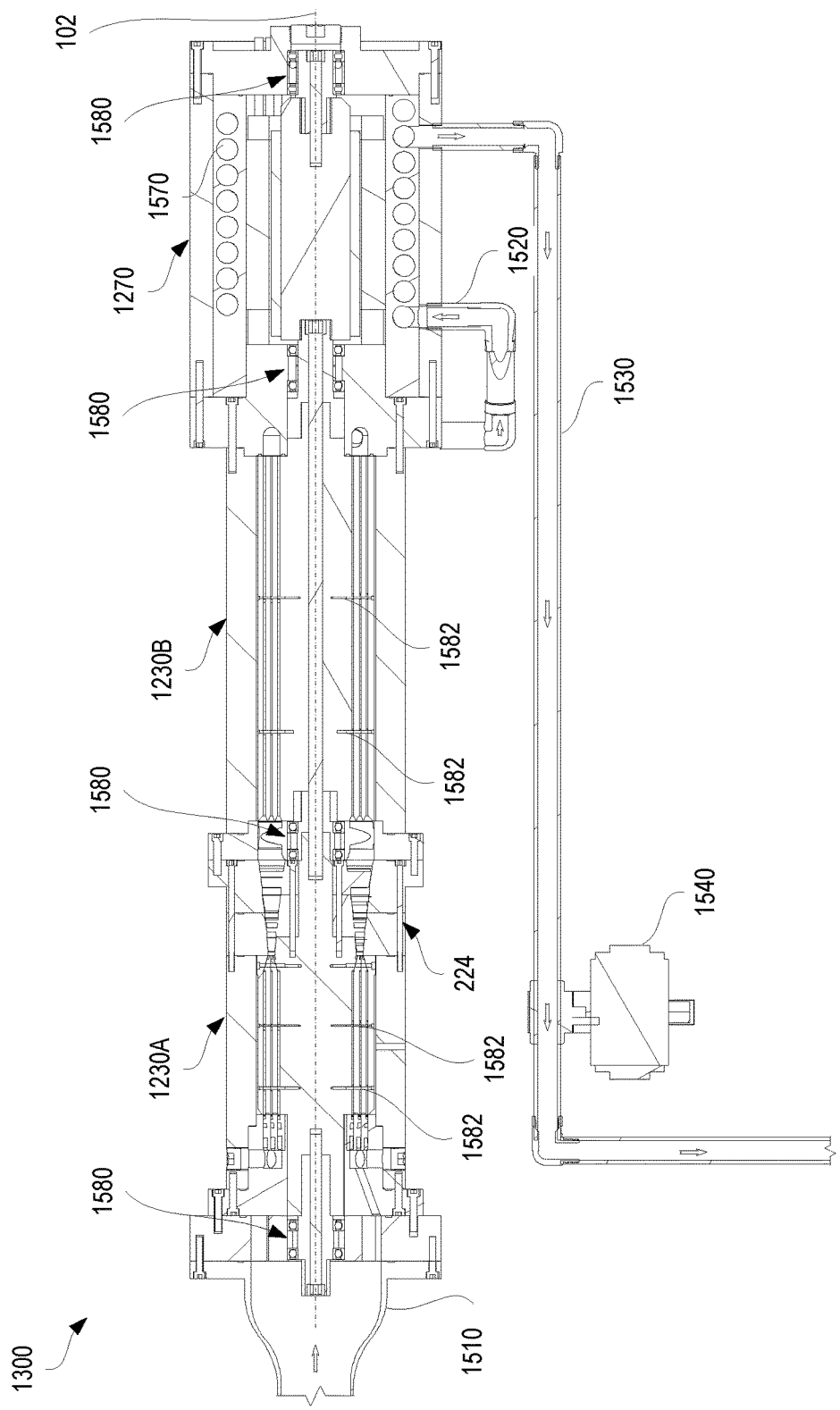
FIG. 15B is a partial enlarged cross-sectional view of the system of FIG. 15A.

FIG. 15B is a partial enlarged cross-sectional view of the system 1300 of FIG. 15A.

In reference to FIGS. 15A-15B, material flows in ducts of the system 1300 are indicated, where appropriate, using large (outlined) arrows.

In reference to FIGS. 15A-15B, a longitudinal axis 102 of the system 1200 may define a common rotational axis for duct walls of the boundary-layer turbine 1230A, 1230B, rotors of the axial stage 224, and the electric generator 1270. In some embodiments, one or more of these components may have distinct rotational axes. Having a common rotational axis may simplify construction and allow direct coupling of components.

Hot working fluid is supplied to the plurality of ducts of the boundary-layer turbine 1230A via an inlet duct 1510.

The plurality of ducts of the boundary-layer turbine 1230 may be at least partially defined by corresponding duct walls. These duct walls may be configured for drivable rotation about the longitudinal axis 1560 by the working fluid to generate shaft power.

The axial stage 224 may be sandwiched in-between the boundary-layer turbine 1230A and the boundary-layer turbine 1230B.

The boundary-layer turbine 1230B may receive the working fluid, with reduced energy, from the axial stage 224 into a plurality of ducts at least partially defining the boundary-layer turbine 1230B. The plurality of ducts may be at least partially defined by corresponding second duct walls that are frictionally engaged with the working fluid and configured for drivable rotation about the longitudinal axis 1560 by the working fluid. In various embodiments, the duct walls of the boundary-layer turbine 1230B may be configured to transfer energy from the working fluid flowing in the plurality of ducts of the boundary-layer turbine 1230B in order to at least partially condense or cool the working fluid.

The axial stage 224 may be coupled to the two boundary-layer turbomachines at opposite ends of the axial stage 224 to axially space apart the boundary-layer turbine 1230A and the boundary-layer turbine 1230B.

In various embodiments, the boundary-layer turbine 1230A, the axial stage 224, and the boundary-layer turbine 1230B (and, in some embodiments, the electric generator 1270) may be integrally formed for common rotation. For example, in some embodiments, the components may be attached or integrally coupled to one another via threadable connections without intermediate shaft bodies or gearing. For example, a "shaft" may be formed after integrating separate components together.

The electric generator 1270 is coupled to the axial stage 224 and the boundary-layer turbines 1230A, 1230B to generate electricity, which is output from the electric generator 1270 via electrical cables 1550.

In various embodiments, the electric generator 1270 may be an induction generator or a permanent magnet generator/motor. The electric generator 1270 may generate heat which may lead to the degradation of the service life and/or performance of the electric generator 1270. The generated heat may also represent a loss of energy from the system 1300 if not reclaimed.

After cooling in the boundary-layer turbine 1230B, cool working fluid is drawn into and/or around the electric generator 1270 via a generator inlet 1520. In some embodiments, the cold working fluid may be supplied to a heat exchanger surrounding hot parts of the electric generator 1270. For example, the cold working fluid may be supplied to helical ducting 1570 around the longitudinal axis 102 configured for heat exchange.

After cooling the electric generator 1270, the working fluid is drawn out via an outlet duct 1530 back to the heater 1205 via the condenser 1226 and the liquid pump 1224.

A valve 1540 may be provided to control the flow of working fluid. The valve 1540 may be a controllable valve. In some embodiments, the valve 1540 may be controllable to vary a flow rate through the valve 1540. In various embodiments, the valve 1540 may electrically (e.g. via a solenoid), hydraulically, and/or pneumatically actuatable.

In various embodiments, the boundary-layer turbine 1230A, and/or ducts thereof, may have substantially similar inner and outer diameters to, respectively the boundary-layer turbine 1230B, and/or ducts thereof. In some embodiments, the number of ducts of the boundary-layer turbine 1230A and the boundary-layer turbine 1230B may be substantially similar.

In various embodiments, bearings 1580 may be provided to support components around coupling locations about the longitudinal axis 102. In some embodiments, boundary-layer turbomachinery may facilitate operation at relatively low rotational frequencies to allow use of cost-effective bearings such as ceramic bearings.

In various embodiments, the respective sets of duct walls of the boundary-layer turbines 1230A, 1230B may be integrally formed via fasteners 1582 coupling the duct walls of a particular boundary-layer turbine together to prevent differential rotation between the duct walls. For example, annular tubes defining the duct walls of a particular boundary-layer turbine may all rotate at a similar or the same angular velocity.

In various embodiments, one or more rotors and/or stators of the axial stage 224 may be diverging in a longitudinally downstream direction.

Figure 16A:
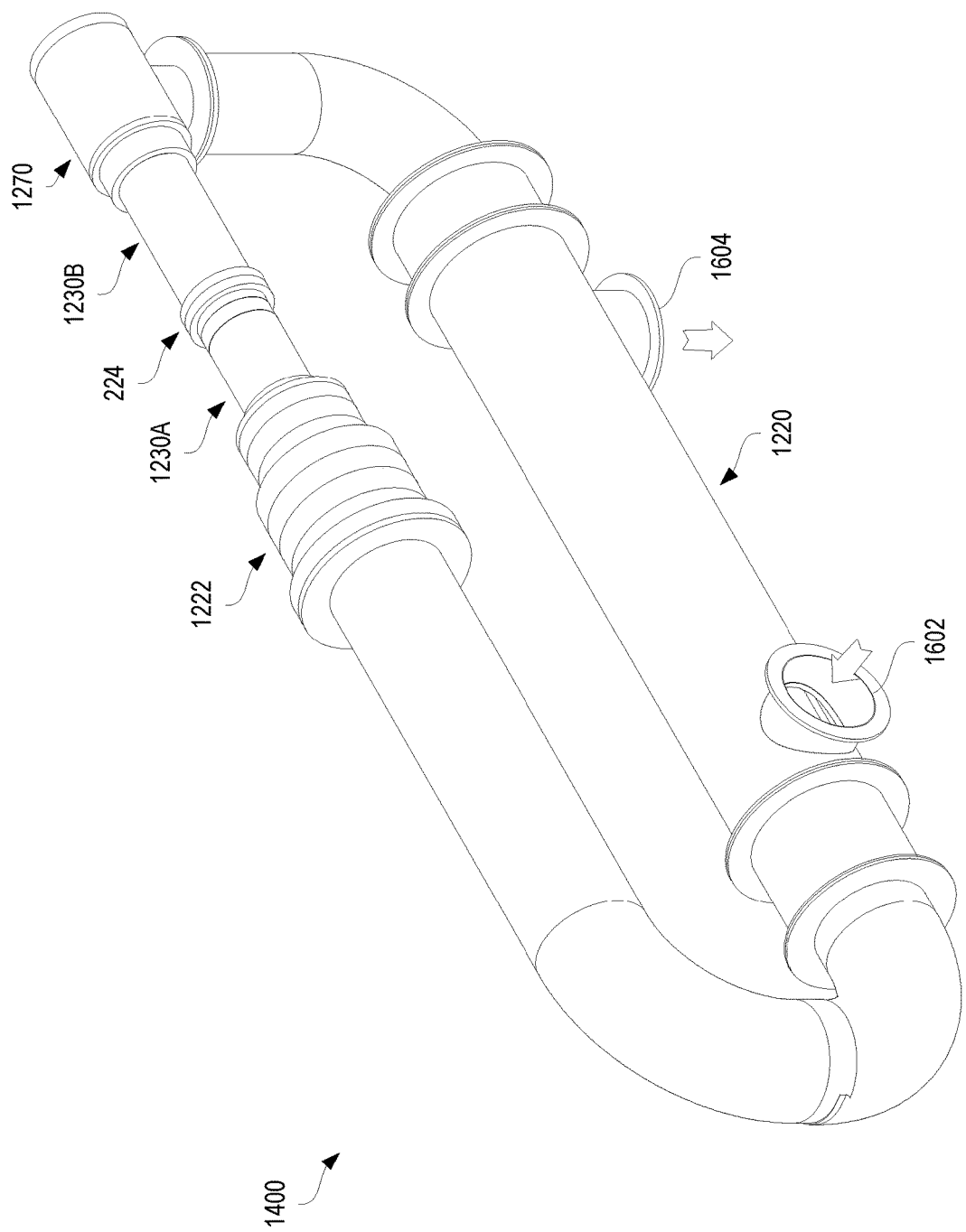
FIG. 16A is a perspective view of the system of FIG. 14, in accordance with an embodiment.

FIG. 16A is a perspective view of the system 1400, in accordance with an embodiment.

Figure 16B:
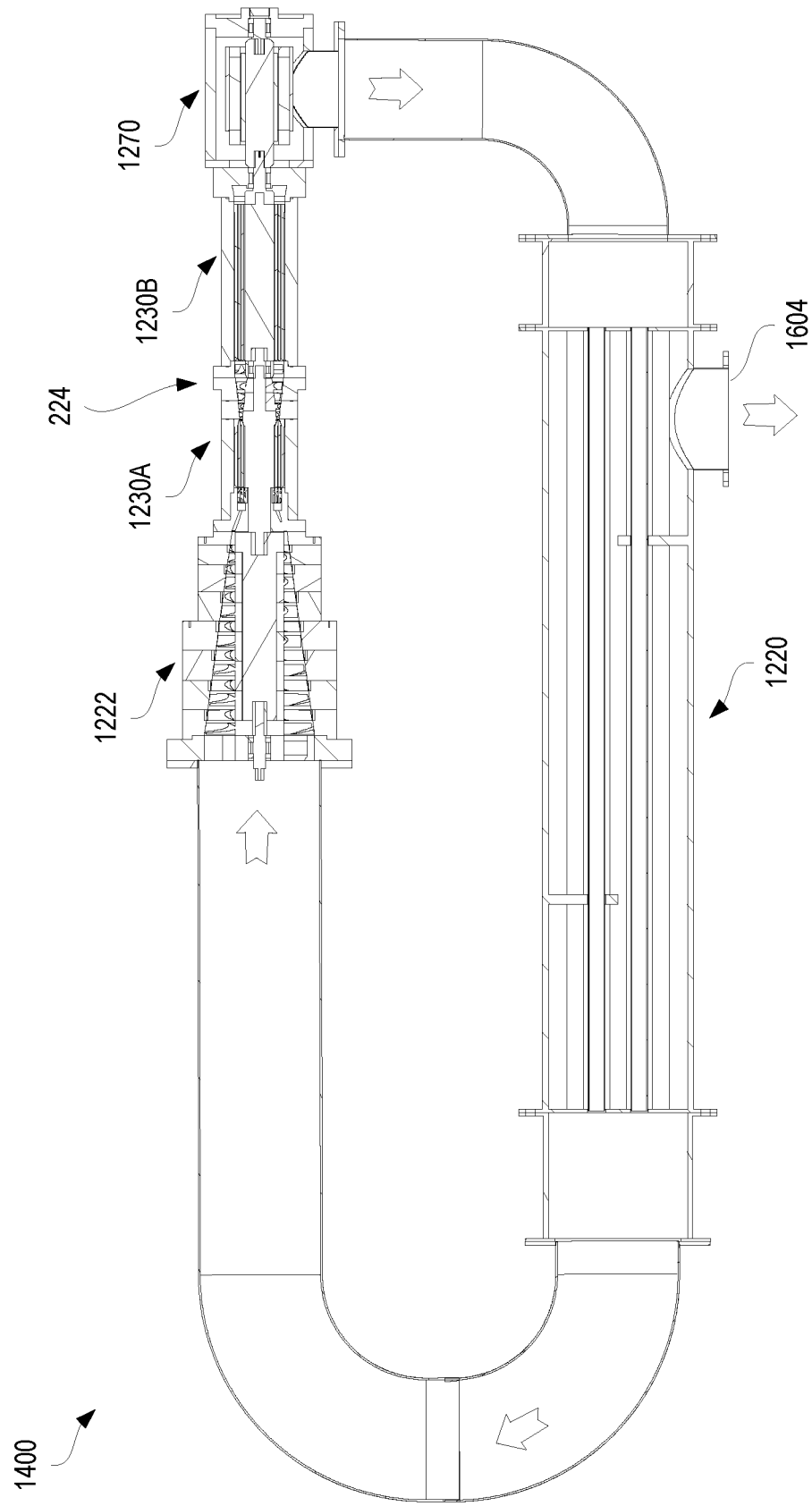
FIG. 16B is a cross-sectional view of the system of FIG. 16A.

FIG. 16B is a cross-sectional view of the system 1400 of FIG. 16A.

Figure 16C:
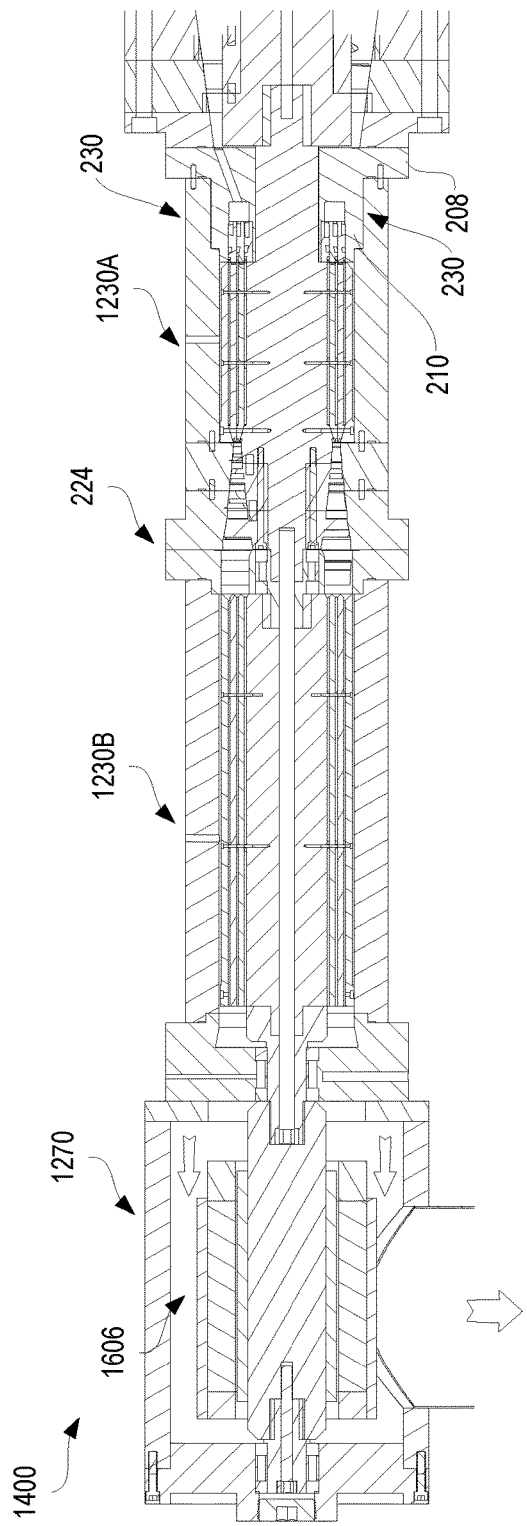
FIG. 16C is a partial enlarged cross-sectional view of the system of FIG. 16A.

FIG. 16C is a partial enlarged cross-sectional view of the system 1400 of FIG. 16A.

In reference to FIGS. 16A-16C (and also FIGS. 16D-16I discussed later), material flows in ducts of the system 1400 are indicated, where appropriate, using large (outlined) arrows.

Heat input 1210 may be provided to the heat exchanger 1220 via hot fluid entering the heat exchanger through an inlet 1602 and exiting through an outlet 1604. In some embodiments, the heat exchanger 1220 may be a shell-and-tube heat exchanger.

The compressor 1222 may be a bladed compressor. For example, the compressor 1222 may be an axial, centrifugal, and/or mixed flow compressor. In some embodiments, the compressor 1222 may be a type of impeller. The compressor 1222 may be configured to receive a substantially single-phase fluid. The compressor 1222 may be configured for substantially single-phase operation.

The energy (enthalpy) of the working fluid may decrease from an inlet of the first boundary-layer turbine 1230A to the output of the second boundary-layer turbine 1230B. The energy drawn from the working fluid may be converted to mechanical work. The second boundary-layer turbine 1230B may cool the fluid sufficiently to increase condensate in the working fluid. In some embodiments, condensate formed may be similar in quantity to a condenser.

In various embodiments, the length of the second boundary-layer turbine 1230B may be varied to achieve a desired fraction of condensate forming and/or to achieve a desired amount of power generation (or energy extraction from the working fluid). In various embodiments, the plurality of ducts of the boundary-layer turbine 1230A may be substantially axially shorter than the plurality of ducts of the boundary-layer turbine 1230B. In some cases, it is found that the boundary-layer turbine 1230A, and/or ducts thereof, may be advantageously between one-third and one-half an axial length of, respectively, the boundary-layer turbine 1230B, and/or ducts thereof.

In some embodiments, the cooled and condensed working fluid from the boundary-layer turbine 1230B may be supplied to the electric generator 1270 for cooling of the electric generator 1270, i.e. preheating of the condensate. The working fluid is then returned to the heater 1205 in the form of at least partial condensate.

It is found advantageous to configure the system 1400 to generate substantially liquid working fluid for supplying to the heater 1205.

Advantageously, heat generated by the electric generator 1270 may be absorbed by the working fluid to simultaneously mitigate heat-associated degradation (e.g. via heat buildup) in the electric generator 1270 and to preheat the working fluid to reduce heat loss from the system 1400.

A plenum 1606 around the electric generator 1270 may receive cold working fluid for cooling the electric generator 1270 and for preheating the working fluid. The plenum 1606 may fluidly connect an outlet of the boundary-layer turbine 1230B to a duct fluidly connected to the heat exchanger 1220.

In some embodiments, the system 1400 may be substantially closed to heat escape. For example, heat may only enter the system 1400 via the heat exchanger 1220 and may not otherwise exit the system, except via leakage, due to imperfect insulation and other conductive losses, noise, and/or vibration. Heat supplied to the system 1400 may be converted to mechanical energy, e.g. shaft energy. Parasitic loading on the system 1400 may also be present, e.g. parasitic loading due to the compressor 1222.

As referred to herein, "shaft energy" refers to mechanical energy in the form of rotary motion of a massive object, i.e. an object having a moment of inertia. For example, shaft energy may be generated even in the absence of a distinct unitary (or unitarily constructed) shaft.

Figure 16D:
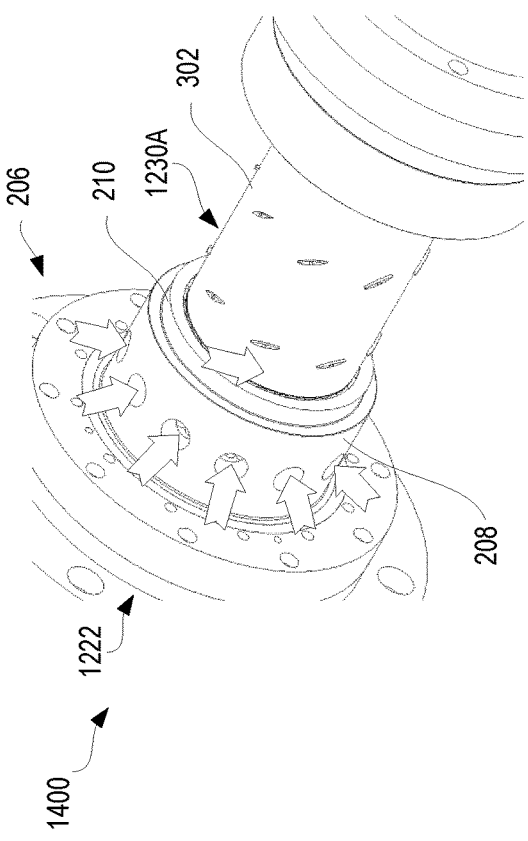
FIG. 16D is an internal perspective view of the boundary-layer turbine, with an outer housing removed to show a duct wall of a tube, a header section including a header block and a header plate, in accordance with an embodiment.

FIG. 16D is an internal perspective view of the boundary-layer turbine 1230A, with an outer housing removed to show a duct wall of a tube 302, the header section 206 including header block 210 and header plate 208, in accordance with an embodiment.

FIG. 16E is an internal side elevation view of the boundary-layer turbine 1230A of FIG. 16D, in accordance with an embodiment.

FIG. 16F is an enlarged view of the internal side elevation view of the boundary-layer turbine 1230A as shown in FIG. 16E, showing a clearance 1608 between the header block 210 and a tube 302, in accordance with an embodiment.

Working fluid may exit the header block 210, part of the supporting structure 230, via flow inlets 212 into ducts.

The header block 210 may be adjacent to a free end of the tube 302. The free end of the tube 302 may be unattached to other components and may be free to rotate about the longitudinal axis 102.

The header block 210 may be adapted to maintain the clearance 1608 between the free end of the tube 302 and the header block 210 to allow rotation of the tube 302 relative to the header block 210. In various embodiments, the clearance may vary between 3 and 8 thousandths of an inch (3-8 thou).

As shown in FIG. 16F, in some embodiments, the respective faces of the header block 210 and the tube 302 defining (opposing ends of) the clearance may be substantially parallel to each other. In some embodiments, these faces substantially normal to the longitudinal axis. For example, simplified construction and advantageous fluid dynamical behaviour may thereby be achieved.

As discussed previously, in some embodiments, the faces of the clearance may be substantially parallel to the longitudinal axis in some embodiments and may comprise a face of a tongue and a face of a slot receiving the tongue.

In various embodiments, the clearance 1608 may be adapted to maintain a lubricating film of the fluid between the tube 302 and the header block 210.

In various embodiments, the flow inlets 212 may be formed in the header block 210 at an end thereof adjacent to the free end of the tube 302.

A plurality of the flow inlets 212 may be azimuthally inclined to inject fluid across the clearance 1608 into a duct defined by the plurality of tubes.

Injection of fluid into ducts across the clearance may mitigate or reduce transfer of fluid between concentrically adjacent ducts. For example, the formation of a fluid dynamical layer (such as a shear layer) may sustain an adverse pressure gradient that reduces cross-flow between ducts of the plurality of ducts via the clearance 1608.

In various embodiments, the fasteners 1582 may be fastened through the plurality of ducts through vanes defined therein. The vanes, as seen in FIGS. 16D-16E, may have varying inclination along the tube. For example, vanes relatively proximal to the flow inlets may be oriented more in an azimuthal direction compared to vanes relatively distal therefrom.

The plurality of blades 222 may be formed on an end of the tube 302 opposite the free end. The end of the tube 302 may form a ridge 1610 or lip extending radially outwardly from the tube 302. In some embodiments, the end of the tube 302 may incline radially inwardly away from the flow inlets 212. In various embodiments, the radial inclination may be between 12°-18° or about 16°.

FIG. 16G is an enlarged perspective view of the header block 210 and the adjacent tube 302 of the boundary-layer turbine 1230A of FIG. 16D, in accordance with an embodiment.

FIG. 16H is an internal perspective view of the header block 210 and the adjacent tube 302 of the boundary-layer turbine 1230A of FIG. 16D, wherein an outer housing of the header block 210 is omitted to shown internal channels formed in the header block 210, in accordance with an embodiment.

FIG. 16I is an internal side elevation view of the header block 210 and the adjacent tube 302 of the boundary-layer turbine 1230A of FIG. 16H, in accordance with an embodiment.

The flow inlets 212 may be rectangular ports (or slots) that may be defined at ends of channels formed in the header block 210. The channels may at least partially be defined by a housing thereof surrounding the header block 210.

The channels may receive working fluid substantially parallel to the longitudinal axis and may reorient the fluid in an azimuthal direction. In some embodiments, the channels may be formed in-between elements rising out of the header block 210. For example, such elements may be fitted on to the tube 302 or may be additively formed thereon. In some embodiments, the channels may be arcuately shaped in a flow direction (to achieve relatively smooth or gradual azimuthal reorientation of the fluid) and may be converging towards the outlet end (proximal to the flow inlets 212) to form (partially) azimuthally inclined jets providing impulse to the tube 302 to cause rotation thereof to generate power.

In some embodiments, the flow inlets 212 into the ducts may be equi-spaced around the longitudinal axis. In some embodiments, the flow inlets 212 may be spaced apart along a circumference of the tube 302 to prevent interference or substantial cross-flow between jets issuing from adjacent flow inlets. In some embodiments, the flow inlets 212 may be spaced apart no more than such a distance. In various embodiments, the number, size, and flow characteristics associated with the flow inlets 212 may be varied to achieve a desired power output and torque generated by the boundary-layer turbine 1230A.

In some embodiments, the flow inlets 212 may be formed in pairs. The total number of flow inlets 212 may be even. Each flow inlet may have an opposing flow inlet associated therewith formed antipodally across the tube 302 to improve a force balance in the boundary-layer turbine 1230.

Embodiments of the header block 210, as described above in references to FIGS. 16A-16I, may be part of various embodiments of the boundary-layer turbomachine 100.

FIG. 17A is a schematic cross-section of a duct 1700 parallel to the longitudinal axis 102, in accordance with an embodiment.

The duct walls 220 may have a decreasing cross-sectional area in the longitudinal direction.

In some embodiments, the duct walls 220 may be converging longitudinally. In some embodiments, a radial separation 1702A between the duct walls 220 at a first longitudinal position 1704A may be different than a radial separation 1702B between the duct walls 220 at a second longitudinal position 1704B.

The first longitudinal position 1704A may be proximal to the inlet end 202 and distal from the outlet end 204 compared to, or relative to, the second longitudinal position 1704B.

FIG. 17B is a schematic radial cross-section of the duct 1700 at the first longitudinal position 1704A, in accordance with an embodiment.

FIG. 17C is a schematic radial cross-section of the duct 1700 at the second longitudinal position 1704B, in accordance with an embodiment.

A first radial cross-section 1706A of the duct 1700 is larger than a second radial cross-section 1706B of the duct 1700. The first radial cross-section 1706A is proximal to the inlet end 202 relative to the second radial cross-section 1706B.

Figure 18:
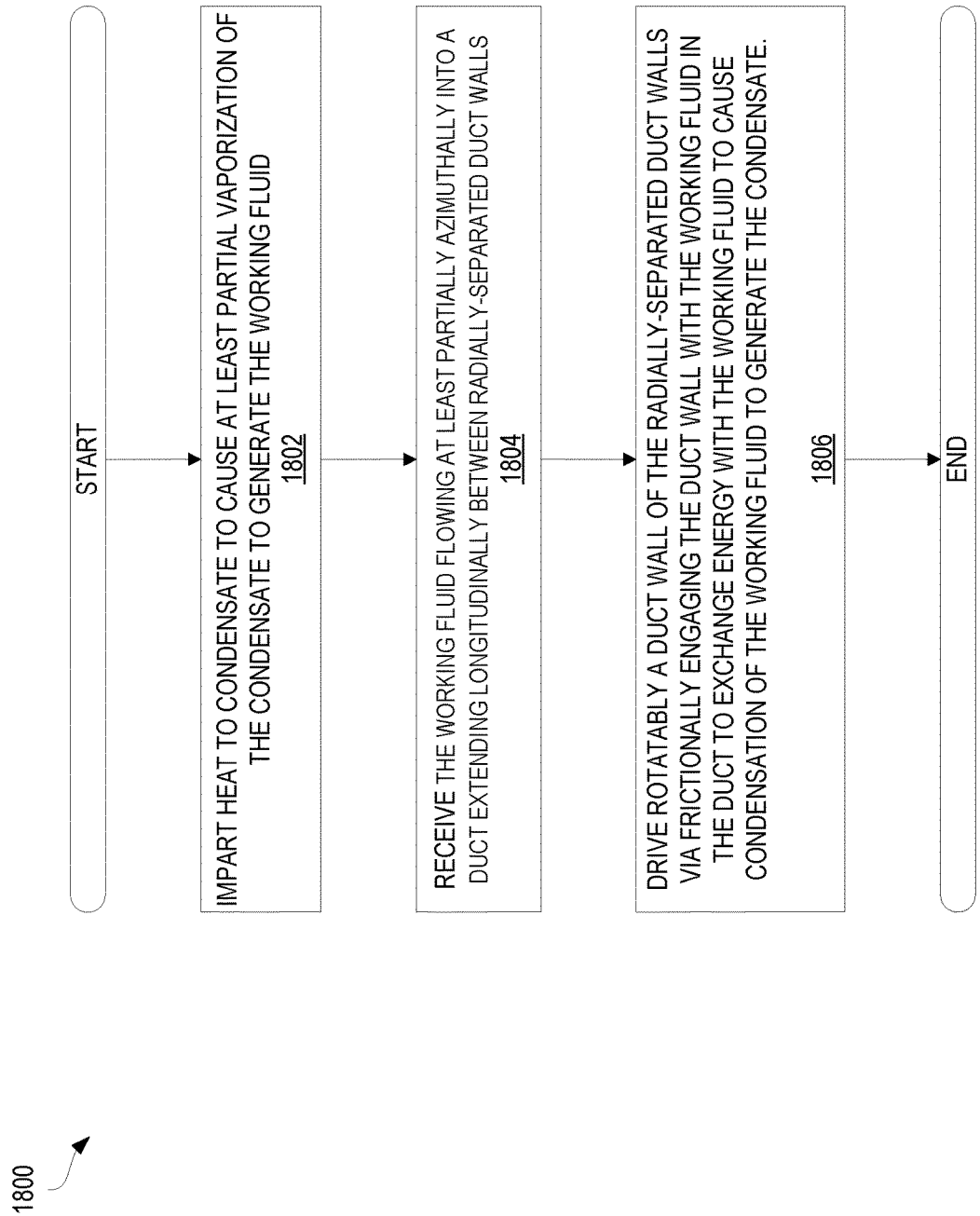
FIG. 18 is a flowchart of an exemplary method of generating power using a working fluid configured to change phase for generating power.

FIG. 18 is a flowchart of an exemplary method 1800 of generating power using a working fluid configured to change phase for generating power.

Step 1802 of the method 1800 may include imparting heat to condensate to cause at least partial vaporization of the condensate to generate the working fluid.

Step 1804 of the method 1800 may include receiving the working fluid flowing at least partially azimuthally into a duct extending longitudinally between radially-separated duct walls.

Step 1806 of the method 1800 may include driving rotatably a duct wall of the radially-separated duct walls via frictionally engaging the duct wall with the working fluid in the duct to exchange energy with the working fluid to cause condensation of the working fluid to generate the condensate.

Some embodiments of the method 1800 include receiving the working fluid on blades of a turbine rotor to drivably rotate the turbine rotor to generate shaft power, and wherein receiving the working fluid flowing at least partially azimuthally into a duct extending longitudinally between radially-separated duct walls includes receiving the working fluid flowing at least partially azimuthally from the turbine rotor.

Some embodiments of the method 1800 include driving an electric generator by rotatably driving the duct wall of the radially-separated duct walls; and cooling the electric generator using the condensate and/or the working fluid to preheat, respectively, the condensate and or the working fluid. For example, the working fluid may be multiphase.

In some embodiments of the method 1800, imparting heat to the condensate to cause at least partial vaporization of the condensate to generate the working fluid includes using a heater configured to receive the condensate. Some embodiments of the method 1800 include driving an electric generator by rotatably driving the duct wall of the radially-separated duct walls; preheating the condensate in a heat exchanger using heat from the electric generator; and receiving the condensate into the heater via the heat exchanger.

In some embodiments of the method 1800, the working fluid is imparted energy via compression to cause condensation to generate the condensate.

In some embodiments of the method 1800, receiving the working fluid flowing at least partially azimuthally into a duct extending longitudinally between radially-separated duct walls includes receiving the working fluid flowing at an upstream end of the duct; and a first radial cross-section defined between the radially-separated duct walls is larger than a second radial cross-section defined between the radially-separated duct walls, the first radial cross-section being proximal to the upstream end relative to the second radial cross-section.

In some embodiments of the method 1800, a first radial separation between the radially-separated duct walls is larger than a second radial separation between the radially-separated duct walls, the first radial separation being proximal to the upstream end relative to the second radial separation.

Figure 19:
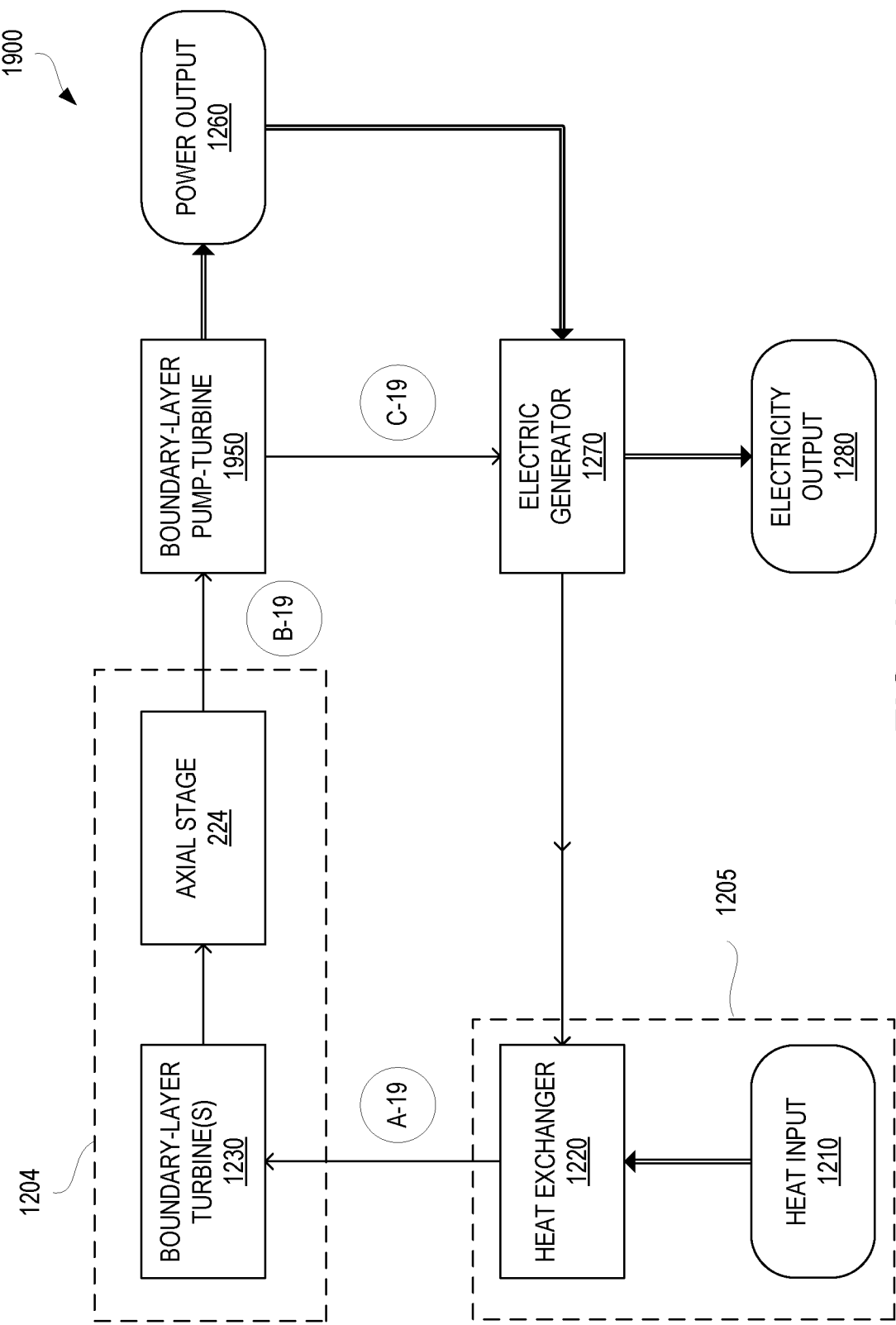
FIG. 19 is a schematic block diagram of a system for generating power, in accordance with an embodiment.

FIG. 19 is a schematic block diagram of a system 1900 for generating power, in accordance with an embodiment.

In various embodiments, the system 1900 may be similar to system 1300 in some respects. For example, the boundary-layer energy extraction subsystem 1204 includes a boundary-layer 1230 and an axial stage 224.

In some embodiments, after the axial stage 224, the working fluid may be drawn into a boundary-layer pump-turbine 1950 coupled to the axial stage 224, which may be an embodiment of the boundary-layer turbomachine 100. As referred to herein, a boundary-layer pump-turbine 1950 may be act as a boundary-layer compressor-turbine 1950.

The boundary-layer pump-turbine 1950 may be configured to change a thermodynamic state of the working fluid. In particular, the boundary-layer pump-turbine 1950 may be configured to liquefy the working fluid, at least partially. Such liquefaction may be advantageous to leverage the heat of vaporization for energy from a heat source supplying the heat input 1210. For example, extraction of heat from low-grade heat sources may be enabled. Advantageously, use of heat sink(s) such as condensers, which cause net loss of energy from the system 1900, may be avoided.

The boundary-layer pump-turbine 1950 may include a plurality of duct walls defining ducts configured to receive the working fluid. The plurality of duct walls of the boundary-layer pump-turbine 1950 may be frictionally engaged with the working fluid and configured for drivable rotation about a longitudinal axis of the boundary-layer turbine 1950. The plurality of duct walls may be configured to transfer energy (transmit power) to and/or from the working fluid flowing therein. As a result, the working fluid may be condensate to generate the condensate for the heater 1205.

In some embodiments, the boundary-layer pump-turbine 1950 may act substantially as a pump to ensure appropriate pumping of fluid through the system 1900. In some embodiments, the boundary-layer pump-turbine 1950 may compress the working fluid to cause phase change from vapor to liquid. For example, the boundary-layer pump-turbine 1950 may receive multi-phase (vapor and liquid) working fluid and may compress this working fluid to condense at least some of the vapor in the working fluid to generate condensate. In some cases, boundary-layer pump-turbine 1950 may substantially generate fully liquid working fluid.

In some embodiments, the boundary-layer turbine 1230 and the axial stage 224 may be part of, or may form, the boundary-layer energy extraction subsystem 1204. Additional turbine stages may be provided, e.g. in the regeneration subsystem 1202. In some embodiments, the axial stage 224 may be absent from the regeneration subsystem 1202. In some embodiments, only boundary-layer turbomachines may be provided in the regeneration subsystem 1202.

In some embodiments, the boundary-layer pump-turbine 1950 may act as a turbine to extract energy from the working fluid to further reduce the energy of the working fluid to generate condensate therefrom for re-use.

In some embodiments, the boundary-layer pump-turbine 1950 may configured to operate flexibly as either a pump or turbine to generate the condensate.

In some embodiments, the cooled and condensed working fluid from the boundary-layer pump-turbine 1950 may be supplied to the electric generator 1270 for cooling of the electric generator 1270, i.e. preheating of the condensate. The working fluid is then returned to the heater 1205 in the form of at least partial condensate. It is found advantageous to configure the system 1900 to generate substantially liquid working fluid for supplying to the heater 1205.

The thermodynamic properties of the working fluid at positions A-19, B-19, and C-19 are listed below for an exemplary embodiment. In some embodiments, the working fluid may be ethane. In some embodiments, the working fluid may be carbon dioxide, propane, or propyne.

| Position | Temperature (° F.) | Pressure (psig) | Density (lbm/ft$^3$) | Vapor quality (lbm/lbm) |
| --- | --- | --- | --- | --- |
| A-19 | 65.00 | 250 | 1.58 | 1.00 |
| B-19 | −23.71 | 150 | 1.23 | 0.94 |
| C-19 | 12.17 | 250 | 1.95 | 1.00 |

Note:
the quality is defined as the ratio of the mass of the vapor fraction of the working fluid to the total mass of the working fluid.

Multi-phase properties of the working fluid are listed below for an exemplary embodiment.

| Position | Density (lbm/ft$^3$) | | Enthalpy (BTU/lbm) | |
| --- | --- | --- | --- | --- |
| | Liquid | Vapor | Liquid | Vapor |
| A-19 | — | 1.58 | — | 266.13 |
| B-19 | 28.82 | 1.16 | 65.10 | 233.29 |
| C-19 | — | 1.95 | — | 238.68 |

Figure 20A:
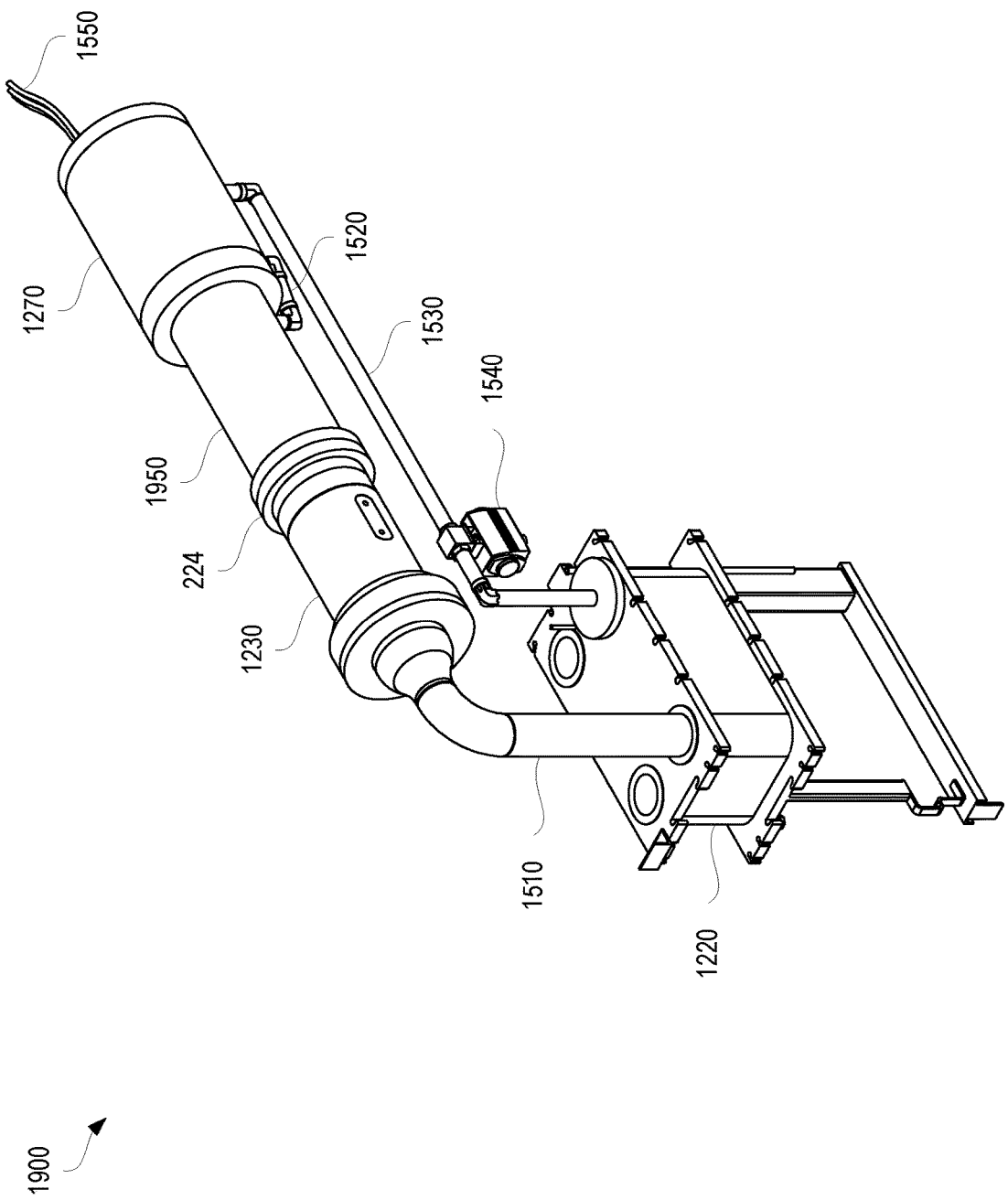
FIG. 20A is a perspective view of the system, in accordance with an embodiment.

FIG. 20A is a perspective view of the system, in accordance with an embodiment.

Figure 20B:
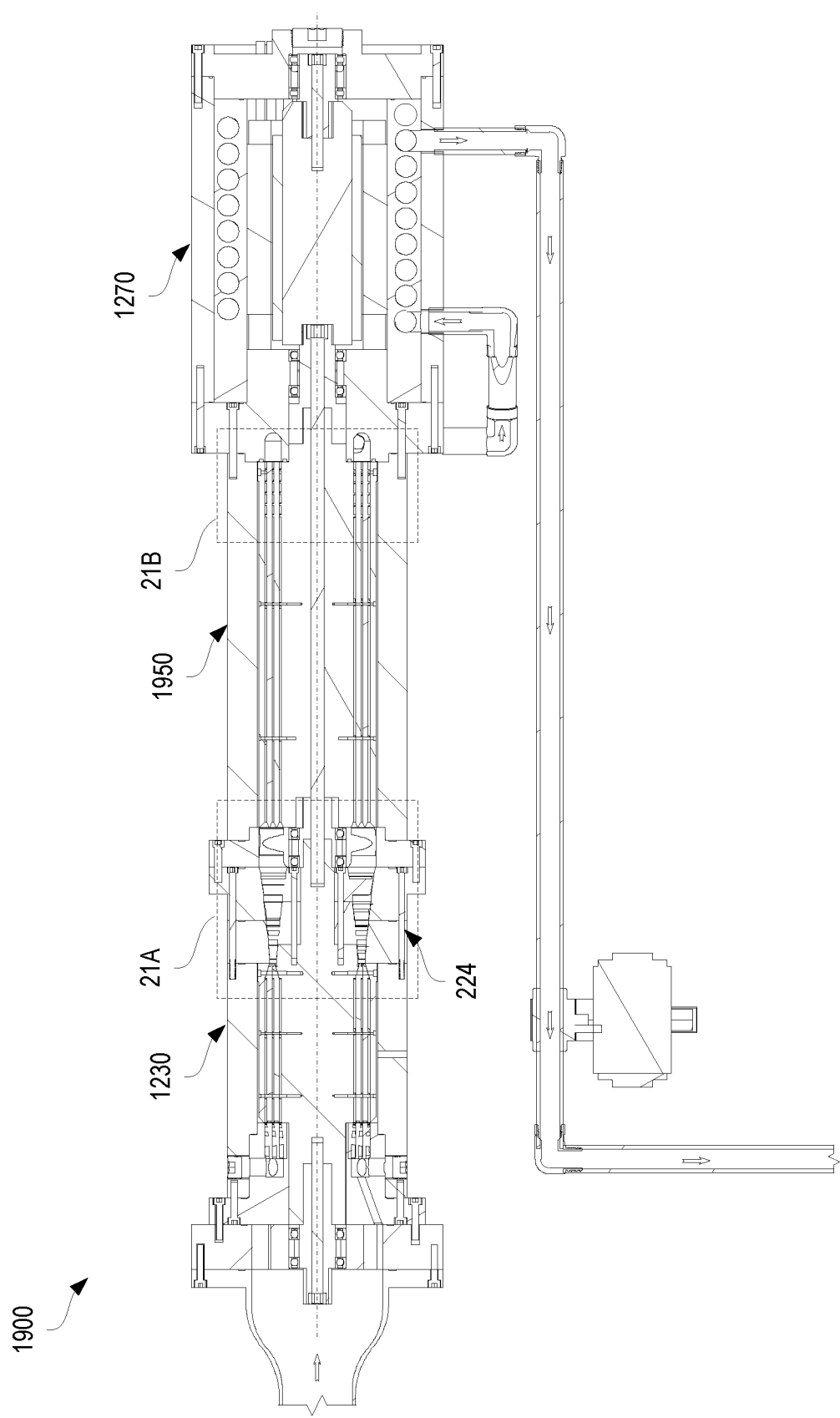
FIG. 20B is a cross-sectional view of the system of FIG. 20A, in accordance with an embodiment.

FIG. 20B is a cross-sectional view of the system of FIG. 20A, in accordance with an embodiment.

FIG. 21A is an enlarged view of region 21A in FIG. 20B.

FIG. 21B is an enlarged view of region 21B in FIG. 20B.

The plurality of ducts of the boundary-layer turbine 1230 may be at least partially defined by corresponding duct walls. These duct walls may be configured for drivable rotation about the longitudinal axis 102 by the working fluid frictionally dragging them at least partially azimuthally around the longitudinal axis 102 to transfer energy from the working fluid flowing in the plurality of ducts.

The axial stage 224 may be sandwiched in-between the boundary-layer turbine 1230 and the boundary-layer pump-turbine 1950.

The boundary-layer pump-turbine 1950 may receive the working fluid, with reduced energy, from the axial stage 224 into a plurality of ducts at least partially defining the boundary-layer pump-turbine 1950. The plurality of ducts may be at least partially defined by corresponding second duct walls that are frictionally engaged with the working fluid and configured for drivable rotation about the longitudinal axis 102.

In various embodiments, the duct walls of the boundary-layer pump-turbine 1950 may be configured to transfer energy to, or from, the working fluid flowing in the plurality of ducts of the boundary-layer pump-turbine 1950 in order to at least partially condense the working fluid.

The axial stage 224 may be coupled to the two boundary-layer turbomachines at opposite ends of the axial stage 224 to axially space apart the boundary-layer turbine 1230 and the boundary-layer pump-turbine 1950.

In various embodiments, the boundary-layer turbine 1230, the axial stage 224, and the boundary-layer pump-turbine 1950 (and, in some embodiments, the electric generator 1270) may be integrally formed for common rotation. For example, in some embodiments, the components may be attached or integrally coupled to one another via threadable connections without intermediate shaft bodies or gearing and, thus, a "shaft" may be formed only after integrating the separate components together.

The electric generator 1270 may be coupled to the axial stage 224 and the boundary-layer turbine 1230 via coupling with the boundary-layer pump-turbine 1950 to generate electricity, which is output from the electric generator 1270 via electrical cables 1550.

After forming condensate in the boundary-layer pump-turbine 1950, cold working fluid is drawn into and/or around the electric generator 1270 via a generator inlet 1520.

Advantageously, heat generated by the electric generator 1270 may be absorbed by the working fluid to simultaneously mitigate heat-associated degradation (e.g. via heat buildup) in the electric generator 1270 and to preheat the working fluid to reduce heat loss from the system 1200.

After preheating by receiving heat from the electric generator 1270, the working fluid is drawn out via an outlet duct 1530 back to the heat exchanger 1220 of the heater 1205.

In various embodiments, the boundary-layer turbine 1230, and/or ducts thereof, may have substantially similar inner and outer diameters to, respectively the boundary-layer pump-turbine 1950, and/or ducts thereof. In some embodiments, the number of ducts of the boundary-layer turbine 1230 and the boundary-layer pump-turbine 1950 may be substantially similar.

In various embodiments, the plurality of ducts of the boundary-layer turbine 1230 may be substantially axially shorter than the plurality of boundary-layer pump-turbine 1950.

In various embodiments, the boundary-layer pump-turbine 1950 may comprise ducts with protrusions or features extending therein to guide the fluid helically around an outlet end of the ducts.

In reference to FIG. 21B, a duct of the boundary-layer pump-turbine 1950 may comprise duct walls 220A, 220B, 220C, 220D, 220E, 220F that may be elongated along the longitudinal axis 102 and that may be circumferentially surrounding the longitudinal axis. In some embodiments, these may be cylindrically-shaped around the longitudinal axis 102.

In various embodiments, protrusions 2110 from the duct walls 220A, 220C, 220E may radially extend to respective opposed duct walls 220B, 220D, 220F. In some embodiments, the protrusions 2110 may spirally extend at least partially along the longitudinal axis 102 to draw the working fluid along the respective ducts. For example, the protrusions 2110 may be additively manufactured.

The axial stage 224 may be diverging along the longitudinal axis 102.

Figure 22A:
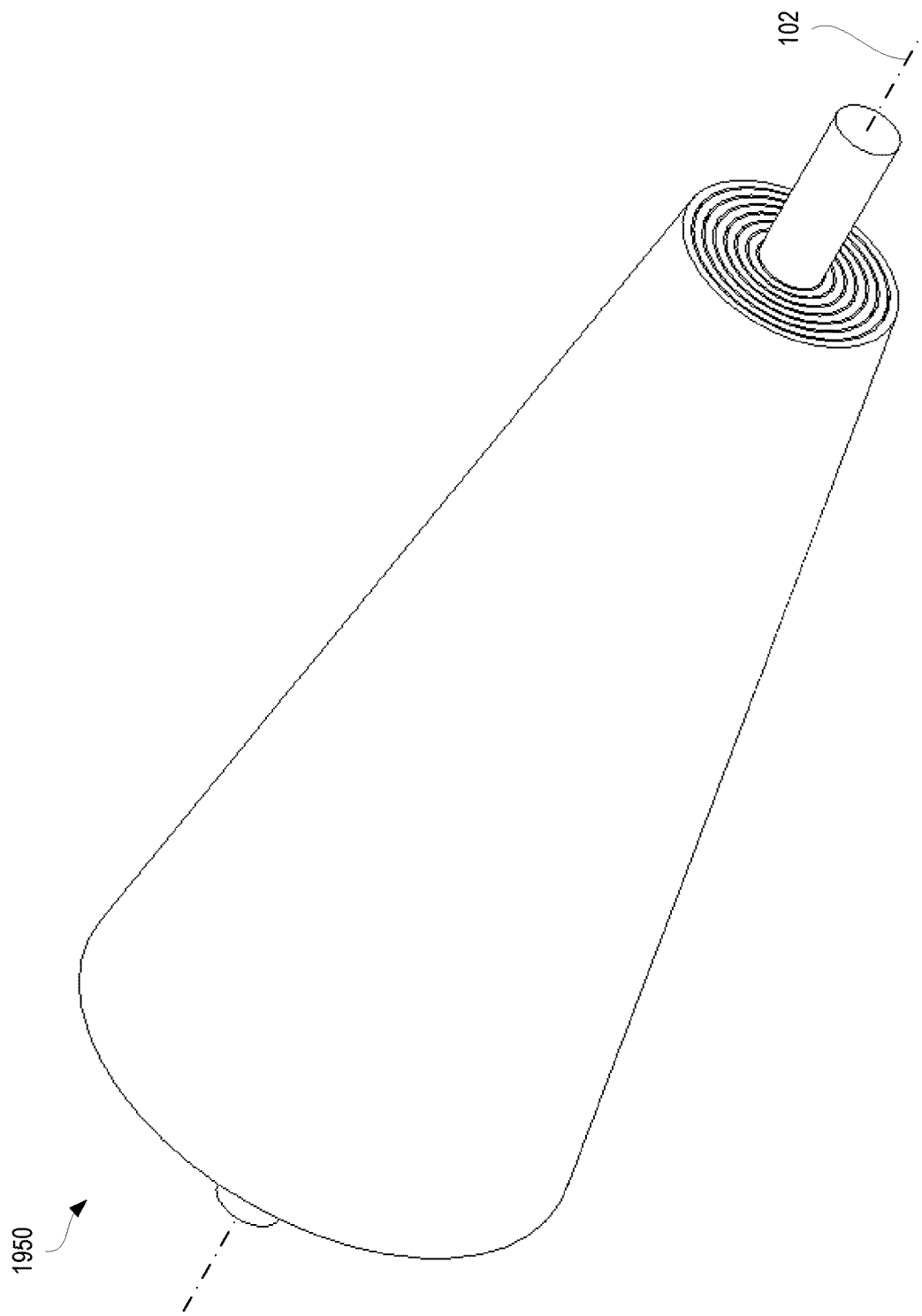
FIG. 22A is a perspective view of a boundary-layer pump-turbine, in accordance with an embodiment.

FIG. 22A is a perspective view of a boundary-layer pump-turbine 1950, in accordance with an embodiment.

Figure 22B:
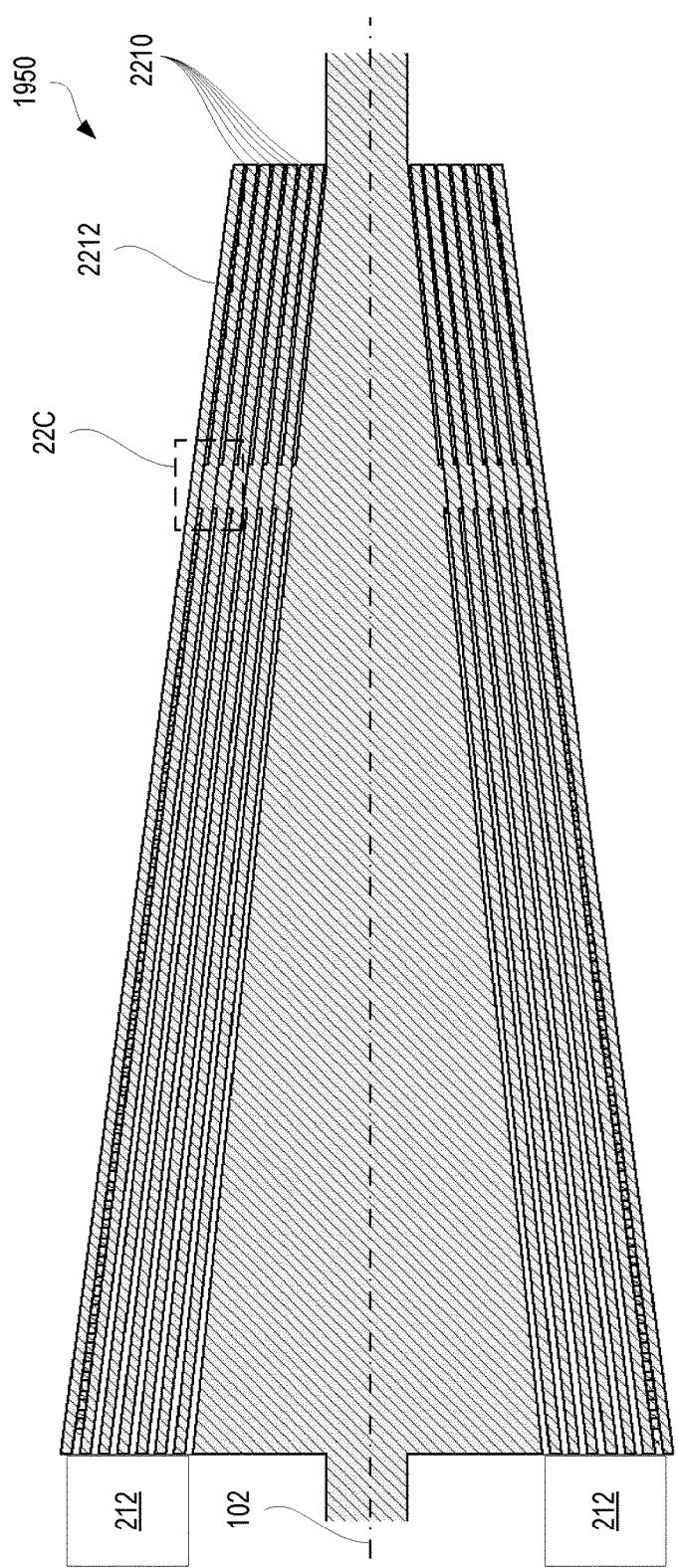
FIG. 22B is a cross-sectional view of the boundary-layer pump-turbine normal to a longitudinal axis thereof, in accordance with an embodiment.

FIG. 22B is a cross-sectional view of the boundary-layer pump-turbine 1950 normal to the longitudinal axis 102, in accordance with an embodiment.

Figure 22C:
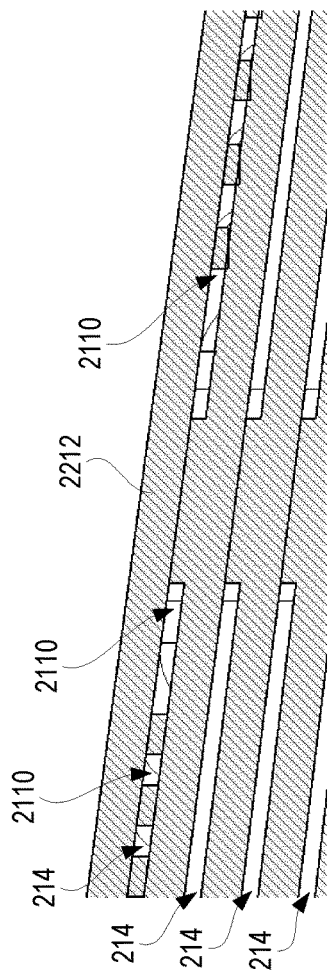
FIG. 22C is an enlarged view of region 22C in FIG. 22B.

FIG. 22C is an enlarged view of region 22C in FIG. 22B.

In some cases, the boundary-layer pump-turbine 1950 may be an embodiment of the boundary-layer turbomachine 100.

Several bodies 2210 (a plurality thereof) of the boundary-layer pump-turbine 1950 may be elongated along the longitudinal axis 102 and may be rotatable thereabout.

The bodies 2210 may be arranged at least partially concentrically with each other around the longitudinal axis 102. The bodies 2210 may be elongated at least partially concentrically with each other along the longitudinal axis 102. The bodies 2210 may be coupled for common rotation with each other. A body 2210 may be arranged at least partially within another body 2210 to define a duct 214 extending longitudinally therebetween.

The bodies 2210 may be substantially hollow to allow a co-axial arrangement thereof. In various embodiments, the bodies 2210 may be axi-symmetric or substantially axi-symmetric about the longitudinal axis 102. For example, the bodies 2210 may be continuously symmetric about the longitudinal axis 102, such as if the bodies were bodies of revolution, or may define a discrete n-fold symmetry about the longitudinal axis 102. In some embodiments, the bodies 2210 may be cylindrically-shaped or frusto-conically shaped (or otherwise radially tapered along the longitudinal axis 102). In some embodiments, the bodies 2210 may be substantially similar to the tubes 302.

In some embodiments, working fluid flowing through the boundary-layer pump-turbine 1950 may change density, e.g. the working fluid may change phase, partially or completely. In various embodiments, the shape(s) of the bodies 2210 may be adapted to accommodate the changing density of the working fluid, such as by varying a cross-sectional area of ducts 214 along the longitudinal axis 102. For example, a frusto-conical shape may be adapted to facilitate efficient operation when the working fluid changes phase from vapor to liquid, partially or completely. In particular, a reduction in cross-sectional area may mitigate formation of empty pockets and facilitate adhesion contact between the working fluid and duct walls to allow rotational driving via rotation of the bodies 2210. In some embodiments, the shape(s) of the bodies 2210 may be adapted to promote compression and/or pumping of working fluid.

One or more protrusions on a body 2210 may extend longitudinally at least partially along the duct and radially towards another body 2210 in the duct 214 to define at least one channel in the duct.

In some embodiments, the one or more protrusions 2110 on the body 2210 may extend to the body 2210 in the duct 214.

In some embodiments, the protrusions 2110 may spirally extend along and around the longitudinal axis 102 in the duct 214 to draw working fluid along the duct 214 and/or induct fluid into the duct 214. In some embodiments, the protrusions 2110 may be configured similar to inducer blades.

In some embodiments, the channel may be a spiral channel (or spiralling channels), such as spiral channels 2312A, 2312B, 2312C. The channel may be configured to receive and draw the fluid from a flow inlet 212 into the duct 214.

The flow inlet 212 may be configured to receive working fluid at least partially azimuthally around the longitudinal axis 102 into the duct 214 in accordance with the common rotation of the bodies 2210. For example, the azimuthal component of the velocity of the fluid in the duct 214 may be generally in alignment with an azimuthal component of the velocity of a surface of wall of the bodies 2210.

The working fluid in the duct 214 may be frictionally engaged with the bodies 2210 to transfer mechanical energy to, or from, the fluid.

In some embodiments, the flow inlet 212 may be configured to supply working fluid into the duct 214 to frictionally drive the bodies 2210 to achieve common rotation thereof. This common rotation may be in alignment with the azimuthal component of the velocity of the walls of the duct 214 defined by the bodies with the azimuthal component of the velocity of the fluid therein.

In some embodiments, the flow inlet 212 may be configured to draw working fluid into the duct 214 via frictional engagement with rotating bodies 2210 by imparting an azimuthal component of velocity. This velocity may be in alignment with the azimuthal component of the velocity of the walls of the duct 214 defined by the bodies with the azimuthal component of the velocity of the fluid therein.

In some embodiments, the flow inlet 212 may be an (at least partially azimuthally inclined) nozzle or slot.

The bodies 2210 may be circumferentially surrounded by a housing 2212 that is coupled to the bodies 2210 for common rotation with the bodies 2210 around the longitudinal axis. The housing 2212 may be constructed substantially similarly to a body 2210. The housing 2212 may be elongated along the longitudinal axis 102 and may circumferentially surround the longitudinal axis 102.

The one or more protrusions 2110 may extend fully from one body 2210 to the next concentric body 2210 (or the housing 2212). For example, tip clearances between the protrusion 2110 and a body 2210 may be substantially zero to prevent any flow from passing across the protrusion 2110.

Figure 23:
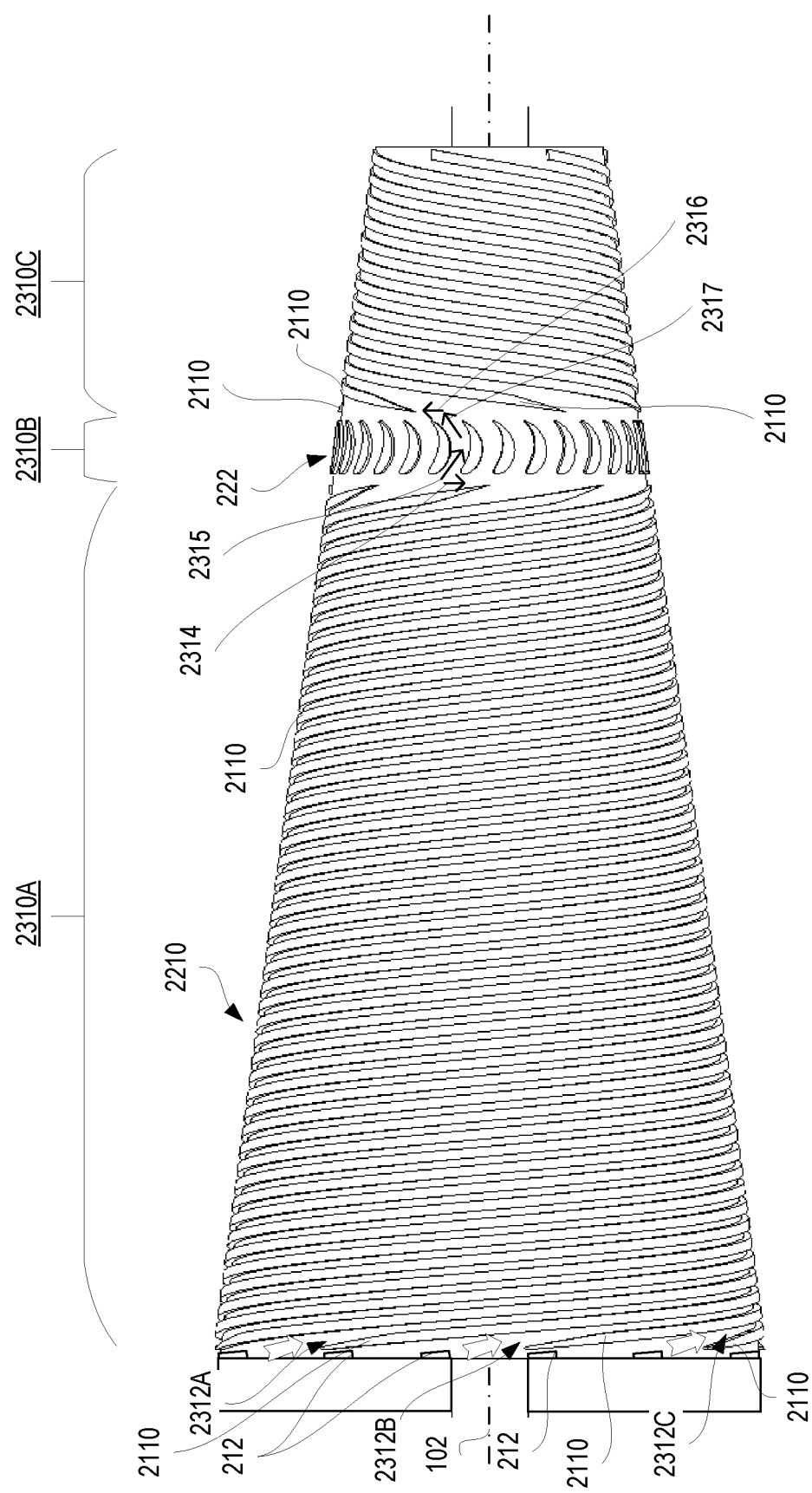
FIG. 23 is a side elevation view of the boundary-layer pump-turbine of FIGS. 22A-22C with a housing 2212 thereof not shown.

FIG. 23 is a side elevation view of the boundary-layer pump-turbine 1950 of FIGS. 22A-22C with the housing 2212 not shown, in accordance with an embodiment.

The view shows a body 2210 with protrusions 2110 extending therefrom. The protrusions 2110 may extend radially from the body 2210 to another surrounding body to define a duct 214 therebetween. In various embodiments, the protrusions 2110 may fill a radial extent between two concentrically arranged adjacent bodies 2210 to mitigate or completely stop flow normal to the protrusion, at the protrusion itself, along the body 2210.

The body 2210 has a first portion 2310A, a second portion 2310B, and a third portion 2310C. Each portion may have a different type of protrusion extending therefrom.

In the first portion 2310A and the second portion 2310C, the body 2210 may have protrusions 2110 that may spirally extend at least partially along and around the longitudinal axis 102 to induct working fluid into the duct 214 and/or draw working fluid along the duct 214.

In some embodiments, the protrusions 2110 may define the spiral channels 2312A, 2312B, 2312C (or spiralling channels) along the longitudinal axis 102 in the duct 214. The protrusions 2110 may define walls of the spiral channels 2312A, 2312B, 2312C. For example, three substantially continuous helical protrusions adjacent to each other helically extend along the longitudinal axis 102 to define three adjacent helical channels. Inlets of the spiral channel 2312A, 2312B, 2312C may be azimuthally oriented to receive the fluid supplied by flow inlets 212.

In some embodiments, the spiral channels 2312A, 2312B, 2312C may have fixed pitch and/or variable pitch.

In the second portion 2310B, the body 2210 may have a plurality of blades 222, which may also be referred to herein as protrusions. The plurality of blades 222 may be disposed in the duct 214 downstream of the protrusions 2110 of the first portion 2310A The plurality of blades 222 may be configured to reorient flow received between the plurality of blades 222 from a first direction 2315 having a first azimuthal component 2314 to a second direction 2317 having a second azimuthal component 2316. The first azimuthal component 2314 may be opposed to the second azimuthal component 2316.

In some embodiments, the plurality of blades 222 may facilitate energy extraction from the working fluid.

In various embodiments, reorientation of the working fluid to reverse the azimuthal component of the working fluid may cause or facilitate pumping or compression of the fluid in the third portion 2310C.

In the third portion 2310C, the body 2210 may include spiralling protrusions 2110. The protrusions 2110 may define spiral channels, e.g. helical channels, as in the first portion 2310A. In some embodiments, the pitch of the protrusion 2110 in the third portion 2310C may be different than the pitch of the protrusion 2110 in the first portion 2310A. In some embodiments, the pitch may be larger in the third portion 2310C than in the first portion 2310A.

In some embodiments, the chirality (or handedness) of a helix or spiral defined by the protrusions 2110 may vary from the first portion 2310A to the third portion 2310C. In some embodiments, reorientation of the flow from the first direction 2315 to the second direction 2317 in the second portion 2310B may be configured to adapt a direction of the working fluid to an angle or chirality of the helix or spiral (or a channel defined thereby) in the third portion 2310C. In some embodiments, the protrusions 2110 in the third portion 2310C may be adapted to the direction 2317 to allow receiving of the working fluid therefrom.

In various embodiments, the first portion 2310A may be configured draw energy from the working fluid. The third portion 2310C may be configured to compress or pump the working fluid, including by inducing fluid along the duct 214 via the protrusions 2110. In both the first portion 2310A and the third portion 2310C, duct walls of the duct 214 may be in common rotation to achieve frictional engagement with the working fluid (via frictional drag) to transfer energy to, and/or from, the working fluid. Advantageously, allow common rotation of duct walls may facilitate energy transfer to and/or from the fluid via frictional drag.

In various embodiments, a turbomachine hub of unitary construction (the body 2210) may be used to achieve energy extraction and energy injection in sequence.

FIG. 24 is an exploded view of bodies 2210 of a boundary-layer pump-turbine 1950, in accordance with an embodiment.

The bodies 2210 may be concentrically arranged inside or within each other along the longitudinal axis 102 to define ducts 214 therebetween. In some embodiments, the bodies 2210 may be generally cylindrical with protrusions 2110 extending therefrom. In some embodiments, the protrusions 2110 on the bodies 2210 may be substantially the same. The housing 2212 may envelope the plurality the bodies 2210. In various embodiments, the housing 2212 and the bodies 2210 may be fastened together for rotation about the longitudinal axis 102.

FIG. 25A is a perspective view of a body 2210 of the boundary-layer pump turbine 1950 of FIG. 24.

Figure 25B:
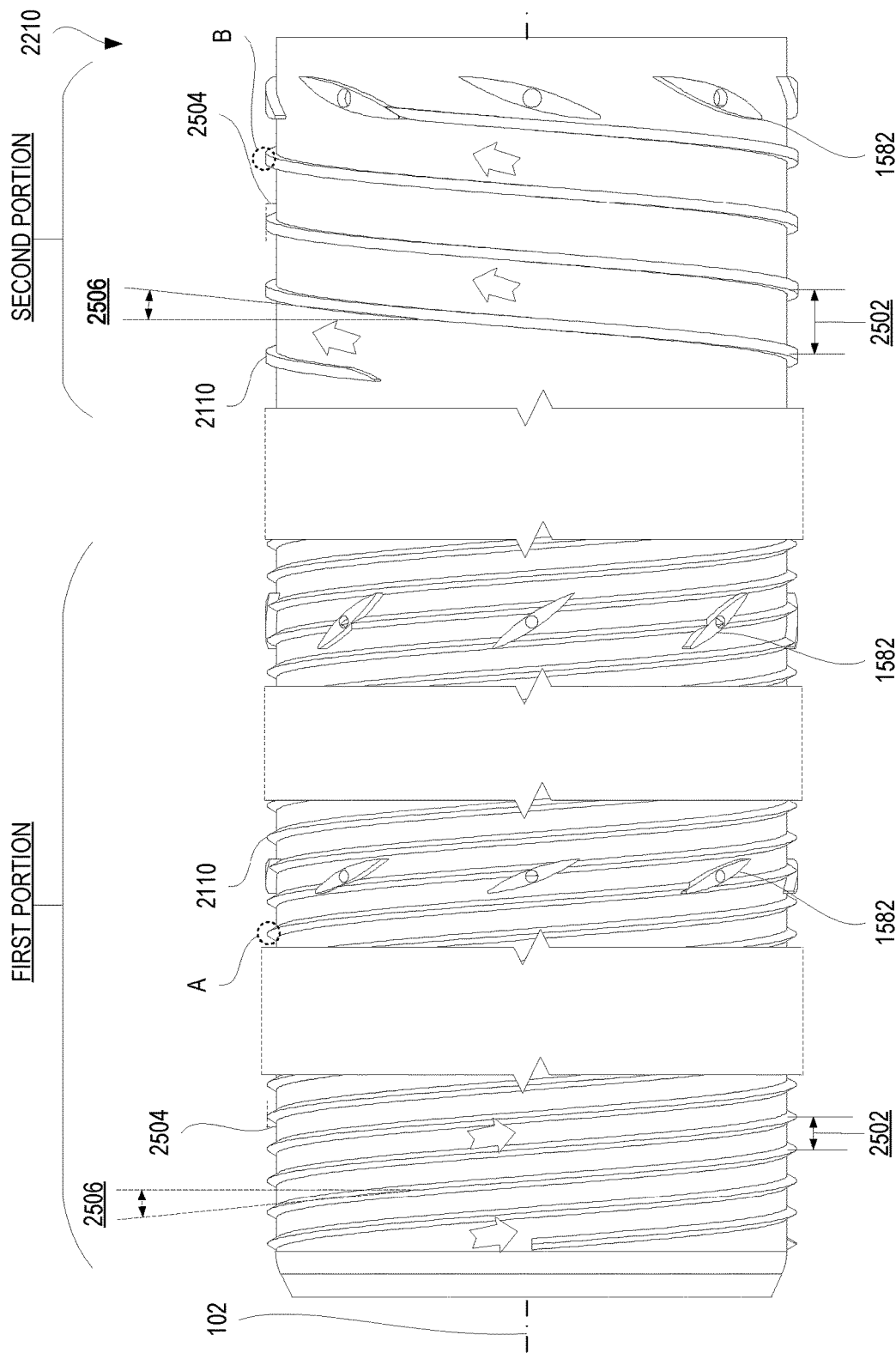
FIG. 25B is a side elevation view of the body in FIG. 25A.

FIG. 25B is a side elevation view of the body 2210 in FIG. 25A.

Large white arrows in FIG. 25B schematically represent flow through the boundary-layer pump-turbine 1950.

In reference to FIGS. 25A-25B, the body 2210 comprises two portions (see braces in FIG. 25B). In some embodiments, a first portion may be configured to extract energy from the fluid and a second fluid may be configured to inject energy into the fluid to pump or compress the fluid.

In some embodiments, an azimuthal direction of the fluid around the longitudinal axis 102 may reverse from the first portion to the second portion.

Each portion has a spiralling or helical protrusion extending radially outwardly. Each spiral may have a pitch 2502 defined by a longitudinal distance between consecutive peaks of the spiral or helix, a radial depth 2504 defined by the radial extension of the protrusion 2110, and an angle 2506 defined by the slant of the spiral relative to the longitudinal axis 102. In various embodiments, the pitch 2502 may be configured to draw the fluid at least partially through the duct 214.

In various embodiments, the pitch 2502 may be adapted to or may be configured to control a dwell time or flow-through distance of the fluid in the duct 214. For example, reducing the pitch 2502 may increase the flow-through distance of the fluid in the duct 214 to thereby increase (a duration or length of) frictional contact of the working fluid with one or both walls of the duct, as may be defined by the bodies 2210 and/or the housing 2212. Increasing frictional contact may allow higher or more efficient energy extraction from the fluid.

In some embodiments, the pitch 2502 may be adapted to prevent reverse flow in the longitudinal direction (longitudinal flow reversal). For example, excessive flow resistance (such as via an adverse pressure gradient) may result if the pitch 2502 is excessively small and/or the protrusion 2110 concerned is configured to induce reorientation of a (azimuthal) direction of the fluid. In various embodiments, the pitch 2502 may be widened to reduce flow resistance.

In some embodiments, the pitch 2502 may be adapted to mitigate an adverse pressure gradient preventing the fluid from being drawn out of the duct 214 via the outlet end 204.

In some embodiments, the pitch 2502 may vary from the first portion to the second portion. The pitch 2502 in the first portion may be relatively smaller than the pitch 2502 in the second portion, e.g. for one or more reasons described above.

In some embodiments, the protrusion 2110, or a direction of elongation thereof, may be relatively more aligned with the azimuthal direction around the longitudinal axis 102 and/or have a relatively smaller pitch 2502 at an upstream position in the duct 214 compared to a downstream position therein. At downstream positions, a direction of elongation of the protrusion 2110 may be more misaligned with the azimuthal direction and/or the pitch 2502 may be larger. For example, in some cases, such a configuration may prevent stalling of a turbine and pumping of the fluid in the duct 214.

In some embodiments, the pitch 2502 may be decreased and the protrusion more aligned (or completely) aligned with the azimuthal direction to achieve pumping of fluid in the duct 214.

The radial depth 2504 may be adapted to a height of a duct 214 to prevent flow across the protrusion 2110, e.g. over the protrusion 2110. Avoiding formation of gaps between the protrusion 2110 and an outer body or housing may prevent formation of small gaps which may lead to structural failure and/or fatigue. For example, rapid acceleration in a narrow gap can cause phase change, and in some cases, generation of high-speed high-density fluid which may ballistically impact surfaces of turbomachinery components.

In some embodiments, the radial depth 2504 may be vary along the longitudinal axis 102, e.g. to account for changes in duct height due to changes in density of the working fluid. In some embodiments a radial depth 2504 may be larger or smaller than a duct height to account for temperature expansion and/or to allow frictional engagement between bodies 2210 via the protrusions 2110.

The angle 2506 may vary from the first portion to the second portion. In some embodiments, the angle 2506 may be between 4° and 4.5° in the first portion and may be between −5° and −5.5° in the second portion. The angle 2506 may be varied to achieve or induce a change in the azimuthal component of the flow direction or may be adapted to a predetermined azimuthal component of the flow direction.

In various embodiments, the protrusions 2110 may protrude from a surface of the duct wall in a shape having a triangular cross-section (normal to the longitudinal axis 102) in the first portion (see region A in FIG. 25B) and a rectangular cross-section (normal to the longitudinal axis 102) in the second portion (see region B in FIG. 25B). In some embodiments, profiles of the protrusions 2110 may be based on turbomachinery blades, such as inducer blades.

In various embodiments, the bodies 2210 and the housing 2212 may be coupled for common rotation via one or more fasteners 1582.

As shown in FIG. 25B, the fasteners 1582 may be adapted to the flow direction, e.g. substantially oriented along a general flow direction. For examples, the fasteners 1582 may be adapted to facilitate laminar flow and reduce interference. In some embodiments, the protrusion 2110 or a width thereof may be adapted to allow fastening via the fastener 1582. For example, in some embodiments, a width of the protrusion 2110 may at least as large as an elongated fastener or a through hole configured to complementarily receive the elongated fastener. Such an elongated fastener may pass through all of, or a plurality, of the bodies 2210 (and/or housing 2212) to couple the respective bodies 2210 (and/or housing 2212) to each other for common rotation. In some embodiments, the fasteners 1582 may be threadable fasteners. In some embodiments, the fastener may be a bolt configured to couple to a nut. In various embodiments, the fastener 1582 may integrally coupled the bodies 2210 to act as a rigid body.

In some embodiments, the bodies 2210 may be in unitary construction or otherwise integrally formed. For example, the bodies 2210 may be additively manufactured. In some embodiments, the fasteners 1582 may be pillars or coupling structures for coupling a plurality of bodies 2210 to each other. For example, such pillars may be additively grown from one body 2210 to the another, solid-state welded to couple two or more bodies 2210 to each other, and/or formed by selectively machining (subtractively manufactured) out the duct 214 from a solid structure.

Figure 26:
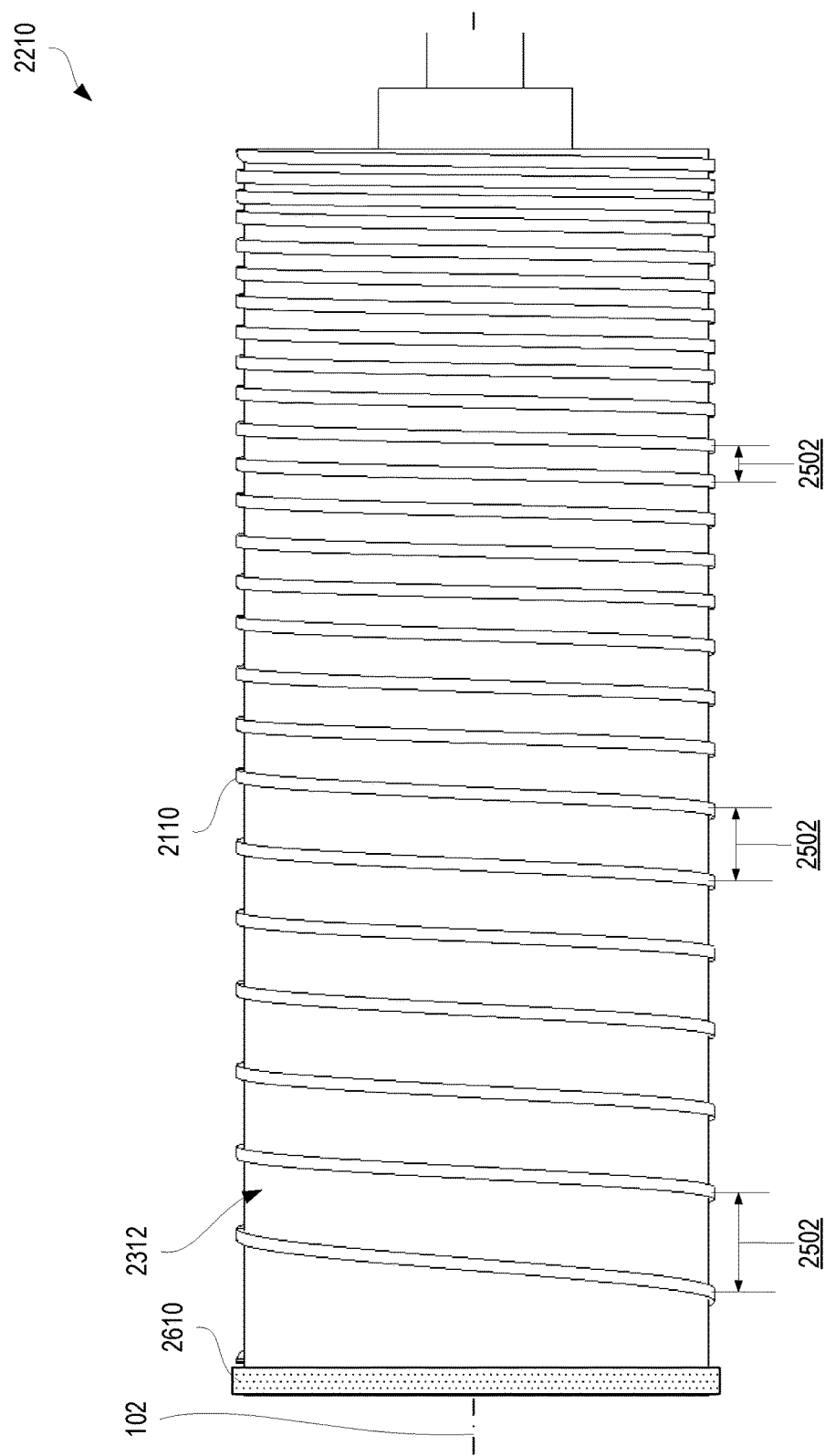
FIG. 26 is a side elevation view of a body, in accordance with another embodiment.

FIG. 26 is a side elevation view of a body 2210, in accordance with another embodiment.

The pitch 2502 of the protrusion 2110 in FIG. 26 may vary along the longitudinal axis 102. For example, the pitch 2502 may gradually or continuously decrease.

The protrusion 2110 may define a single channel 2312 continuously spiralling around the body 2210.

In some embodiments, energy extraction may be decrease as the pitch 2502 is reduced and energy injection (pumping or compression) may correspondingly increase.

In some embodiments, the pitch 2502 may be varied to account for a change in density of the working fluid. Reducing the pitch 2502 may correspondingly reduce how much space a fluid has available to flow through by reducing a width of the channel 2312 in the longitudinal direction. This space may be adapted to the volume reduction in working fluids due to density change as they flow through the duct 214. In some embodiments, considerable volume change may occur due to phase change.

In various embodiments, the surface of the duct walls may be varied to control the amount for frictional drag exerted on the fluid. Varying the frictional drag may vary the energy extracted from, or injected into, the fluid. For example, methods of drag reduction and/or drag enhancement may be employed.

In some embodiments, a boundary-layer adjacent to a duct wall may be tripped using a tripping device or features to modify turbulent characteristics of the flow to vary the frictional drag.

In some embodiments, surface roughness and/or chemistry may be varied to achieve desired drag and/or slippage, e.g. surface roughness and/or chemistry may be adapted based on a predetermined target friction.

In some embodiments, one surface may have a different surface roughness than an opposed surface in the same duct 214, e.g. the surface roughness may be varied based on a density of working fluid near the surface wall. This density may vary radially from one surface to the next surface, including due to centrifugal forces drawing heavier fluid radially outward in the duct. In some embodiments, fluid near the radially outer surface of a duct 214 may have a larger mass fraction or proportion of liquid phase than fluid near the radially inner surface of a duct. In some embodiments, the surface roughness on the radially outward surface may be greater, or in some cases lesser, than surface roughness on a radially inner surface to extract more work from the heavier fluid.

In some embodiments, the surfaces of duct walls may be smoothened to reduce friction to reduce azimuthal flow, e.g. to allow greater compression (by restricting volume) and/or flow straightening by the vanes or the plurality of blades 222.

In some embodiments, duct walls may be partially sheathed with a material, such as vulcanized rubber, with desired frictional and chemical properties to vary adhesion of the fluid to the surface. For example, a tubular section 2610 of material may be used. In some embodiments, coatings may be chemically bonded to duct walls. In some embodiments, such sheathing may be upstream or downstream of a plurality of blades 222. In some embodiments, such sheathing may be provided on a body 2210 devoid of protrusions or devoid of protrusions other than the plurality of bladed 222.

FIG. 27 is a side elevation view of a body 2210, in accordance with yet another embodiment.

The body 2210 may comprise a helical protrusion 2110 radially extending from the body 2210 to form a protrusion defining a triangular cross-section. The helical protrusion 2110 may have a constant pitch 2502.

In some embodiments, the protrusions 2110, the duct walls 220, and the housing 2212 in common rotation may allow admit advantages associated with bladed turbomachines and adhesion-based turbines. For example, in various embodiments, multiphase operation and efficient compression/pumping may be achieved.

Common rotation of the protrusions 2110, the duct walls 220, and the housing 2212 may establish at least partially azimuthal flow of the working fluid through ducts 214 defined between co-rotating frictional surfaces defined by the duct walls 220. In some embodiments, a turbomachine may have only a single duct 214 defined between co-rotating frictional surfaces. Co-rotation of the frictional surfaces may allow contact of the protrusions 2110 with both frictional surfaces defining the duct without seizing of turbomachinery. Co-rotation of the frictional surfaces may allow frictionally dragging of the working fluid by the frictional surfaces or the frictional surfaces by the working fluid, depending on the relative azimuthal or angular velocity between the frictional surfaces configured for common rotation and the working fluid, i.e. the difference between the azimuthal component of the working fluid and the azimuthal velocity of the frictional surfaces. Due to differences in radial distances from the longitudinal axis 102 of different (adjacent) duct walls 220, the azimuthal velocities of adjacent frictional surfaces may be different. In various embodiments, the azimuthal velocities of adjacent frictional surfaces defined by duct walls 220 of a duct 214 may both be greater than the azimuthal component of the working fluid (such as for energy injection into the working fluid for pumping and/or compression), or less than the same (such as for energy extraction from the working fluid for power generation). In some embodiments, energy extraction and energy injection may be provided in a single duct by varying the geometry of the duct 214 using the duct walls 220 and the protrusions 2110 to achieve desired working fluid velocities.

Some embodiments of turbomachines may include concentrically arranged elongated inducer hubs having blades extending outwardly from the hubs and having a housing surrounding the hubs, wherein the blades of the inducer are in contact with the housing to prevent flow across the blades, and the hubs and the housing are coupled together for common rotation, e.g. by being fastened to each other.

FIG. 28 is a side elevation view of the body 2210, in accordance with a further embodiment.

The embodiment of FIG. 28 includes protrusions 2110A, 2110B, 2110C, 2110D that are configured to extend longitudinally at least partially along the duct 214 and radially in the duct 214 to define channels 2313A, 2313B, 2313C in the duct 214.

The protrusion 2110A may be separate from the protrusions 2110B, 2110C and the protrusion 2110B may be separate from the protrusion 2110C.

The channels 2313A, 2313B, 2313C may be defined between, respectively, the protrusion 2110A and the protrusion 2110B, the protrusion 2110B and the protrusion 2110C, and the protrusion 2110C and the protrusion 2110D.

The channels 2313A, 2313B, 2313C may be configured to receive and draw the fluid from the flow inlets 212 into the duct 214.

The protrusions 2110A, 2110B, 2110C, 2110D may be at least partially azimuthally oriented to receive the fluid supplied by the one or more flow inlets 212 into the channels 2313A, 2313B, 2313C.

In some embodiments, the protrusions 2110A, 2110B, 2110C, 2110D may extend radially from a first body 2210 and a second body 2210 defining the duct 214.

The bodies 2210 defining the duct 214 may be drivably rotatable to draw the fluid through the turbomachine to achieve pumping of the fluid. The protrusions 2110A, 2110B, 2110C, 2110D may allow operation of boundary-layer turbomachines for at least partial pumping of fluids as they may prevent premature orientation of the fluid velocity parallel to the longitudinal axis. Flow reversal and stalling may be prevented.

FIG. 29 is a flowchart of an exemplary method 2900 of generating power using a working fluid configured to change phase, at least partially, for generating power.

At step 2902, the method 2900 may include imparting heat to condensate to cause at least partial vaporization of the condensate to generate the working fluid.

At step 2904, the method 2900 may include receiving the working fluid on blades of a turbine rotor to drivably rotate the turbine rotor to generate shaft power.

At step 2906, the method 2900 may include receiving the working fluid flowing at least partially azimuthally from the turbine rotor into a duct defined between a first duct wall and a second duct wall. The first duct wall and second duct wall may circumferentially extend around the longitudinal axis and may be elongated along the longitudinal axis. The first duct wall may be radially-separated from the second duct wall.

At step 2908, the method 2900 may include driving rotatably the first duct wall and the second duct wall via frictionally engaging the first duct wall and the second duct wall with the working fluid in the duct to exchange energy with the working fluid to cause condensation of the working fluid to generate the condensate.

Some embodiments of the method 2900 may further comprise using the shaft power to drive an electric generator, cooling the electric generator using the condensate to preheat the condensate, preheating the condensate in a heat exchanger using heat from the electric generator, and/or receiving the condensate into the heater via the heat exchanger.

In some embodiments of the method 2900, a protrusion from the first duct wall may radially extend to the second duct wall and spirally extend at least partially along the longitudinal axis to draw the working fluid along the duct.

In some embodiments of the method 2900, imparting heat to the condensate to cause at least partial vaporization of the condensate to generate the working fluid may include using a heater configured to receive the condensate.

In some embodiments of the method 2900, the working fluid may be imparted energy via compression to cause condensation to generate the condensate.

Figure 30:
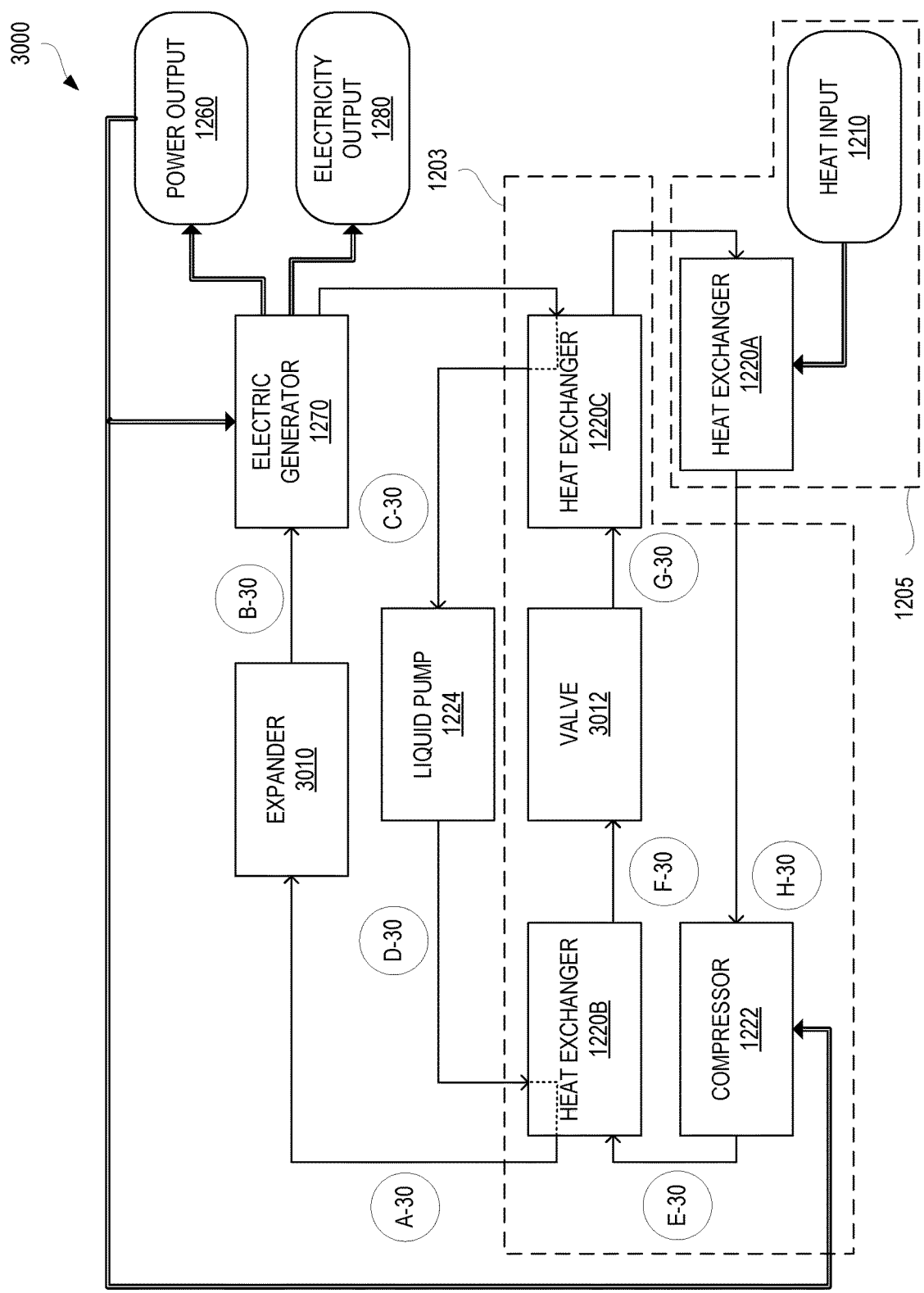
FIG. 30 is a schematic block diagram of a system for generating power using a first fluid and a second fluid fluidly isolated from each other.

FIG. 30 is a schematic block diagram of a system 3000 for generating power using a first fluid and a second fluid fluidly isolated from each other.

The first fluid may flow through positions E-30 through H-30, while the second fluid may flow through positions A-30 through D-30.

In some embodiments, it is found particularly advantageous to use ammonia as the first fluid and carbon dioxide as the second fluid due to their specific properties.

A heater 1205 may be configured to transfer heat to the first fluid to at least partially vaporize the first fluid. The heater 1205 may be provided heat input 1210, e.g. through combustion of renewable natural gas or from low-grade heat sources such as sea-water. The heat input 1210 may transferred to the first fluid via a heat exchanger 1220A of the heater 1205.

A heat exchanger 1220C may be fluidly connected (directly or indirectly) to the heater 1205 to receive the first fluid from the heater 1205. The heat exchanger 1220C may be configured to transfer heat from the first fluid to the second fluid to at least partially vaporize the second fluid.

An expander 3010 may be fluidly connected to the heat exchanger 1220C to receive the second fluid from the heat exchanger 1220C. The expander 3010 may be configured to rotatably drive a rotor of the expander 3010, such as a rotor of the plurality of rotors 300, using the second fluid. Thus, the expander 3010 may be configured to generate power. In various embodiments, the expander 3010 may be an axial turbine, a radial turbine, and/or other type of expander.

In some embodiments, the expander 3010 may be a boundary-layer turbine 1230. The plurality of ducts 214 may be configured to receive the second fluid from the heater 1205, which may frictionally drag the plurality of duct walls at least partially azimuthally around the longitudinal axis 102 of the boundary-layer turbine 1230. The plurality of duct walls may be configured to transfer energy from the fluid flowing in the plurality of ducts 214.

Another heat exchanger 1220B may be fluidly connected to the expander 3010 to receive the second fluid therefrom. The heat exchanger 1220B may be fluidly connected to the heat exchanger 1220C to receive the first fluid therefrom. The heat exchanger 1220B may be configured to generate condensate of the second fluid by transferring heat from the second fluid to the first fluid. Preheating of the first fluid may be achieved via the heat exchanger 1220B.

In various embodiments, the first fluid, which may be ammonia, is cooled in the heat exchanger 1220C by between 200° C. and 250° C., or between 300° C. and 400° C., and heated in the second heat exchanger 1220B by between 60° C. and 80° C., or between 50° C. and 100° C.

A liquid pump 1224 (or pump) may be fluidly connected to the heat exchangers 1220B, 1220C. The liquid pump 1224 may be configured to draw the condensate of the second fluid from the heat exchanger 1220C into the heat exchanger 1220B for vaporization of the second fluid.

The liquid pump 1224 may be configured to pump liquids. The heat exchanger 1220C may ensure that the second fluid is substantially in liquid form for pumping in the liquid pump 1224. At least a portion of the energy removed from the second fluid may be returned thereto via the heat exchanger 1220B. The heat exchanger 1220B may provide at least partial re-vaporization of the second fluid after pumping in the liquid pump 1224.

The liquid pump 1224 may be drivably coupled to the expander 3010 for driving the liquid pump 1224. The liquid pump 1224 may be mechanically coupled to a drive shaft of the expander 3010.

A compressor 1222 may be fluidly connected to the heat exchangers 1220B, 1220C. The compressor 1222 may be configured to receive the first fluid from heat exchanger 1220C and to draw the first fluid from the heat exchanger 1220B to the second heat exchanger 1220C.

The compressor 1222 may be drivably coupled to the expander 3010. The compressor 1222 may be mechanically coupled to a drive shaft of the expander 3010. In some embodiments, directly coupling the compressor 1222 to the expander 3010 may provide certain advantages, e.g. increased efficiency.

The heat exchangers 1220B, 1220C may be configured to prevent interaction of the first fluid with the second fluid. For example, the heat exchangers 1220B, 1220C may include counter-flow or co-flow heat exchangers, such as shell-and-tube heat exchangers.

The rotor may drive an electric generator 1270 to generate electricity. In some embodiments, a heat exchanger of the electric generator 1270 may be configured to receive the second fluid from the expander 3010 to draw heat away from the electric generator 1270.

In some embodiments, the heat exchanger 1220B may be configured to transfer heat from the first fluid to the second fluid to substantially completely vaporize the second fluid.

In some embodiments, the heat exchanger 1220A of the heater 1205 may be configured to receive a third fluid to transfer heat from the third fluid to the first fluid. For example, in some embodiments, the third fluid may be water or steam. In some embodiments, the third fluid may be a waste gas stream, e.g. flue gases from industrial processes. In various embodiments, the third fluid may be a liquid, gas, supercritical fluid, or other type of fluid.

In some embodiments, heat input may be provided to the system 3000 by conductive heat transfer, radiative heat transfer, or other type of transfer. For example, solar energy may be provided to directly heat the first fluid and/or heat water to transfer heat to the first fluid.

In some embodiments, a valve 3012, such as a pressure release valve or pressure control valve, may be disposed between the heat exchangers 1220B, 1220C to control a pressure of the first fluid flowing from the heat exchanger 1220B to the heat exchanger 1220C. For example, controlling the pressure of the first fluid may include depressurizing the fluid.

In some embodiments, the (pressure release or pressure control) valve 3012 may be configured to control the pressure of the first fluid to achieve substantially complete vaporization of the first fluid in the heat exchanger 1220C to operate the compressor 1222 in a substantially single phase condition. For example, depressurizing the first fluid may prevent or mitigate liquefaction and/or maintaining the fluid in a liquified state.

In some embodiments, the compressor 1222 and the liquid pump 1224 are drivably connected to the expander 3010 via a common drive shaft.

In some embodiments, the electric generator 1270, the expander 3010, the liquid pump 1224, and the compressor 1222 may be mechanically coupled to each other. In some embodiments, the mechanical coupling may be a common shaft. In some embodiments, one or more of the electric generator 1270, the expander 3010, the liquid pump 1224, or the compressor 1222 may be supported on the common shaft by bearings.

For an exemplary embodiment, where the first fluid is ammonia and the second fluid is carbon dioxide, the thermodynamic properties of the second fluid at positions A-30, B-30, C-30, and D-30 are listed in Table 8 and the thermodynamic properties of the first fluid at positions E-30, F-30, G-30, and H-30 are listed in Table 9.

TABLE 8

| Position | Temperature (° F.) | Pressure (psig) | Density (lbm/ft$^3$) | Vapor quality (lbm/lbm) |
|---|---|---|---|---|
| A-30 | 370.00 | 1500 | 8.22 | 1.00 |
| B-30 | −14.12 | 95 | 0.93 | (Superheated) |
| C-30 | −60.73 | 95 | 72.43 | (Subcooled) |
| D-30 | −57.00 | 1500 | 73.27 | (Subcooled) |

TABLE 9

| Position | Temperature (° F.) | Pressure (psig) | Density (lbm/ft$^3$) | Vapor quality (lbm/lbm) |
|---|---|---|---|---|
| E-30 | 378.75 | 27 | 0.05 | (Superheated) |
| F-30 | −10.00 | 27 | 41.77 | (Subcooled) |
| G-30 | −69.49 | 4 | 0.16 | 0.10 |
| H-30 | 60.00 | 4 | 0.012 | (Superheated) |

For an exemplary embodiment, where the first fluid is ammonia and the second fluid is carbon dioxide, multiphase properties of the second fluid at positions A-30, B-30, C-30, and D-30 are listed in Table 10 and the multiphase properties of the first fluid at positions E-30, F-30, G-30, and H-30 are listed in Table 11.

TABLE 10

| Position | Density (lbm/ft³) Liquid | Density (lbm/ft³) Vapor | Enthalpy (BTU/lbm) Liquid | Enthalpy (BTU/lbm) Vapor |
|---|---|---|---|---|
| A-30 | — | 8.22 | — | 265.26 |
| B-30 | — | 0.93 (Superheated) | — | 196.00 (Superheated) |
| C-30 | 72.43 (Subcooled) | — | 38.70 (Subcooled) | — |
| D-30 | 73.27 (Subcooled) | — | 41.56 (Subcooled) | — |

TABLE 11

| Position | Density (lbm/ft³) Liquid | Density (lbm/ft³) Vapor | Enthalpy (BTU/lbm) Liquid | Enthalpy (BTU/lbm) Vapor |
|---|---|---|---|---|
| E-30 | — | 0.05 (Superheated) | — | 890.75 (Superheated) |
| F-30 | 41.77 (Subcooled) | — | 102.92 (Subcooled) | — |
| G-30 | 44.27 | 0.016 | 39.727 | 656.88 |
| H-30 | — | 0.012 (Superheated) | — | 721.43 (Superheated) |

In various embodiments, such a system may generate approximately 500-600 kW. The mass flow rate of the fluid (the second fluid) entering the expander 3010 may be approximately 40,000 lbs/hr. In some embodiments, wherein the first fluid is ammonia, the mass flow rate of the fluid through the heat exchangers 1220B, 1220C may be substantially less, e.g. 11,000 lbs/hr or less. Low pressures and temperatures may allow more reliable operation and reduce capital costs and maintenance of structures of the system 3000.

FIG. 31 is a perspective view of a system 3100 using boundary-layer turbomachines 100A, 100B, in accordance with an embodiment.

FIG. 32A is a cross-sectional view of the system 3100 of FIG. 31, in accordance with an embodiment.

FIG. 32B is an enlarged view of region 32B in FIG. 32A, in accordance with an embodiment.

The boundary-layer turbomachines 100A, 100B may include a plurality of bodies 2210, each of which is elongated along the longitudinal axis 102 and rotatable thereabout. The plurality of bodies 2210 may include bodies 2210A, 2210B, 2210C, 2210D which may all coupled for common rotation. A plurality of bodies 2210 including bodies 2210B, 2210C, 2210D may be elongated along the longitudinal axis 102 for receiving fluid therein.

The body 2210A may be concentrically contained or arranged within the body 2210B, which may be contained in the body 2210C, which may be contained in the body 2210D. Ducts 214A, 214B, 214C may be defined between, respectively, body 2210A and the body 2210B, body 2210B and body 2210C, and body 2210C and body 2210D.

Slots 3202A, 3202B, 3202C may open into respective ducts 214A, 214B, 214C. The slots 3202A, 3202B, 3202C may be radially spaced apart (relative to the longitudinal axis 102) from the respective bodies 2210A, 2210B, 2210C.

Each duct 214A, 214B, 214C may have a corresponding first portion and second portion of the fluid. The first portions may be received into the respective slots 3202A, 3202B, 3202C. The first portions of the fluid may be drawn out of the respective ducts 214A, 214B, 214C while allowing respective second portions of the fluid to remain in the respective ducts 214A, 214B, 214C.

An outlet port 116 may be configured to receive the second portions of the fluid from the respective ducts 214A, 214B, 214C. In some embodiments, the outlet port 116 may be configured to discharge turbomachine the fluid out of the turbomachine. In some embodiments, the outlet port 116 may be disposed downstream of the slots 3202A, 3202B, 3202C in the duct.

In some embodiments, each slot 3202A, 3202B, 3202C extends radially through the respective body 2210B, 2210C, 2210D to open radially into the respective duct 214A, 214B, 214C.

In some embodiments, the slots 3202A, 3202B, 3202C may be circular slots, longitudinally spaced apart by spacing 3206. In some embodiments, adjacent circular slots may be longitudinally spaced apart by at least a distance of two radii of one of the slots or by a sum of the radii of the adjacent slots.

The slots 3202A, 3202B may be longitudinally spaced apart from each other to allow a further portion of a portion of the fluid that passes through the respective slot 3202A, 3202B to be drawn into a respective additional slot 3202B, 3202C. The slot 3202A may open, or may be adapted to or configured to open, into the duct to convey a portion of the fluid from the duct 214A to the duct 214B.

A discharge outlet 3204 may discharge fluid out of the boundary-layer turbomachine 100B. The discharge outlet 3204 may include an annular space extending around the plurality of ducts 214 and the longitudinal axis 102.

Figure 33:
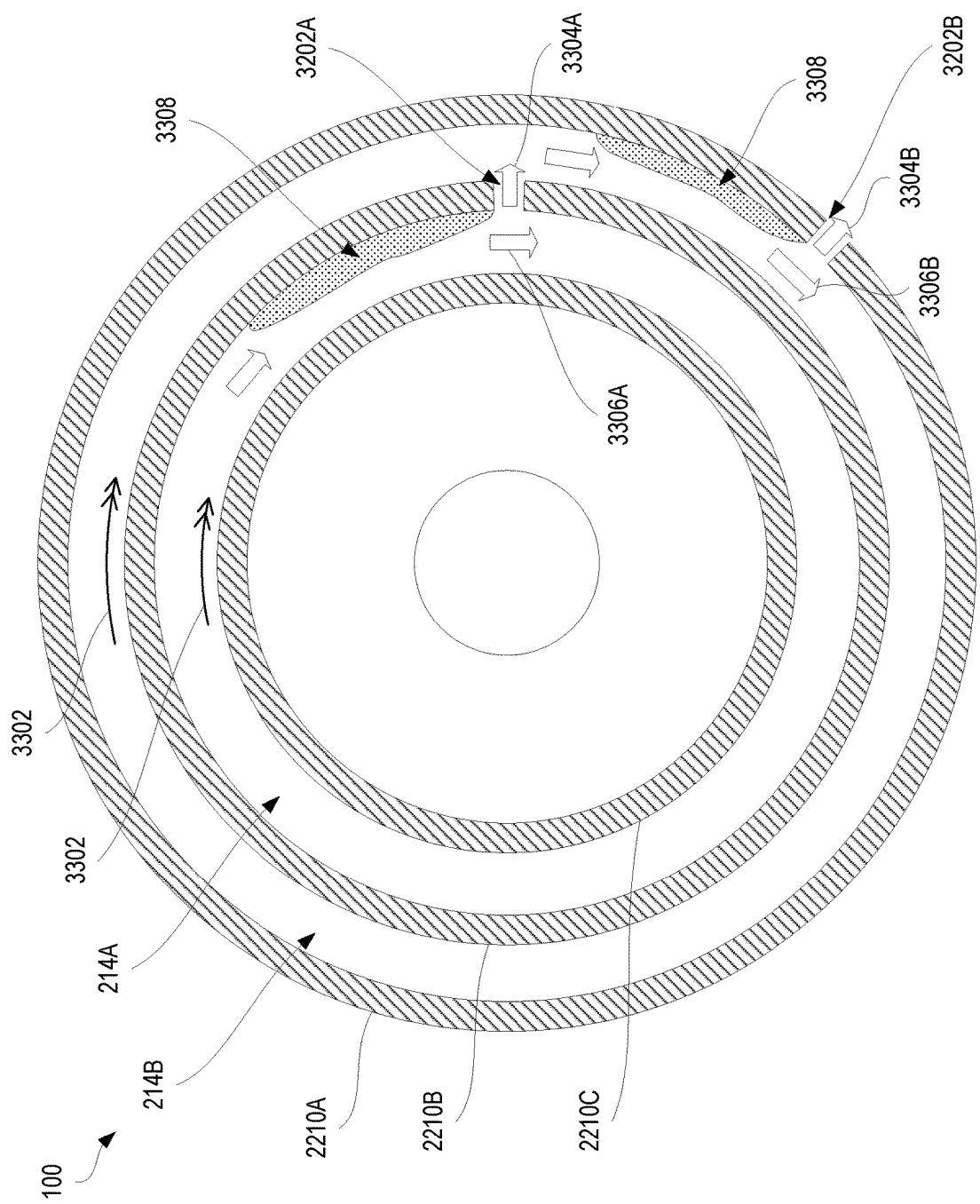
FIG. 33 is a cross-sectional view of a boundary-layer turbomachine having slots, in accordance with an embodiment.

FIG. 33 is a cross-sectional view of a boundary-layer turbomachine 100 having slots 3202A, 3202B, in accordance with an embodiment.

The bodies 2210A, 2210B, 2210C may be coupled for common rotation as indicated by the direction 3302. The fluid in the ducts 214A, 214B may be multiphase, including vapor and liquid phase.

First portions 3304A, 3304B of the fluid may be heavier than respective second portions 3306A, 3306B of the fluid. For example, the first portions 3304A, 3304B may include more liquid 3308 than the second portions 3306A, 3306B. In some embodiments, the first portions 3304A, 3304B may be substantially completely liquid and the second portions 3306A, 3306B may be substantially completely gas The first portions 3304A, 3304B of the fluid may be separated from respective the second portions 3306A, 3306B of the fluid by being drawn centrifugally towards the respective slots 3202A, 3202B relative to the respective second portion 3306A, 3306B.

In some embodiments, the boundary-layer turbomachine 100 may be a boundary-layer turbine 1230 that generates power by extracting energy from the fluid flowing therein via frictional engagement. Extraction of energy may cool the fluid and cause phase change or at least partial phase change in the boundary-layer turbine 1230. For example, the working fluid may progressively change from full vapor phase (possibly), through muti-phase and to, possibly full liquid phase.

Temperature change with phase change involves a significant release of energy compared to temperature change without phase change. As such, once a portion of the working fluid becomes liquid, the amount of energy extracted therefrom becomes relatively less.

Removing liquid phase via the slots 3202A, 3202B from the working fluid in the plurality of ducts 214, as described above, may improve efficiency by reducing pumping requirements and reduce structure loads on the turbomachine. In some cases, a cross-sectional area of the ducts may become smaller in the longitudinal direction, as shown in FIGS. 22A-22C, to accommodate removal of liquid phase.

Figure 34:
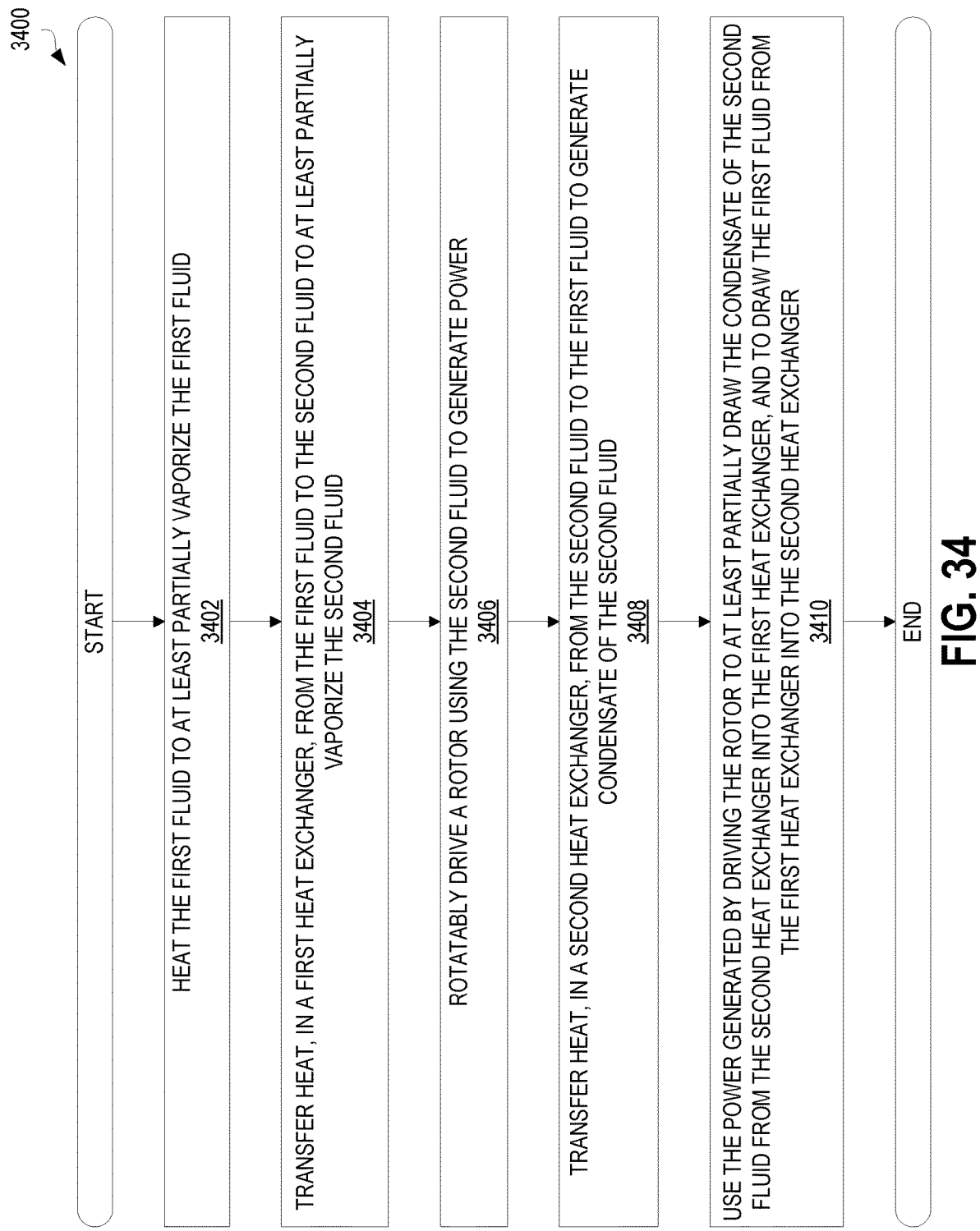
FIG. 34 is a flowchart of an exemplary method for generating power using a first fluid and a second fluid fluidly isolated from each other.

FIG. 34 is a flowchart of an exemplary method 3400 for generating power using a first fluid and a second fluid fluidly isolated from each other.

Step 3402 may include heating the first fluid to at least partially vaporize the first fluid.

Step 3404 may include transferring heat, in a first heat exchanger, from the first fluid to the second fluid to at least partially vaporize the second fluid.

Step 3406 may include rotatably driving a rotor using the second fluid to generate power.

Step 3408 may include transferring heat, in a second heat exchanger, from the second fluid to the first fluid to generate condensate of the second fluid.

Step 3410 may include using the power generated by driving the rotor to at least partially draw the condensate of the second fluid from the second heat exchanger into the first heat exchanger, and to draw the first fluid from the first heat exchanger into the second heat exchanger Some embodiments of the method 3400 may include driving a pump using the rotor to draw the condensate of the second fluid from the second heat exchanger into the first heat exchanger for vaporization.

Some embodiments of the method 3400 may include driving a compressor using the rotor to draw the first fluid from the first heat exchanger to the second heat exchanger.

In some embodiments of the method 3400, the rotor may be a rotor of an expander.

In some embodiments of the method 3400, the expander may be a boundary-layer turbine.

Some embodiments of the method 3400 may include driving an electric generator using the rotor to generate electricity, and transferring heat from electric generator to the second fluid to cool the electric generator.

In some embodiments of the method 3400, wherein the first fluid may be ammonia.

In some embodiments of the method 3400, the first fluid may be cooled in the first heat exchanger from between 300° F. and 400° F. to −10° F. and −20° F.

In some embodiments of the method 3400, the second fluid may be carbon dioxide.

In some embodiments of the method 3400, wherein the first fluid may be cooled in the first heat exchanger by between 200° C. and 400° C. and heated in the second heat exchanger by between 50° C. and 100° C. Such a temperature range may allow low-grade energy absorption and may facilitate effective energy extraction from the second working fluid.

Figure 35:
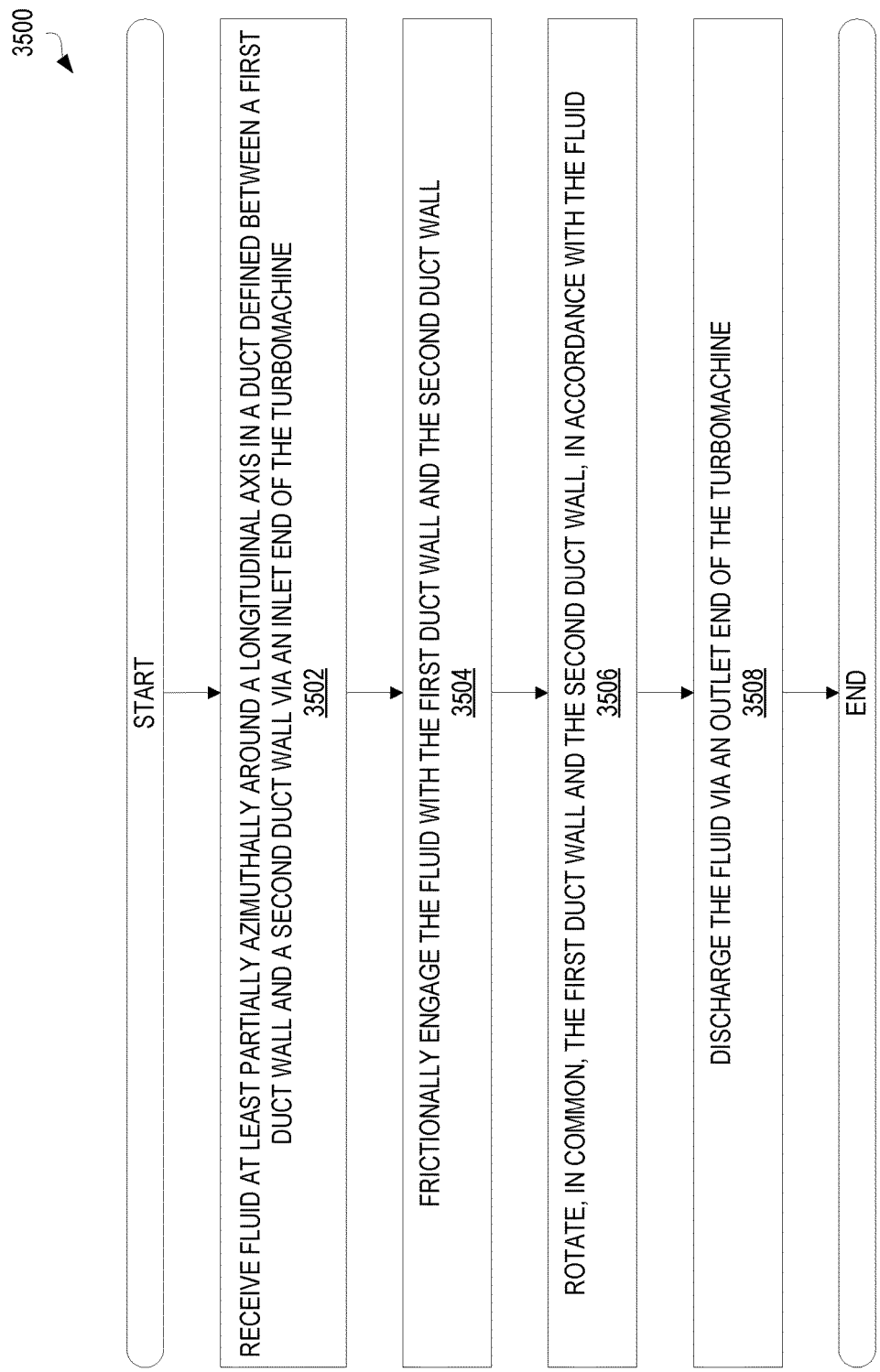
FIG. 35 is a flowchart of an exemplary method a method of operating a turbomachine.

FIG. 35 is a flowchart of an exemplary method 3400 a method of operating a turbomachine.

Step 3502 includes receiving fluid at least partially azimuthally around a longitudinal axis in a duct defined between a first duct wall and a second duct wall via an inlet end of the turbomachine.

Step 3504 includes frictionally engaging the fluid with the first duct wall and the second duct wall.

Step 3506 includes rotating, in common, the first duct wall and the second duct wall, in accordance with the fluid.

Step 3508 includes discharging the fluid via an outlet end of the turbomachine.

Some embodiments of the method 3500 may include rotating a plurality of blades around the longitudinal axis in common with the first duct and the second duct wall, and receiving the fluid from the duct on to the plurality of blades at least partially azimuthally to redirect the fluid generally parallel to the longitudinal axis.

Some embodiments of the method 3500 may include supporting the first duct wall and the second duct wall at a longitudinal end to cantilever the first duct wall and the second duct wall along the longitudinal axis.

Some embodiments of the method 3500 may include comprising issuing jets of the fluid into the duct at least partially azimuthally to rotatably drive the first duct wall and the second duct wall.

In some embodiments of the method 3500, receiving the fluid at least partially azimuthally around the longitudinal axis in the duct includes drawing the fluid through a channel in the duct that is defined by one or more protrusions extending radially from the first duct wall to the second duct wall.

In some embodiments of the method 3500, the first duct wall is a radially-inner wall and the second duct wall is a radially-outer wall.

Some embodiments of the method 3500 include drawing the fluid in the duct azimuthally around the longitudinal axis to centrifugally push relatively dense portions of the fluid away from the longitudinal axis, and discharging the relatively dense portions of the fluid out of the duct via a port radially spaced apart from the radially-inner wall.

Some embodiments of the method 3500 may include comprising constricting the fluid in the duct as the fluid flows from the inlet end towards the outlet end.

The term "connected" or "coupled to" may include both direct coupling (in which two elements that are coupled to each other contact each other) and indirect coupling (in which at least one additional element is located between the two elements).

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, configurations may be varied to account for thermal expansion and structural loading. Yet further modifications could be implemented by a person of ordinary skill in the art in view of the present disclosure, which modifications would be within the scope of the present technology.

What is claimed is:

1. A boundary-layer turbine configured to receive fluid via an inlet end and discharge the fluid via an outlet end, comprising:

a plurality of ducts concentrically arranged around a longitudinal axis of the boundary-layer turbine between the inlet end and the outlet end to convey the fluid from the inlet end towards the outlet end, the plurality of ducts at least partially defined by corresponding duct walls configured to rotate about the longitudinal axis;

one or more flow inlets disposed at the inlet end and configured to receive the fluid into the plurality of ducts at least partially azimuthally around the longitudinal axis towards the outlet end in accordance with rotation of the duct walls of the plurality of ducts, the fluid being frictionally engaged with the duct walls to transfer mechanical energy to, or from, the fluid flowing in the plurality of ducts, the one or more flow inlets being configured to draw the fluid into the plurality of ducts to impart rotation to the duct walls to generate power; and a plurality of blades rotatably disposed around the longitudinal axis at a downstream end of a duct of the plurality of ducts, the plurality of blades adapted to receive the fluid oriented at least partially azimuthally around the longitudinal axis and to redirect the fluid generally parallel to the longitudinal axis, the fluid thereby imparting rotation to the plurality of blades about the longitudinal axis to generate power.

2. The boundary-layer turbine of claim 1, further comprising an axial turbine stage downstream of the plurality of blades to receive the fluid oriented generally parallel to the longitudinal axis.

3. The boundary-layer turbine of claim 2, wherein the axial turbine stage includes a vaned stator axially aligned along the longitudinal axis and a bladed rotor axially aligned with the vaned stator, the bladed rotor disposed downstream of the vaned stator.

4. The boundary-layer turbine of claim 1, wherein the plurality of blades extend radially relative to the longitudinal axis from a duct wall of the duct and are integrally formed with the duct wall for co-rotation with the duct wall.

5. The boundary-layer turbine of claim 1, wherein the plurality of blades extend radially relative to the longitudinal axis from a first duct wall of the duct to a second duct wall of the duct opposed the first duct wall.

6. The boundary-layer turbine of claim 1, further comprising: a shaft drivably coupled to the plurality of ducts, the shaft being coaxial with the plurality of ducts and circumferentially surrounded by the plurality of ducts.

7. The boundary-layer turbine of claim 6, further comprising:
a plurality of tubes nested concentrically around the longitudinal axis, spaced apart from each other, and having progressively larger cross-sectional areas lateral to the longitudinal axis,
wherein each of the plurality of ducts is formed between a pair of concentrically adjacent tubes of the plurality of tubes, and the shaft is disposed coaxially inside an inner cavity formed by a radially-innermost tube of the plurality of tubes at least partially defining a radially-innermost duct of the plurality of ducts.

8. The boundary-layer turbine of claim 1, wherein the duct walls are coupled for common rotation.

9. The boundary-layer turbine of claim 1, wherein a flow inlet of the one or more flow inlets is configured to draw the fluid into an upstream end of a duct of the plurality of ducts generally azimuthally around the longitudinal axis, and a longitudinal length of the duct is adapted to limit an azimuthal deviation of the fluid to at most 10 degrees.

10. The boundary-layer turbine of claim 9, wherein leading edges of the plurality of blades are adapted to the azimuthal deviation of the fluid along the duct to receive the fluid in substantial alignment therewith.

11. The boundary-layer turbine of claim 9, wherein the flow inlet draws the fluid into the upstream end oriented within 10 degrees of an azimuthal direction around the longitudinal axis.

12. The boundary-layer turbine of claim 1, further comprising:
a slot opening into a duct of the plurality of ducts and radially spaced apart from a radially-inner wall of the duct to receive a first portion of the fluid to draw the first portion of the fluid out of the duct while allowing a second portion of the fluid to remain in the duct, the first portion of the fluid being separated from the second portion of the fluid by being drawn centrifugally towards the slot relative to the second portion of the fluid; and
a flow outlet configured to receive the second portion of the fluid from the duct to discharge the second portion of the fluid out of the boundary-layer turbine.

13. The boundary-layer turbine of claim 1, further comprising:
one or more protrusions extending radially in the duct and spirally extending along and around the longitudinal axis in the duct to define walls of a spiral channel in the duct for receiving and drawing the fluid from the one or more flow inlets into and along the duct, an inlet of the spiral channel azimuthally oriented to receive the fluid supplied by the one or more flow inlets.

14. A method of operating a turbomachine, comprising:
receiving fluid at least partially azimuthally around a longitudinal axis in a duct defined between a first duct wall and a second duct wall via an inlet end of the turbomachine;
frictionally engaging the fluid with the first duct wall and the second duct wall;
rotating, in common, the first duct wall and the second duct wall, in accordance with the fluid;
discharging the fluid via an outlet end of the turbomachine;
rotating a plurality of blades around the longitudinal axis in common with the first duct wall and the second duct wall; and
receiving the fluid from the duct on to the plurality of blades at least partially azimuthally to redirect the fluid generally parallel to the longitudinal axis.

15. The method of claim 14, further comprising supporting the first duct wall and the second duct wall at a longitudinal end to cantilever the first duct wall and the second duct wall along the longitudinal axis.

16. The method of claim 14, further comprising issuing jets of the fluid into the duct at least partially azimuthally to rotatably drive the first duct wall and the second duct wall.

17. The method of claim 14, wherein receiving the fluid at least partially azimuthally around the longitudinal axis in the duct includes drawing the fluid through a channel in the duct that is defined by one or more protrusions extending radially from the first duct wall to the second duct wall.

18. The method of claim 14, wherein the first duct wall is a radially-inner wall and the second duct wall is a radially-outer wall, the method further comprising:
drawing the fluid in the duct azimuthally around the longitudinal axis to centrifugally push relatively dense portions of the fluid away from the longitudinal axis; and
discharging the relatively dense portions of the fluid out of the duct via a slot radially spaced apart from the radially-inner wall.

19. The method of claim 14, further comprising constricting the fluid in the duct as the fluid flows from the inlet end towards the outlet end.

20. A system for generating power, comprising:
a heater for transferring heat to condensate to generate fluid that is at least partially vaporized;
a boundary-layer turbine as defined in claim 1; and
a second boundary-layer turbine spaced apart from and coupled to the boundary-layer turbine to receive the fluid from the boundary-layer turbine into a second plurality of ducts at least partially defining the second boundary-layer turbine, the second plurality of ducts at least partially defined by corresponding second duct walls that are configured for drivable rotation about a longitudinal axis of the second boundary-layer turbine by the fluid frictionally dragging the second duct walls at least partially azimuthally around the longitudinal axis of the second boundary-layer turbine, the second duct walls configured to transfer energy from the fluid flowing in the second plurality of ducts to condense the fluid to generate the condensate for the heater.

* * * * *